United States Patent
Okabe et al.

(10) Patent No.: US 9,645,011 B2
(45) Date of Patent: May 9, 2017

(54) OPTICAL DEVICE HAVING POLARIZER AND NON-ACTIVE RETARDERS FOR SPECTROSCOPIC POLARIMETRY

(75) Inventors: Hiroshi Okabe, Kyoto (JP); Kenichi Matoba, Kyoto (JP); Kazuhiko Oka, Sapporo (JP)

(73) Assignees: Omron Corporation, Kyoto (JP); National University Corporation Hokkaido University, Sapporo-shi (JP)

( * ) Notice: Subject to any disclaimer, the term of this patent is extended or adjusted under 35 U.S.C. 154(b) by 0 days.

(21) Appl. No.: 12/965,165

(22) Filed: Dec. 10, 2010

(65) Prior Publication Data

US 2011/0080586 A1    Apr. 7, 2011

Related U.S. Application Data

(62) Division of application No. 11/388,205, filed on Mar. 24, 2006, now abandoned.

(30) Foreign Application Priority Data

Mar. 28, 2005 (JP) ................................ 2005-091763
Dec. 15, 2005 (JP) ................................ 2005-362047

(51) Int. Cl.
*G01J 4/04* (2006.01)
*G01J 3/447* (2006.01)

(52) U.S. Cl.
CPC ................ *G01J 4/04* (2013.01); *G01J 3/447* (2013.01)

(58) Field of Classification Search
CPC ...... G01J 4/04; G01J 4/00; G01J 3/447; G01J 2004/007; G01N 2021/212;

(Continued)

(56) References Cited

U.S. PATENT DOCUMENTS 7,202,950 B2 * 4/2007 Shribak et al. ............... 356/364
7,336,360 B2 * 2/2008 Oka .......................... G01J 4/04
                                                          356/365

(Continued)

FOREIGN PATENT DOCUMENTS

| JP | 06-288835 | 10/1994 |
| JP | 2004-028970 | 1/2004 |
| JP | 2004-271510 | 3/2004 |

OTHER PUBLICATIONS

Wang et al. "Optimization of azimuth angle settings in polarizer-compensator-sample-analyzer off-null ellipsometry." Jan. 2003 Applied Optics, vol. 42. No. 1, pp. 38-44.*

(Continued)

*Primary Examiner* — Michael P Lapage
(74) *Attorney, Agent, or Firm* — Foley & Lardner LLP

(57) ABSTRACT

In the channeled spectroscopic polarimetry, a measurement error of a parameter showing a spectropolarization characteristic of a sample is effectively removed, the error being generated by various variations in retardation of a retarder depending upon the state of the sample. With attention being focused that the retardation of the retarder may be kept constant by stabilization of an incident direction of light that transmits through the retarder, the retarder was arranged on the light source side with respect to the sample so as to effectively remove an influence relative to a measurement error, such as variations in direction of a light ray due to the sample.

22 Claims, 30 Drawing Sheets

Case of configuration of present invention

(58) Field of Classification Search
CPC ............. G01N 2021/213; G01N 21/21; G01N 21/211; G01N 2021/4792; G01N 2021/8848
USPC ................... 356/32–33, 326–327, 364–370
See application file for complete search history.

(56) References Cited

U.S. PATENT DOCUMENTS

| | | | |
|---|---|---|---|
| 7,623,236 B2 * | 11/2009 | Oka | ............. G01J 4/04 356/364 |
| 2002/0057433 A1 | 5/2002 | Menguc et al. | |
| 2003/0086033 A1 | 5/2003 | Sasaki et al. | |
| 2004/0004688 A1 | 1/2004 | Kawata et al. | |
| 2004/0130717 A1 * | 7/2004 | Drevillon et al. | ............. 356/364 |

OTHER PUBLICATIONS

Kato et al., "Measurement of Spectral Distrubition of Polarized Light Based on Frequency Region Interference Method," Preliminary Manuscript Collection for 34th Academic Lecture Meeting of Hokkaido Branch of Japan Society of Applied Physics, p. 41, 1998.

Oka et al., "Spectroscopic Ellipsometry with a Channeled Spectrum," Proceedings of 26th Meeting on Light Wave Sensing Technology, pp. 107-114, 2000.

Oka et al., "Spectroscopic Polarimetry with a Channeled Spectrum," Optics Letters, Optical Society of America, vol. 24, No. 21, Nov. 1, 1999, pp. 1475-1477.

Oka, "Singleshot Spectroscopic Polarimetry using Channeled Spectrum,:" Proceedings of the Spie—The International Society for Optical Engineering, vol. 4919, 2002, pp. 167-175.

Oka, "Spectroscopic Polarimetry Using Channeled Spectrum," O Plus E., vol. 11, No. 11, 2003, pp. 1248-1253.

Okabe et al., "New Configuration of Channeled Spectropolarimeter for Snapshot Polarimetric Measurement of Materials," Proceedings of the Spie—The International Society for Optical Engineering, vol. 5878, 2005, pp. 1-8.

Sabatke, "Linear Calibration and Reconstruction Techniques for Channeled Spectropolarimetry," Optics Express, vol. 11, No. 22, Nov. 3, 2003.

Wang, et al.; "Optimization of azimuth angle settings in polarizer-compensator-sample-analyzer off-null ellipsometry"; Applied Optics, vol. 42, No. 1, Jan. 1, 2003; pp. 38-44.

* cited by examiner

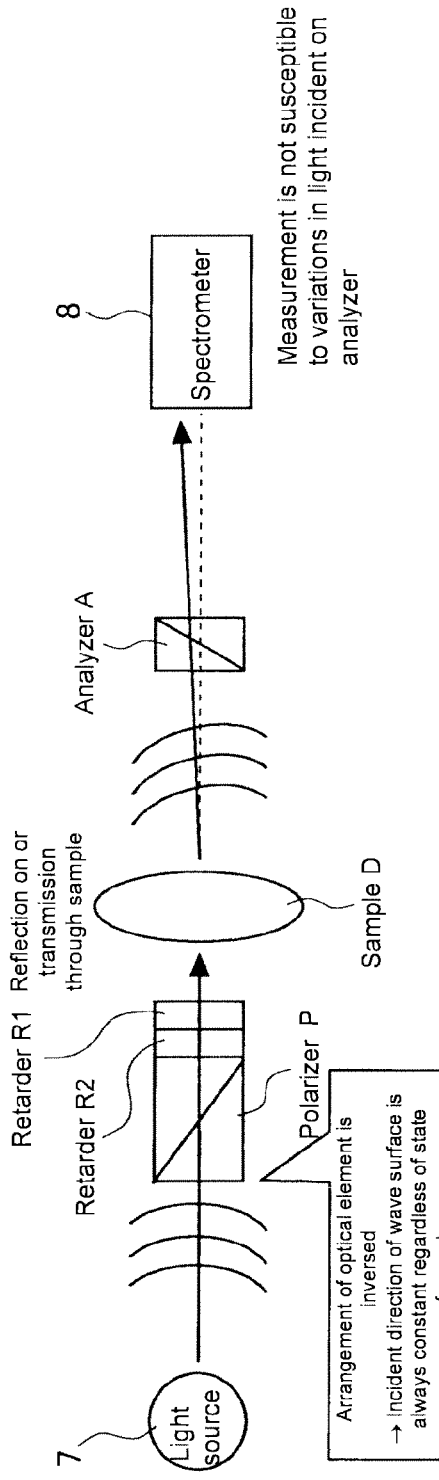
Fig. 1A. Case of configuration of present invention
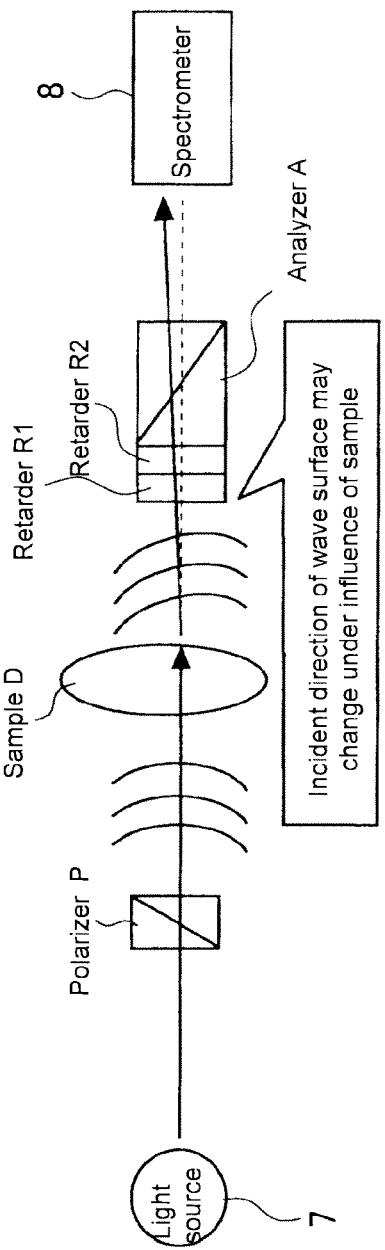
Fig. 1B. Case of conventional configuration Fig. 3A. Conceptual diagram Fig. 3B. Relational expression of states of polarization of incident light and emitted light and Mueller matrix

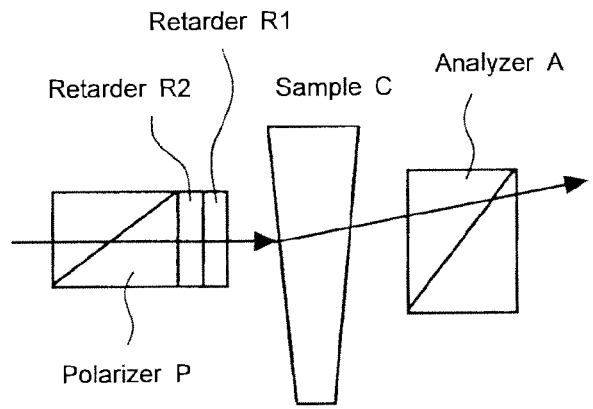
Fig. 18A. Case of sample having characteristic of inclining light
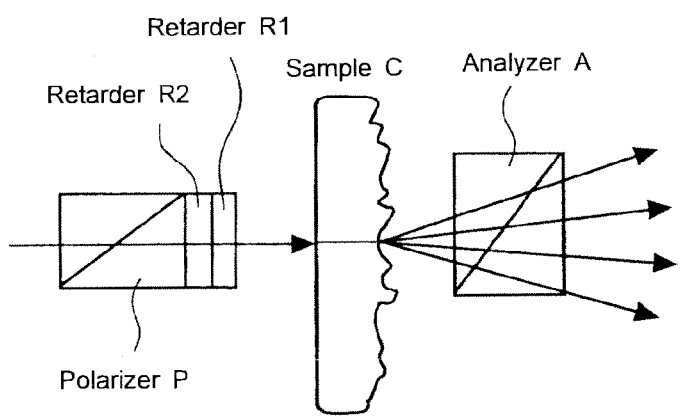
Fig. 18B. Case of sample having characteristic of scattering incident light

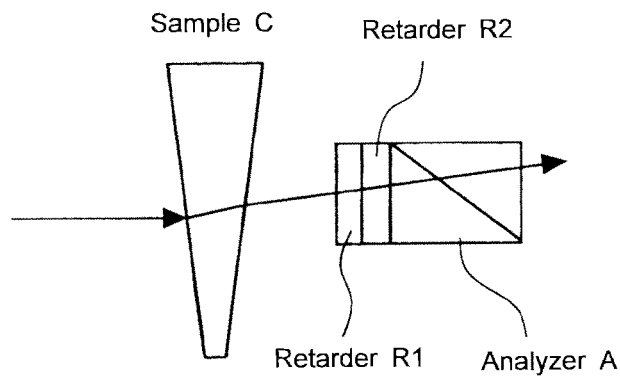
Fig. 25A. Explanatory view showing variations in direction of light ray due to inclination characteristic of sample
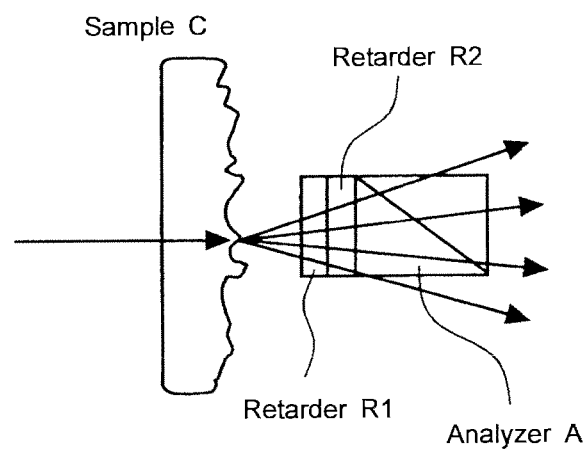
Fig. 25B. Explanatory view showing diffusion of light due to physical characteristic of sample

US 9,645,011 B2

OPTICAL DEVICE HAVING POLARIZER AND NON-ACTIVE RETARDERS FOR SPECTROSCOPIC POLARIMETRY

CROSS-REFERENCE TO RELATED PATENT APPLICATIONS

Japan Priority Application P2005-091763, filed Mar. 28, 2005 and Japan Priority Application P2005-362047, filed Dec. 15, 2005 including the specification, drawings, claims and abstract, are incorporated herein by reference in their entirety. This application is a Divisional of U.S. application Ser. No. 11/388,205, filed Mar. 24, 2006, incorporated herein by reference in its entirety.

BACKGROUND OF THE INVENTION

1. Field of the Invention

The present invention relates to a technique for stabilizing measurement of spectropolarization characteristics of an object to be measured by use of a channeled spectrum.

2. Description of the Related Art

Light has properties of a "transverse wave". Based upon the premise of three mutually orthogonal axes (x, y, z), when a propagation direction of light is assumed to be the z-axis direction, a vibration direction of the light is a direction along the x-y plane. The vibration direction of the light within the x-y plane has a bias. This bias of light is referred to as "polarization". A biased state of light is referred to as a "state of polarization (SOP)" in this specification. Typically, the SOP varies depending upon wavelengths (colors) of light.

When light in some state of polarization is incident on an object to be measured to acquire outgoing light such as transparent light or reflected light and the object to be measured has optical anisotropy, a change in SOP is observed between the incident light and the outgoing light. Acquiring information on anisotropy of the object to be measured from the change in SOP is referred to as "polarimetry". It is to be noted that causes of such anisotropy may include anisotropy of a molecular structure, presence of stress (pressure), and presence of a local field and a magnetic field.

A measurement in which a change in SOP between the incident light and the outgoing light is obtained with respect to each wavelength and information on anisotropy of an object to be measured is then acquired is especially referred to as "spectroscopic polarimetry". This spectroscopic polarimetry has an advantage of acquiring a great amount of information as compared to the case of measurement by use of a single wavelength (single color). In the spectroscopic polarimetry, a device for measuring the change in SOP between the incident light and the outgoing light, namely a spectroscopic polarimeter, serves as a key device.

As fields of application of the spectroscopic polarimetry, there are known the field of spectroscopic ellipsometry, the medical field, and the like. In the field of spectroscopic ellipsometry, for example, since thickness as well as a complex refractive index of a thin film can be measured in a nondestructive and non-contact manner, spectroscopic polarimetry has been applied to optical electronic devices, examination/study of semiconductors, and the like. In the medical field, attempts have been made for early detection of glaucoma and a cancer cell since several kinds of cells have polarization characteristics.

As conventional typical spectroscopic polarimetry, rotating-retarder polarimetry and polarization-modulation polarimetry are known.

In these methods, a mechanical or electric polarization control element is used to modulate light to be measured, and from a change in spectral with the modulation, a Stokes parameter or the like is obtained.

However, the following problems and some other problems with the above methods have been pointed out: [1] a mechanical or electric drive unit is required; and [2] it is necessary to repeatedly change a plurality of spectrums while changing conditions of the spectroscopic polarimetry.

In order to solve these problems, channeled spectropolarimetry was previously contrived (cf. "Measurement of spectral distribution of polarized light based on frequency region interference method", written by Takayuki Katoh, Kazuhiko Oka, Tetsu Tanaka, and Yoshihiro Ohtsuka, preliminary manuscript collection for 34th Academic Lecture Meeting of Hokkaido Branch of Japan Society of Applied Physics, (Hokkaido Branch of Japan Society of Applied Physics, Sapporo, 1998) p. 41).

Further, spectroscopic ellipsometry utilizing the channeled spectropolarimetry has also been reported (cf. "Spectroscopic ellipsometry using channeled spectrum", written by Kazuhiko Oka and Takayuki Katoh, collected papers of lectures in 26th Study Session on Light Wave Sensing Technology (Light wave Sensing Technology Study Session held by Japan Society of Applied Physics, Dec. 19-20, 2000) pp. 107-114).

A configuration view of an experiment system for explaining the channeled spectroscopic polarimetry is shown in FIG. 26. As apparent from this figure, white light emitted from a xenon lamp 1 is transmitted through a polarizer 2 and a Babinet-Soleil compensator 3, to obtain a light wave having an SOP depending upon a frequency $v$. Spectral distributions $S_0(v)$, $S_1(v)$, $S_2(v)$ and $S_3(v)$ of the Stokes parameters of the light wave are obtained by a measurement system 4 surrounded by a dashed line in the figure.

Light under measurement is first transmitted through two retarders R1 and R2 having different thicknesses (d1, d2) and an analyzer A, and then incident on a spectrometer 5. Here, a slow axis of the retarder R2 is inclined at an angle of 45° with respect to a slow axis of the retarder R1, while a transmission axis of the analyzer A is arranged in parallel to the slow axis of the retarder R1.

In each of the two retarders R1 and R2, a phase difference created between the orthogonal polarization components depends upon a frequency. Hence, as shown in FIG. 27, a channeled spectrum including three carrier components is obtained from the spectrometer 5 which functions as an optical spectrum analyzer. An amplitude and a phase of each of the carrier components are modulated by the spectrum distribution of the Stokes Parameters of the light under measurement. It is therefore possible to obtain each of the Stokes Parameters by execution of a signal processing with a computer 6 by use of Fourier transformation.

One example of results of an experiment is shown in FIG. 28. This is a result obtained in the case of inclining the Babinet-Soleil compensator 3 at an angle of 30° with respect to the slow axis of the retarder R1. Three solid lines respectively show spectral distributions $S_1(v)/S_0(v)$, $S_2(v)/S_0(v)$, $S_3(v)/S_0(v)$ of the standardized Stokes parameters. It is thereby understood that the SOP depends upon the frequency.

As thus described, according to the channeled spectroscopic polarimetry, it is possible to obtain each spectrallyresolved Stokes Parameter by a frequency analysis (or wavenumber analysis) of characteristics of a spectral intensity. It is reasonably necessary to obtain respective retardations of the two retarders R1 and R2 prior to the frequency analysis. Here, the retardation means a phase difference created between a fast axis component and a slow axis component.

According to the foregoing channeled spectroscopic polarimetry, advantages can be obtained including that: [1] a mechanically movable element such as a rotating retarder is unnecessary; [2] an active element such as an electro-optic modulator is unnecessary; [3] four Stokes Parameters are obtained at once with one spectrum so that a so-called snap shot measurement can be performed; and [4] the configuration is simple, and thus suitable for size reduction.

SUMMARY OF THE INVENTION

However, concerning the foregoing channeled spectroscopic polarimetry, a problem of a relatively large measurement error has been pointed out for the following reasons.

In measurement of a spectropolarization characteristic by the channeled spectropolarimetry, it is necessary to previously calibrate retardation of a retarder. However, when the incident direction of light to be incident on the retarder changes between the time of calibration and the time of sample measurement, a distance of light to pass through the retarder changes, and thereby the retardation changes. This change in retardation between the time of calibration and the time of measurement has caused a measurement error. Further, it has been pointed out that, especially in cases including the case of using a higher-order retarder, retardation widely varies due to variations in light ray direction, or wave surface fluctuation, of light to pass through the retarder, or the like.

Moreover, there are mainly two kinds of methods as follows for investigating properties of an unknown sample by use of the channeled spectropolarimetry: [A] light is reflected on the sample, and by use of an SOP of light acquired from the reflected light, the properties of the sample is investigated; and [B] light is transmitted through the sample, and by use of an SOP of light acquired from the transmitted light, the properties of the light are investigated. The foregoing retardation variation can also be seen in each of those cases. In the following, each of those cases is described.

[A] When light is reflected on the sample so that a spectropolarization characteristic of the sample is measured, it is necessary to keep the incident direction of the wave surface of light to be incident on the retarder constant between the time of pre-calibration and the time of measurement. However, as also apparent from FIG. 24, an incident angle of the light to be incident on the sample varies in many ways due to variations in state of the surface of each sample or arrangement position of the sample, or the like, resulting in variations in incident direction of the wave surface of the light to be incident on the sample, whereby it becomes difficult to keep the retardation of the retarder constant from the time of pre-calibration. It should be noted that in FIG. 24, reference symbol B denotes a sample, reference symbols R1 and R2 respectively denote a first retarder and a second retarder, reference symbol A denotes an analyzer, and an indicator indicates the traveling direction of the light.

[B] Also when light is transmitted through the sample so that a spectropolarization characteristic of the sample is measured, it is necessary to keep the incident direction of the wave surface of light to be incident on the retarder constant between the time of pre-calibration and the time of measurement. However, the incident direction of the wave surface of the light to be incident on the retarder varies in many waves caused by the variations in light ray direction (cf. FIG. 25A) due to the inclination characteristic of the sample (inclination of the sample surface), scattering of the light ray (cf. FIG. 25B) attributed to a physical characteristic such as a rough surface of the sample, or the like, whereby it becomes difficult to keep the retardation of the retarder constant from the time of pre-calibration. It should be noted that in FIG. 25, reference symbol C denotes a birefringent medium as the sample, reference symbols R1 and R2 respectively denote the first retarder and the second retarder, reference symbol A denotes the analyzer, and an indicator indicates the traveling direction of the light.

The present invention was made by noting the problems as described above, and has an object to solve the problem of variations in incident angle of a retarder seen in the conventional channeled spectroscopic polarimetry, to provide a channeled spectroscopic polarimetry and spectroscopic polarimeter which are capable of measurement with even higher accuracy.

Further objects and action effects of the present invention are readily understood by the skilled in the art by referring to the following description of the specification.

(1) A spectroscopic polarimetry of the present invention includes the steps of: preparing an object to be measured; preparing a polarimetric spectroscope; and obtaining the spectral intensity of the object to be measured by use of the polarimetric spectroscope.

Here, the polarimetric spectroscope includes: a projection optical system; an analyzer for allowing light to transmit therethrough, the light having been emitted from the projection optical system and reflected on or transmitted through the object to be measured; and a means of obtaining the spectral intensity of the light having transmitted through the analyzer. The projection optical system comprises a light source, a polarizer and a plurality of retarders, where the light source, the polarizer and the plurality of retarders are arranged such that light emitted from the light source is irradiated on the object to be measured after passing through the polarizer and the plurality of retarders in this order.

Here, the "object to be measured" is a generic term of an object placed in a light path between the projection optical system and the analyzer. Namely, other than a sample having an unknown spectropolarization characteristic that is intended to be an object of the spectroscopic polarimetry, a polarization element having a known spectropolarization characteristic such as a phase compensator is also included in the "object to be measured" when placed in the light path between the projection optical system and the analyzer.

"A plurality of retarders" include: a retarder which is arranged behind the polarizer with respect to the traveling direction of light and whose principal axis is oriented differently from the transmission axis of the polarizer; and another retarder whose principal axis is oriented differently from the principal axis of the above-mentioned retarder. The "analyzer" is an optical element showing a different transmittance from that of the polarization component located in an orthogonal direction to the optical element. The "analyzer" is not restricted to have a plate shape or a film shape. For example, a polarization beam splitter is usable as the "analyzer".

The "means of obtaining the spectral intensity" may be using a spectrometer or using the light source where a wavelength is scanned. The light receiver in the case of using the light source where the wavelength is scanned may be one capable of detecting an amount of light received, and a timing for detecting the amount of light received is corresponded to the wavelength of light.

According to the spectroscopic polarimetry of the present invention, since the object to be measured has no influence on the orientation of light to transmit through the retarder, it is possible to perform the spectroscopic polarimetry with high stability.

(2) The spectroscopic polarimetry of the present invention may include a step of obtaining at least one of spectropolarization parameters of the object to be measured by use of the obtained spectral intensity.

In the specification, the "spectropolarization parameter" is used in the meaning of a parameter that expresses the spectropolarization characteristic of the object to be measured.

(3) The plurality of retarders that the projection optical system comprises may be a first retarder and a second retarder. In this case, each of the elements of the projection optical system is arranged such that light emitted from the light source transmits through the polarizer, the second retarder and the first retarder in this order, the orientation of a transmission axis of the polarizer disagrees with the orientation of a principal axis of the second retarder, and the orientation of the principal axis of the second retarder disagrees with the orientation of a principal axis of the first retarder.

(4) In the following, three techniques for obtaining the spectropolarization parameter in the case of using two retarders are described. A first technique is one comprising: obtaining, from the obtained spectral intensity, a spectral intensity component (first spectral intensity component) which nonperiodically vibrates with wavenumber and a spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber; and obtaining at least one of spectropolarization parameters by use of each of the spectral intensity components.

According to this method, it is possible to obtain a rate of change in amplitude rate between linearly polarized light components which are orthogonal to each other along the orientation of the principal axis of the first retarder, an intensity attenuation rate of each component, and the like. Further, the optical disposition in this case may be in either a reflection mode or a transmission mode. Namely, light allowed to transmit through the analyzer may be light emitted from the projection optical system and reflected on the object to be measured, light that transmitted through the object to be measured, or light scattered by the object to be measured. Examples of the rate of change in amplitude rate which can be obtained by this method include an arctangent $\psi(\sigma)$ of a rate of change in amplitude rate which is one of the ellipsometric parameters, and a rate of change in amplitude rate caused by scattering of light due to particles.

(5) A second technique is one comprising: obtaining, from the obtained spectral intensity, at least one of a spectral intensity component (second spectral intensity component) which vibrates at a frequency depending upon a difference between a retardation ($\phi_1(\sigma)$) of the first retarder and a retardation ($\phi_2(\sigma)$) of the second retarder with wavenumber, a spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and a spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber; and obtaining at least one of the spectropolarization parameters of the object to be measured by use of the obtained spectral intensity component.

According to this method, it is possible to obtain a variation in phase difference between linearly polarized light components which are orthogonal to each other along the orientation of the principal axis of the first retarder, and the like. Further, the optical disposition in this case may be in either a reflection mode or a transmission mode. Namely, light allowed to transmit through the analyzer may be light emitted from the projection optical system and reflected on the object to be measured, light that transmitted through the object to be measured, or light scattered by the object to be measured. Examples of the rate of change in phase difference which can be obtained by this method include a phase difference variation $\Delta(\sigma)$ which is one of the ellipsometric parameters, and a variation in phase difference caused by scattering of light due to particles.

(6) A third technique is one comprising: obtaining, from the obtained spectral intensity, at least one of the spectral intensity component (first spectral intensity component) which nonperiodically vibrates with wavenumber and the spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber, and at least one of the spectral intensity component (second spectral intensity component) which vibrates at a frequency depending upon the difference between the retardation ($\phi_1(\sigma)$) of the first retarder and the retardation ($\phi_2(\sigma)$) of the second retarder with wavenumber, the spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and the spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber; and obtaining at least one of the spectropolarization parameters of the object to be measured by use of each of the obtained spectral intensity components.

Examples of the spectropolarization parameter that can be obtained by this method include the rate of change in amplitude rate between linearly polarized light components which are orthogonal to each other along the orientation of the principal axis of the first retarder, such as an arctangent $\psi(\sigma)$ of the rate of change in amplitude rate which is one of the ellipsometric parameters and a rate of change in amplitude rate caused by scattering of light due to particles. Further, the optical disposition in this case can be in either a reflection mode or a transmission mode. Namely, light allowed to transmit through the analyzer may be light emitted from the projection optical system and reflected on the object to be measured, light that transmitted through the object to be measured, or light scattered by the object to be measured. scattering of light due to particles. Other examples of the spectropolarization parameter that can be obtained by this method include an azimuth R of a birefringent medium and a retardation $\delta(\sigma)$.

(7) It is possible to calibrate the retardation of the retarder by use of light itself which is applied to the object to be measured and used for calibration. Meanwhile, it is also possible to calibrate the retardation of the retarder by use of the foregoing polarimetric spectroscope by means of light not applied to the object to be measured, or to separately calibrate the retardation of the retarder without use of the polarimetric spectroscope. In one case of calibrating the retardation of the retarder by use of light for use in measurement, the foregoing measurement method using the two retarders comprises: obtaining the retardation ($\phi_2(\sigma)$) of the second retarder from the spectral intensity; and obtaining at least one of the spectropolarization parameters of the object to be measured by use of the obtained spectral intensity and the retardation ($\phi_2(\sigma)$) of the second retarder.

Examples of the spectropolarization parameter that can be obtained by this method include the rate of change in amplitude rate between linearly polarized light components which are orthogonal to each other along the orientation of the principal axis of the first retarder, such as an arctangent $\psi(\sigma)$ of a rate of a change in amplitude rate as one of the ellipsometric parameters, and a rate of change in amplitude rate caused by scattering of light due to particles.

(8) In another case of calibrating the retardation of the retarder by use of light for use in measurement, the foregoing measurement method using the two retarders includes a step of acquiring data showing the relation between the retardation ($\phi_1(\sigma)$) of the first retarder and the retardation ($\phi_2(\sigma)$) of the second retarder, wherein the retardation ($\phi_1(\sigma)$) of the first retarder and the retardation ($\phi_2(\sigma)$) of the second retarder are obtained from the spectral intensity and the data showing the relation between the retardation ($\phi_1(\sigma)$) of the first retarder and the retardation ($\phi_2(\sigma)$) of the second retarder, and at least one of the spectropolarization parameters of the object to be measured is then obtained by use of the obtained spectral intensity, the retardation ($\phi_1(\sigma)$) of the first retarder and the retardation ($\phi_2(\sigma)$) of the second retarder.

The "data showing the relation between the retardation ($\phi_1(\sigma)$) of the first retarder and the retardation ($\phi_2(\sigma)$) of the second retarder" is for example a rate between the retardation ($\phi_1(\sigma)$) of the first retarder and the retardation ($\phi_2(\sigma)$) of the second retarder for each wavelength.

"Obtaining the retardation" includes the case of obtaining a parameter equivalent to the retardation. In particular, obtaining a complex function including information as to the retardation corresponds to obtaining a parameter equivalent to the retardation.

According to this spectroscopic polarimetry, it is possible to effectively reduce a measurement error of the spectropolarization parameter caused by variations in retardation of the retarder due to a temperature change or other factors.

(9) The retardation of the retarder may be calibrated by use of a reference value for calibration of the retardation as well as light for use in measurement. In one case of calibrating the retardation in such a manner, the measurement method using the two retarders includes the steps of: acquiring data showing the relation between the retardation variation ($\Delta\phi_1(\sigma)$) of the first retarder and the retardation variation ($\Delta\phi_2(\sigma)$) of the second retarder; and acquiring a reference value ($\phi_1^{(i)}(\sigma)$) for calibration of retardation of the first retarder and a reference value ($\phi_2^{(i)}(\sigma)$) for calibration of retardation of the second retarder, wherein the retardation ($\phi_2(\sigma)$) of the second retarder and the retardation variation ($\Delta\phi_2(\sigma)$) of the second retarder from the reference value ($\phi_2^{(i)}(\sigma)$) for calibration of the retardation are obtained from the obtained spectral intensity; the retardation variation ($\Delta\phi_1(\sigma)$) of the first retarder is obtained by use of the obtained retardation variation ($\Delta\phi_2(\sigma)$) of the second retarder and data showing the relation between the retardation variation ($\Delta\phi_1(\sigma)$) of the first retarder and the retardation variation ($\Delta\phi_2(\sigma)$) of the second retarder; the retardation ($\phi_1(\sigma)$) of the first retarder is obtained from the reference value ($\phi_1^{(i)}(\sigma)$) for calibration of retardation of the first retarder and the obtained retardation variation ($\Delta\phi_1(\sigma)$) of the first retarder, and at least one of the spectropolarization parameters of the object to be measured is obtained by use of the obtained spectral intensity, the retardation ($\phi_2(\sigma)$) of the first retarder and the retardation ($\phi_2(\sigma)$) of the second retarder.

The "data showing the relation between the retardation variation ($\Delta\phi_1(\sigma)$) of the first retarder and the retardation variation ($\Delta\phi_2(\sigma)$) of the second retarder" is for example a rate between the retardation variation ($\Delta\phi_1(\sigma)$) of the first retarder and the retardation variation ($\Delta\phi_2(\sigma)$) of the second retarder for each wavelength. To this rate for each wavelength, it is possible to apply the rate between the retardation ($\phi_1(\sigma)$) of the first retarder and the retardation ($\phi_2(\sigma)$) of the second retarder for each wavelength so long as a medium of the first retarder is the same as that of the second retarder.

The retardation of the second retarder obtained by use of light for use in measurement is accompanied with phase ambiguity by an integer multiple of $2\pi$. Although this does not have an influence on a calculation error of the spectropolarization parameter by itself, phase unwrapping, which is performed in obtaining the retardation of the first retarder from the retardation of the second retarder, may cause a calculation error of retardation of the first retarder, thereby leading to generation of the calculation error of the spectropolarization parameter. Phase unwrapping is a process of determining a value of retardation of the second retarder such that the value of retardation of the second retarder continuously changes over the range of $2\pi$ with respect to a wavelength change. In the case of not using the retardation variation of the second retarder, the retardation of the first retarder is obtained by applying the "data showing the relation between the retardation of the first retarder and the retardation of the second retarder" to the retardation of the second retarder after phase unwrapping. When wavenumber intervals are not sufficiently large during change in value of retardation of the second retarder by $2\pi$ as compared to sampling wavenumber intervals, or when noise is included in the measured value of retardation of the second retarder, the retardation of the second retarder alter phase unwrapping could be calculated by a wrong unit, $2\pi$. If the retardation of the first retarder is obtained from the retardation of the second retarder including the error by the unit of $2\pi$ as thus described, the retardation of the first retarder typically includes an error not by the unit of $2\pi$, and the included error becomes a large error when the spectropolarization parameter is calculated. According to the method for obtaining the retardation variation of the first retarder from the retardation variation of the second retarder, and then obtaining the retarder of the first retardation from the retardation variation of the first retarder and the reference value for calibration of the first retarder, since the retardation variation of the second retarder changes modestly with wavenumber, performing phase unwrapping on the retardation variation of the second retarder is unnecessary, or necessary only in a small frequency, which enables elimination of, or extreme reduction in, the possibility for generation of an error in the retardation variation of the first retarder due to phase unwrapping.

(10) In the spectroscopic polarimetry using the two retarders, the polarizer and the second retarder may be arranged such that an angle between the orientation of the transmission axis of the polarizer and the orientation of a fast axis of the second retarder is 45°.

In the case of arranging the polarizer and the second retarder such that the angle between the orientation of the transmission axis of the polarizer and the orientation of the fast axis of the second retarder is 45°, there is an advantage of simplifying calculation for obtaining the spectropolarization parameter. Meanwhile, in the case of not limiting the angle between the orientation of the transmission axis of the polarizer and the orientation of the fast axis of the second retarder to 45°, there is an advantage of facilitating manufacturing of the optical system since a limit on an assembly error of the optical system is alleviated.

(11) The spectroscopic polarimetry for obtaining at least one of the spectropolarization parameters further includes a step of obtaining a spectral intensity for calibration by use of the polarimetric spectroscope in a state where an object to be measured having an unknown spectropolarization characteristic does not exist in a light path between the projection optical system and the analyzer, wherein at least one of the spectropolarization parameters of the object to be measured is obtained by use of the obtained spectral intensity regarding the object to be measured and the spectral intensity for calibration or data based upon the spectral intensity for calibration.

In obtaining the spectral intensity for calibration, an object to change the spectropolarization state of light may be prevented from existing in the light path between the projection optical system and the analyzer, or an object having a known spectropolarization characteristic may exist in the light path.

(12) In obtaining the spectral intensity for calibration, an analyzer for calibration may be prepared in a position in which light emitted from the projection optical system is received in a state where the object to be measured having an unknown spectropolarization characteristic does not exist in the light path between the projection optical system and the analyzer, and a spectral intensity of light having passed through the analyzer for calibration may be obtained.

When the light path between the projection optical system and the analyzer is bent due to reflection on or inflection in the object to be measured, it is possible to obtain the spectral intensity for calibration by arrangement of the analyzer for calibration in a position in which light emitted from the projection optical system is received in a state where an object to bend the light path as in the case where the object to be measured exists in the light path does not exist. In this case, an object having a known spectropolarization characteristic may also exist in the light path. Further, the analyzer for calibration may be prepared separately from the analyzer for measurement, or the position of the analyzer for measurement may be temporarily changed so that the analyzer for measurement may be used as the analyzer for calibration.

(13) The spectroscopic polarimetry using the spectral intensity for calibration may include a step of obtaining the retardation ($\phi_1(\sigma)$) of the first retarder and the retardation ($\phi_2(\sigma)$) of the second retarder by use of the spectral intensity for calibration, wherein at least one of the spectropolarization parameters of the object to be measured may be obtained by use of the obtained spectral intensity regarding the object to be measured, the retardation ($\phi_1(\sigma)$) of the first retarder, and the retardation ($\phi_2(\sigma)$) of the second retarder, which are obtained by means of the spectral intensity for calibration.

(14) In the foregoing measurement method in which data showing the relation between the retardation ($\phi_1(\sigma)$) of the first retarder and the retardation ($\phi_2(\sigma)$) of the second retarder is acquired by use of the two retarders and the retardation of the retarder is then calibrated by use of light for use in measurement, the spectral intensity for calibration may be obtained by use of the polarimetric spectroscope in a state where the object to be measured having an unknown spectropolarization characteristic does not exist in the light path between the projection optical system and the analyzer, and the data showing the relation between the retardation ($\phi_1(\sigma)$) of the first retarder and the retardation ($\phi_2(\sigma)$) of the second retarder may be obtained by use of the obtained spectral intensity for calibration.

(15) In the foregoing measurement method in which data showing the relation between the retardation variation ($\Delta\phi_1(\sigma)$) of the first retarder and the retardation variation ($\Delta\phi_2(\sigma)$) of the second retarder is acquired by use of the two retarders and the retardation of the retarder is then calibrated by use of a reference value for calibration of the retardation and light for use in measurement, the spectral intensity for calibration may be obtained by use of the polarimetric spectroscope in a state where the object to be measured having an unknown spectropolarization characteristic does not exist in the light path between the projection optical system and the analyzer, and the data showing the relation between the retardation variation ($\Delta\phi_1(\sigma)$) of the first retarder and the retardation variation ($\Delta\phi_2(\sigma)$) of the second retarder may be obtained by use of the obtained spectral intensity for calibration.

(16) In the spectroscopic polarimetry of the present invention, a spectroscopic quasi-Stokes parameter of the object to be measured may be obtained by use of the obtained spectral intensity.

(17) In the spectroscopic polarimetry for obtaining the spectroscopic quasi-Stokes parameter, the plurality of retarders that the projection optical system comprises may be a first retarder and a second retarder. In this case, each of the elements of the projection optical system is arranged such that light emitted from the light source transmits through the polarizer, the second retarder and the first retarder in this order, the orientation of the transmission axis of the polarizer disagrees with the orientation of the principal axis of the second retarder, and the orientation of the principal axis of the second retarder disagrees with the orientation of the principal axis of the first retarder. Further, the spectroscopic polarimetry may include a step of acquiring data showing the relation between the retardation ($\phi_1(\sigma)$) of the first retarder and the retardation ($\phi_2(\sigma)$) of the second retarder. From the obtained spectral intensity, at least one of the spectral intensity component (first spectral intensity component) which nonperiodically vibrates with wavenumber and the spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber, and at least one of the spectral intensity component (second spectral intensity component) which vibrates at a frequency depending upon the difference between the retardation ($\phi_1(\sigma)$) of the first retarder and the retardation ($\phi_2(\sigma)$) of the second retarder with wavenumber, the spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and the spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber, may be obtained. The retardation ($\phi_1(\sigma)$) of the first retarder, the retardation ($\phi_2(\sigma)$) of the second retarder and the spectroscopic quasi-Stokes parameter may then be obtained by use of the data showing the relation between the retardation ($\phi_1(\sigma)$) of the first retarder and the retardation ($\phi_2(\sigma)$) of the second retarder, and each of the obtained spectral intensity components.

The meaning of "obtaining the spectroscopic quasi-Stokes parameter" includes obtaining all or part of four spectroscopic quasi-Stokes parameters $M_0$, $M_1$, $M_2$, $M_3$ (respective definitional equations for these parameters are provided in DETAILED DESCRIPTION OF THE INVENTION). Whether or not all the spectroscopic quasi-Stokes parameters are practically obtained is referred to a choice of a person implementing the spectroscopic polarimetry. However, according to the spectroscopic polarimetry of the present invention, it is possible in theory to obtain all the spectroscopic quasi-Stokes parameters.

For obtaining the spectroscopic quasi-Stokes parameter $M_0(\sigma)$, the first spectral intensity component and a reference amplitude function $m_0(\sigma)$ are needed. For obtaining the spectroscopic quasi-Stokes parameter $M_1(\sigma)$, the third spectral intensity component, the retardation of the second retarder and a reference amplitude function $m_2(\sigma)$ are needed.

For obtaining the spectroscopic quasi-Stokes parameter $M_2(\sigma)$ and $M_3(\sigma)$, at least any one of a group of the second spectral intensity component, the retardations of the first and second retarders and a reference amplitude function $m_-(\sigma)$, a group of the forth spectral intensity component, the retardations of the first and second retarders, and a reference amplitude function $m_+(\sigma)$, and a group of the fifth spectral intensity component, the retardation of the first retarder and a reference amplitude function $m_1(\sigma)$ is needed.

Further, the reference amplitude functions needed for obtaining the spectroscopic quasi-Stokes parameter need to be made usable when the spectroscopic quasi-Stokes parameter is obtained.

According to this spectroscopic polarimetry for obtaining the spectroscopic quasi-Stokes parameter, an active element such as a mechanically moving part or an electric optical modulator for polarization control is not necessary. In the spectroscopic polarimetry, by acquiring a one-time spectral, it is possible in theory to obtain all spectroscopic quasi-Stokes parameter of the object to be measured, and further possible to effectively reduce a measurement error of the spectroscopic quasi-Stokes parameter generated caused by variations in retardation of the retarder due to a temperature change or other factors. By performing further calculation by use of the spectroscopic quasi-Stokes parameters, it is possible to obtain a variety of spectropolarization parameters regarding the object to be measured. Especially in a case where a Mueller matrix of the object to be measured is determined from only two to three parameters at most, an arbitrary spectropolarization parameter can be obtained from the spectroscopic quasi-Stokes parameters.

(18) In the spectroscopic polarimetry for obtaining the spectroscopic quasi-Stokes parameter includes the steps of acquiring data showing the relation between the retardation variation ($\Delta\phi_1(\sigma)$) of the first retarder and the retardation variation ($\Delta\phi_2(\sigma)$) of the second retarder by use of the two retarders; and acquiring a reference value ($\phi_1^{(i)}(\sigma)$) for calibration of retardation of the first retarder and a reference value ($\phi_2^{(i)}(\sigma)$) for calibration of retardation of the second retarder. In the spectroscopic polarimetry, from the obtained spectral intensity, at least one of the spectral intensity component (first spectral intensity component) which non-periodically vibrates with wavenumber and the spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber, and at least one of the spectral intensity component (second spectral intensity component) which vibrates at a frequency depending upon the difference between the retardation ($\phi_1(\sigma)$) of the first retarder and the retardation ($\phi_2(\sigma)$) of the second retarder with wavenumber, the spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and the spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber, may be obtained. The retardation ($\phi_2(\sigma)$) of the second retarder and the retardation variation ($\Delta\phi_2(\sigma)$) of the second retarder from the reference value ($\phi_2^{(i)}(\sigma)$) for calibration may be obtained by use of the obtained spectral intensity. The retardation variation ($\Delta\phi_1(\sigma)$) of the first retarder may be obtained by use of the obtained retardation variation ($\Delta\phi_2(\sigma)$) of the second retarder and data showing the relation between the retardation variation ($\Delta\phi_1(\sigma)$) of the first retarder and the retardation variation ($\Delta\phi_2(\sigma)$) of the second retarder. The retardation ($\phi_1(\sigma)$) of the first retarder may be obtained from the reference value ($\phi_1^{(i)}(\sigma)$) for calibration of retardation of the first retarder and the obtained retardation variation ($\Delta\phi_1(\sigma)$) of the first retarder. The spectroscopic quasi-Stokes parameter may be obtained by use of each of the obtained spectral intensity components, the retardation ($\phi_1(\sigma)$) of the first retarder and the retardation ($\phi_2(\sigma)$) of the second retarder.

(19) A polarimetric spectroscope of the present invention comprises: a projection optical system, comprising a light source, a polarizer and a plurality of retarders, where the light source, the polarizer and the plurality of retarders are arranged such that light emitted from the light source is irradiated on the object to be measured after passing through the polarizer and the plurality of retarders in this order; an analyzer for allowing light to transmit therethrough, the light having been emitted from the projection optical system and reflected on or transmitted through the object to be measured; and a means of obtaining the spectral intensity of the light having transmitted through the analyzer.

According to this polarimetric spectroscope, the direction of light that transmits through the retarder is unsusceptible to the object to be measured, enabling spectroscopic polarimetry with high stability.

(20) In this polarimetric spectroscope, the plurality of retarders that the projection optical system comprises may be a first retarder and a second retarder. In this case, each of the elements of the projection optical system is arranged such that light emitted from the light source transmits through the polarizer, the second retarder and the first retarder in this order, the orientation of a transmission axis of the polarizer disagrees with the orientation of a principal axis of the second retarder, and the orientation of the principal axis of the second retarder disagrees with the orientation of a principal axis of the first retarder.

(21) In the polarimetric spectroscope using the two retarders, the polarizer and the second retarder may be arranged such that an angle between the orientation of the transmission axis of the polarizer and the orientation of a fast axis of the second retarder is 45°.

(22) The spectroscopic polarimetry of the present invention may comprise: an analyzer for calibration, detachably provided in a position in which light emitted from the projection optical system is received in a state where an object to be measured having an unknown spectropolarization characteristic does not exist in the light path between the projection optical system and the analyzer; and a means of obtaining the spectral intensity of the light having transmitted through the analyzer for calibration.

Here, the whole or part of the "means of obtaining the spectral intensity of the light having transmitted through the analyzer" may double as the "means of obtaining the spectral intensity of the light having transmitted through the analyzer for calibration".

Also when the light path between the projection optical system and the analyzer is bent due to reflection on or inflection in the object to be measured, the use of this polarimetric spectroscope enables calibration even in a state where an object to bend the light path, in the same manner as in the case of existence of the object to be measured, does not exist in the light path. In this case, an object having a known spectropolarization characteristic may exist in the light path. It is therefore possible to perform calibration by singly using the device, prior to installation of the object to be measured in the device, or installation of the device on the object to be measured.

(23) The polarimetric spectroscope of the present invention may further comprise an optical fiber for projecting light which guides the light emitted from the light source to the polarizer.

According to this spectroscopic polarimetry, the light source can be installed in a position apart from the measurement place, thereby facilitating size reduction in a portion of the polarimetric spectroscope, the portion being used in the vicinity of the measurement place.

(24) In the polarimetric spectroscope of the present invention, the means of obtaining a spectral intensity may comprise a light-reception element or a spectrometer, and may further comprise an optical fiber for receiving light which guides the light having transmitted through the analyzer to the light-reception element or the spectrometer.

According to this polarimetric spectroscope, the light source can be installed in a position apart from the measurement place, thereby facilitating size reduction in a portion of the polarimetric spectroscope, the portion being used in the vicinity of the measurement place.

(25) A spectroscopic polarimeter of the present invention comprises the foregoing polarimetric spectroscope of the present invention and an arithmetic unit for obtaining at least one of spectropolarization parameters of an object to be measured, by use of a spectral intensity of light having transmitted through an analyzer.

(26) In the spectroscopic polarimeter of the present invention, the plurality of retarders that the projection optical system comprises may be a first retarder and a second retarder. In this case, each of the elements of the projection optical system is arranged such that light emitted from the light source transmits through the polarizer, the second retarder and the first retarder in this order, the orientation of a transmission axis of the polarizer disagrees with the orientation of a principal axis of the second retarder, and the orientation of the principal axis of the second retarder disagrees with the orientation of a principal axis of the first retarder. Further, the arithmetic unit of this spectroscopic polarimeter is made capable of using data showing the relation between the retardation ($\phi_1(\sigma)$) of the first retarder and the retardation ($\phi_2(\sigma)$) of the second retarder. The retardation ($\phi_1(\sigma)$) of the first retarder and the retardation ($\phi_2(\sigma)$) of the second retarder may be obtained from the spectral intensity of the light having transmitted through the analyzer and the data showing the relation between the retardation ($\phi_1(\sigma)$) of the first retarder and the retardation ($\phi_2(\sigma)$) of the second retarder. At least one of the spectropolarization parameters of the object to be measured may then be obtained by use of the spectral intensity of the light having transmitted through the analyzer, the retardation ($\phi_1(\sigma)$) of the first retarder and the retardation ($\phi_2(\sigma)$) of the second retarder.

(27) In the spectroscopic polarimeter of the present invention, the plurality of retarders that the projection optical system comprises may be a first retarder and a second retarder. The arithmetic unit is made capable of using data showing the relation between the retardation variation ($\Delta\phi_1(\sigma)$) of the first retarder and the retardation variation ($\Delta\phi_2(\sigma)$) of the second retarder, a reference value ($\phi_1^{(i)}(\sigma)$) for calibration of retardation of the first retarder and a reference value ($\phi_2^{(i)}(\sigma)$) for calibration of retardation of the second retarder. The retardation ($\phi_2(\sigma)$) of the second retarder and the retardation variation ($\Delta\phi_2(\sigma)$) of the second retarder from the reference value ($\phi_2^{(i)}(\sigma)$) for calibration may be obtained from the spectral intensity of the light having transmitted through the analyzer, the retardation variation ($\Delta\phi_1(\sigma)$) of the first retarder may be obtained by use of the obtained retardation variation ($\Delta\phi_2(\sigma)$) of the second retarder and data showing the relation between the retardation variation ($\Delta\phi_1(\sigma)$) of the first retarder and the retardation variation ($\Delta\phi_2(\sigma)$) of the second retarder, the retardation ($\phi_1(\sigma)$) of the first retarder may be obtained from the reference value ($\phi_1^{(i)}(\sigma)$) for calibration of retardation of the first retarder and the obtained retardation variation ($\Delta\phi_1(\sigma)$) of the first retarder. At least one of the spectropolarization parameters of the object to be measured may then be obtained by use of the obtained spectral intensity, the retardation ($\phi_1(\sigma)$) of the first retarder and the retardation ($\phi_2(\sigma)$) of the second retarder.

(28) An optical device of the present invention comprises: a projection optical system, comprising a polarizer and a plurality of retarders, where the polarizer and the plurality of retarders are arranged such that light incident on the polarizer is irradiated on the object to be measured after passing through the polarizer and the plurality of retarders in this order; and an analyzer for allowing light to transmit therethrough, the light having been emitted from the projection optical system and reflected on or transmitted through the object to be measured.

Such an optical device can be used for the foregoing polarimetric spectroscope.

(29) A light-projection device of the present invention comprises a polarizer and a plurality of retarders, wherein the polarizer and the plurality of retarders are arranged such that light incident on the polarizer is irradiated on the object to be measured after passing through the polarizer and the plurality of retarders in this order.

Such a light-projection device can be used for the foregoing polarimetric spectroscope.

(30) In this light-projection device, the plurality of retarders may be a first retarder and a second retarder. Each of the elements of the light-projection device may be arranged such that light incident on the polarizer transmits through the polarizer, the second retarder and the first retarder in this order, the orientation of a transmission axis of the polarizer disagrees with the orientation of a principal axis of the second retarder, and the orientation of the principal axis of the second retarder disagrees with the orientation of a principal axis of the first retarder.

Next described are a spectroscopic polarimetry, a polarimetric spectroscope and an optical device which make a characteristic of a polarization element or an azimuth angle of an analyzer changeable. The polarization element here refers to a polarization element in a case where the object to be measured is composed of a sample and a polarization element on which light, having transmitted through or been reflected on the sample, is incident. The polarization element is an optical element where incident light and outgoing light have a relation depending upon polarization. For changing the characteristic of the polarization element, it is possible to use, for example, a means of changing the azimuth angle of the polarization element, a means of changing the retardation of the polarization element, and some other means.

(31) In the spectroscopic polarimetry of the present invention, a polarimetric spectroscope further comprising a means of changing the azimuth angle of the analyzer may be used. By use of this polarimetric spectroscope, a spectral intensity regarding the object to be measured may be obtained in a plurality of states where azimuth angles of the analyzer are made different from one another, and at least one of the spectropolarization parameters of the object to be measured may be obtained by use of the obtained spectral intensity.

(32) In the spectroscopic polarimetry of the present invention, an object to be measured including a sample and a polarization element is prepared. The polarimetric spectroscope, further comprising a means of changing the characteristic of the polarization element, is used. By use of this spectroscopic polarimetry, a spectral intensity regarding the object to be measured may be obtained in a plurality of states where characteristics of the polarization element are made different from one another. At least one of spectropolarization parameters of the sample may then be obtained by use of the obtained spectral intensity.

(33) Here, the spectroscopic polarimetry may be used which further comprises a means of changing the azimuth angle of the analyzer in addition to the means of changing the characteristic of the polarization element. By use of this spectroscopic polarimetry, a spectral intensity regarding the object to be measured may be obtained in a plurality of states where characteristics of the polarization element or azimuth angles of the analyzer are made different from one another. At least one of spectropolarization parameters of the sample may then be obtained by use of the obtained spectral intensity.

(34) The polarimetric spectroscope of the present invention may further comprise a means of changing the azimuth angle of the analyzer. This polarimetric spectroscope may be combined with an arithmetic unit for obtaining at least one of spectropolarization parameters of the object to be measured by use of this spectroscopic polarimetry a spectral intensity regarding the object to be measured obtained in a plurality of states where azimuth angles of the analyzer are made different from one another, to give a spectroscopic polarimeter.

(35) In a case where the object to be measured includes a sample and a polarization element, the polarimetric spectroscope of the present invention may further comprise a means of changing the characteristic of the polarization element. This polarimetric spectroscope may be combined with an arithmetic unit for obtaining at least one of spectropolarization parameters of the sample by use of a spectral intensity regarding the object to be measured obtained in a plurality of states where characteristics of the polarization element are made different from one another, to give a spectroscopic polarimeter.

(36) Here, the spectroscopic polarimetry may further comprise a means of changing the azimuth angle of the analyzer in addition to the means of changing the characteristic of the polarization element. This polarimetric spectroscope may be combined with an arithmetic unit for obtaining at least one of spectropolarization parameters of the sample by use of a spectral intensity regarding the object to be measured obtained in a plurality of states where characteristics of the polarization element or azimuth angles of the analyzers are made different from one another, to give a spectroscopic polarimeter.

(37) The optical device of the present invention may further comprise a means of changing the azimuth angle of the analyzer.

(38) In a case where the object to be measured includes a sample and a polarization element, the optical device of the present invention may further comprise a means of changing the characteristic of the polarization element.

(39) Here, the optical device may further comprise a means of changing the azimuth angle of the analyzer in addition to the means of changing the characteristic of the polarization element.

As thus described, by making the characteristic of the polarization element or the azimuth angle of the analyzer changeable, it is possible to obtain a spectral intensity in a plurality of states where characteristics of the polarization element or azimuth angles of the analyzers are made different from one another. Thereby, from the spectral intensity obtained in a state where the number of characteristics of the polarizer or the number of azimuth angles of the analyzer is relatively small, a relatively many kinds of spectropolarization parameters can be obtained, and an error due to an influence such as noise included in the obtained value of the spectropolarization parameter can be reduced. Or, the characteristic of the polarizer or the azimuth angle of the analyzer can be selected such that a specific one or more than one kinds of spectropolarization parameters of the object to be measured or the sample can be obtained with high sensitivity.

According to the present invention, it is possible to perform the spectroscopic polarimetry with high stability since the direction of light that transmits through the retarder is not susceptible to the object to be measured.

BRIEF DESCRIPTION OF THE DRAWINGS

FIGS. 1A and 1B show a view for explaining a principle of solving a problem.

FIGS. 18A and 18B show a view for explaining a principle of solving the problem in the case of allowing light to transmit through the sample.

FIGS. 25A and 25B show a view (No. 2) for explaining variations in wave surface of the light that passes through the retarder in the incident direction.

DETAILED DESCRIPTION OF THE INVENTION

Figure 2:
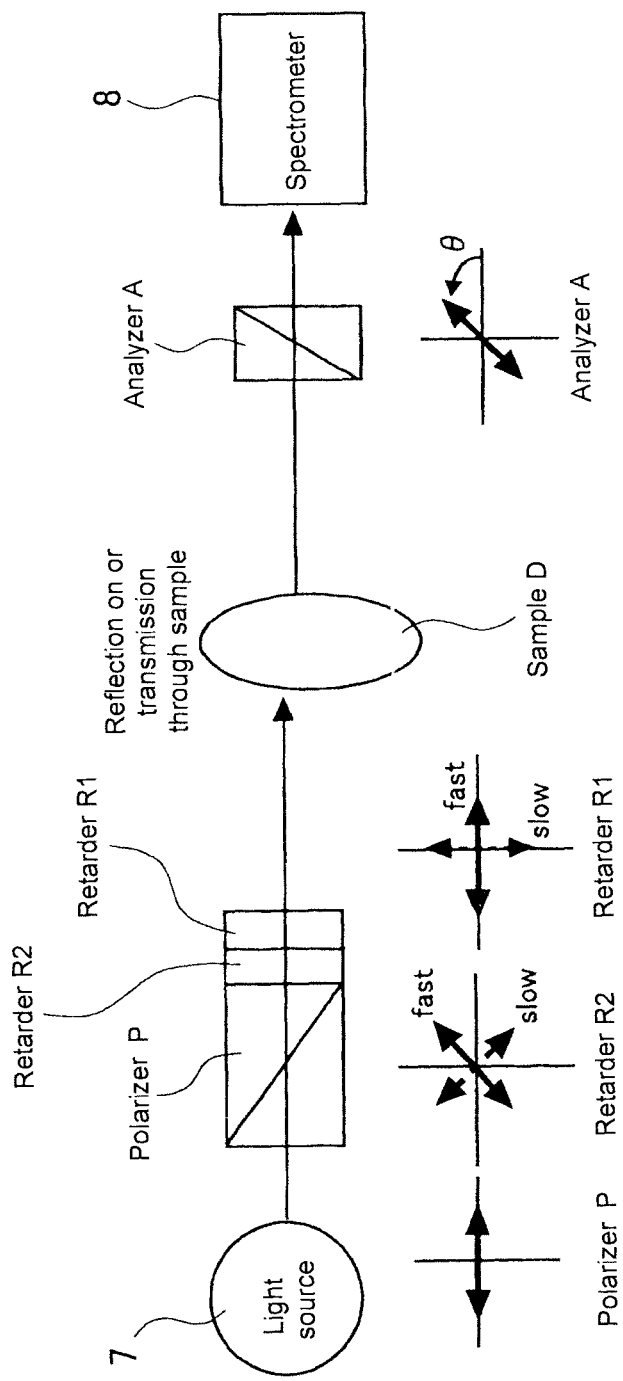
FIG. 2 shows a view for explaining a configuration of an optical system device and an azimuth angle of each optical element.

In the following, one preferred embodiment of the present invention is specifically described with reference to attached drawings (FIGS. 1 to 19).

Chapter 1: Principle of Channeled Spectroscopic Polarimetry 1.1 Constitution of Optical System in Present Invention FIG. 1 shows a view for explanation comparing a configuration of an optical system in a conventional channeled spectroscopic polarimetry and a configuration of an optical system in a channeled spectroscopic polarimetry of the embodiment of the present invention. The optical system (cf. FIG. 1B) in the conventional channeled spectroscopic polarimetry is comprised of a light source 7, a polarizer P, and a polarimeter. The polarimeter is comprised of two thick retarders R1 and R2, an analyzer A and a spectrometer 8. It is to be noted that reference symbol D denotes a sample through which light is transmitted or on which light is reflected. Here, fast axes of the retarder R1 and the retarder R2 are inclined at an angle of 45° from each other. Meanwhile, a transmission axis of the analyzer A agrees with the fast axis of the retarder R1.

It is to be noted that crossing angles among these three elements may not necessarily be 45°. Measurement is possible even with a different crossing angle, although less efficient to some extent. In short, any crossing angle can be applied so long as principal axes of the adjacent elements are not superposed on each other. A description in this respect is given later. What is important is that each element is fixed and thus not required to be rotated or modulated as in the conventional method.

Light having a broad spectrum is emitted from the light source 7 on the left side of the figure, transmits through the polarizer and is reflected on or transmits through the sample D before being incident on the polarimeter. Thereafter, the light is incident on the polarimeter. A spectral distribution of state of polarization (SOP) of the light having been emitted from the sample D can be expressed by spectrometric Stokes parameters $S_0(\sigma)$, $S_1(\sigma)$, $S_2(\sigma)$, and $S_3(\sigma)$. Here, $\sigma$ is a "wavenumber" defined by an inverse number of a wavelength $\lambda$. Further, coordinate axes x and y for determining the spectrometric Stokes parameters is taken so as to agree with the fast and late axes of the retarder R1.

The light incident on the spectrometer passes in this order through the retarders R1 and R2 and the analyzer A, and is incident on the polarimeter 8. The Stokes parameters depending upon the wavenumber $\sigma$ are obtained from a spectrum acquired from the polarimeter 8.

However, the optical system shown in FIG. 1B has caused a problem of a variety of changes in incident direction of the wave surface of the light that transmits through the retarder under the influence of the sample to result in generation of an error in spectroscopic polarimetry. The present invention is provided to solve such a problem.

The optical system of the embodiment of the present invention shown in FIG. 1A is comprised of the light source 7, the polarizer P, the retarders R2 and R1, the analyzer A and the spectroscope 8. The light emitted from the light source 7 transmits through the polarizer P, the retarder R2 and the retarder R1 in this order, and is reflected on or transmits through the sample D. The light then transmits through the analyzer A, and is incident on the spectroscope 8. Thereafter, a spectrum of the incident light is acquired in the spectroscope 8, and spectropolarization parameters of the sample and the like are calculated according to a later-described procedure.

As described above, in the present specification, the "spectropolarization parameter" is used in the meaning of a parameter for expressing the spectropolarization characteristic of the object to be measured. This is a generic name of parameters for use in quantitatively expressing a polarization change caused by reflection or transmission of light on or through the object to be measured. Examples of the spectropolarization parameter include ellipsometric parameters $\psi(\sigma)$, $\Delta(\sigma)$, and a retardation $\delta(\sigma)$ of a double refraction medium. It should be noted that, although the spectropolarization characteristic of the object to be measured is typically expressed completely by 16 elements of a 4×4 Mueller matrix, there are few cases where all of those 16 elements are independent variables. In the spectroscopic polarimetry, all of those elements are often determined from only two to three parameters at most. In practice, those independent parameters may be obtained as the spectropolarization parameters. Moreover, there are applications in which simply obtaining part of the spectropolarization parameters satisfies the case regardless of whether the parameters are independent or non-independent.

Here, it is important that the retarders R2 and R1 have been arranged on the light-source side with respect to the sample D. This makes it possible to keep the incident direction of the wave surface of light to be incident on the retarder constant so as to realize highly-accurate, stable spectroscopic polarimetry. It should be noted that variations in incident direction of the wave surface of light to be incident on the analyzer A has almost no influence on the measurement result. This leads to solving the foregoing problem of the retardation change due to changes in distance and direction of a light ray that passes through the retarder during calibration of the retardation and during sample measurement.

Next, the embodiment of the present invention is specifically described with reference to FIG. 2. This optical system is comprised of the light source 7, the polarizer P, the retarders R2 and R1, the analyzer A and the spectroscope 8. It is to be noted that reference symbol D denotes a sample. Here, the orientations of the fast axes of the retarders R1 and R2 are inclined at an angle of −45° from each other. Meanwhile, the orientation of a transmission axis of the polarizer P agrees with the orientation of the fast axis of the retarder R1. In the figure, the fast axes of the retarders are denoted by "fast" and the slow axes thereof are denoted by "slow". Further, θ is the azimuth angle of the transmission axis of the analyzer with respect to the fast axis of the retarder R1.

The Mueller matrix of the sample at this time is described as follows.

[Mathematical Expression 1]

$$M(\sigma) = \begin{bmatrix} \hat{m}_{00}(\sigma) & \hat{m}_{01}(\sigma) & \hat{m}_{02}(\sigma) & \hat{m}_{03}(\sigma) \\ \hat{m}_{10}(\sigma) & \hat{m}_{11}(\sigma) & \hat{m}_{12}(\sigma) & \hat{m}_{13}(\sigma) \\ \hat{m}_{20}(\sigma) & \hat{m}_{21}(\sigma) & \hat{m}_{22}(\sigma) & \hat{m}_{23}(\sigma) \\ \hat{m}_{30}(\sigma) & \hat{m}_{31}(\sigma) & \hat{m}_{32}(\sigma) & \hat{m}_{33}(\sigma) \end{bmatrix} \quad (1.1)$$

Further, as parameters for effectively expressing a degree of polarization of light, an ellipticity angle, an azimuth angle, and the like, Stokes Parameters are used. The Stokes Parameters are composed of four parameters having definitions as follows:

$S_0$: total intensity
$S_1$: difference between intensities of linearly polarized light components with angles of 0° and 90°.
$S_2$: difference between intensities of linearly polarized light components with angles ±45°.
$S_3$: difference between intensities of left and right circularly polarized light components.

Figure 3:
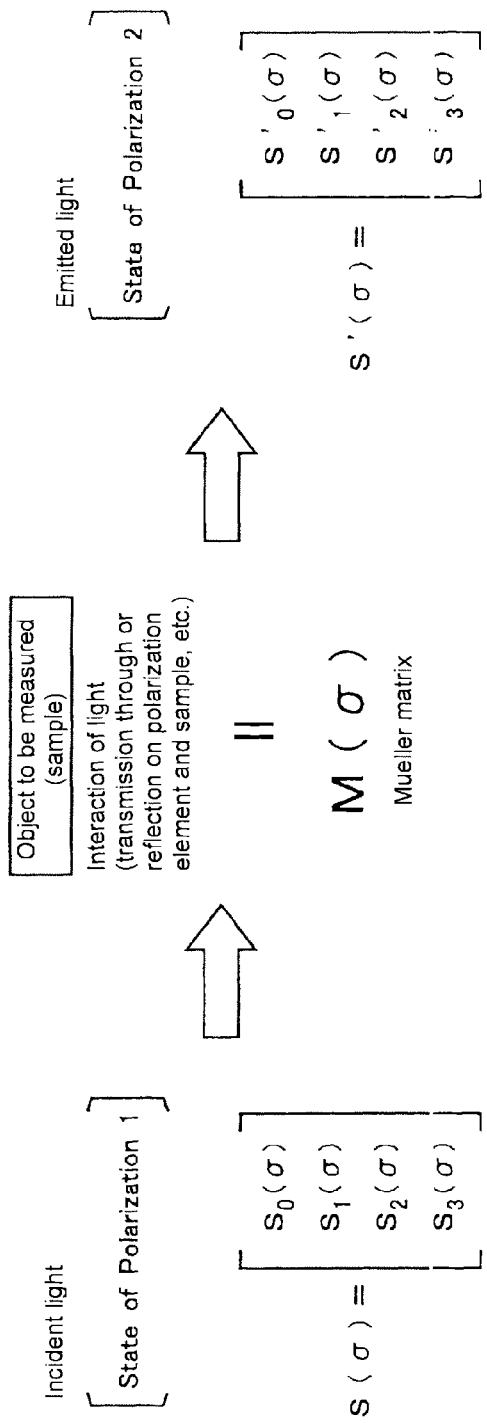
FIGS. 3A and 3B show a view for explaining spectroscopic polarimetry.

In a third-dimensional space where the three mutually orthogonal axes are taken as $S_1$, $S_2$ and $S_3$, assuming a sphere with a radius $S_0$ taking an original point of the axes as a center, an SOP of arbitrary light is expressed as one point in this third-dimensional space and a degree of polarization is expressed by the following expression:

Degree of polarization = (distance from original point to point $(S_1, S_2, S_3))/S_0$ $= (S_1^2 + S_2^2 + S_3^2)^{1/2} / S_0$ Here, the Mueller matrix is described with reference to FIG. 3. The Mueller matrix is a matrix for expressing an interaction of light of reflection, transmission, etc. on or through a sample as an object to be measured. As an example, the following case is considered. Light whose SOP is expressed by S(σ) as a state of polarization 1 is incident on the sample, and comes under the influence of a polarization element and an object to be measured such as the sample. Light is then emitted whose SOP is expressed by S'(σ) as a state of polarization 2 (cf. FIG. 3A). Here, the Mueller matrix of the object to be measured is expressed by a relational expression as a 4×4 matrix shown in FIG. 3B (cf. FIG. 3B).

In the following described is a procedure for obtaining a spectropolarization parameter of the sample from the foregoing Mueller matrix or the like.

Before the procedure for obtaining a spectropolarization parameter of the sample is described, characteristics of the retarders R1 and R2 are formulated as preparation for the description. A retarder is an element having the property of changing a phase difference between mutually orthogonal linearly polarized light components before and after transmission of light through the element. An amount of such a change in phase difference is referred to as retardation. Further, coordinate axes taken along the two linearly polarized light directions are referred to as principal axes. Among them, the axis along the linearly polarized light whose phase relatively moves fast is referred to as a fast axis, and the other axis is referred to as a slow axis.

The retardation of a retarder $R_j$ (j=1, 2) made of a double refraction medium changes with wavenumber σ as expressed in the following expression:

$$\phi_j(\sigma) = 2\pi d_j B(\sigma)\sigma = 2\pi L_j \sigma + \phi_j(\sigma) \quad (1.2)$$

[Mathematical Expression 2]

$$L_j = \frac{1}{2\pi} \frac{d\phi_j}{d\sigma}\bigg|_{\sigma_0} = d_j\left(B(\sigma_0) + \frac{dB}{d\sigma}\bigg|_{\sigma_0} \sigma_0\right) \quad (1.3a)$$

$$\Phi_j(\sigma) = \{\phi_j(\sigma_0) - 2\pi L_j \sigma_0\} + \frac{1}{2}\frac{d^2\phi_j}{d\sigma^2}\bigg|_{\sigma_0}(\sigma - \sigma_0)^2 + \ldots \quad (1.3b)$$

where $d_j$ is a thickness of $R_j$, and B(σ) is its double refraction. Further, $\sigma_0$ indicates a center wavenumber of light under measurement. Hereinafter, the retardation $\phi_j(\sigma)$ of the retarder is referred to as a reference phase function.

Assuming now that dispersion (change rate with wavenumber) of B(σ) is not so large, as seen from the expression (1.2), φ(σ) increases almost linearly with respect to wavenumber a. Such a property serves as a basis of measurement of the spectropolarization parameter of the sample in a later-described procedure.

1.2 Channeled Spectrum Acquired in Spectrometer

In the "channeled spectroscopic polarimeter" (polarimetric spectroscope) shown in FIG. 2, a spectrum (spectral intensity) acquired in the spectrometer 8 is expressed by the following expression.

[Mathematical Expression 3]

$$P(\sigma) = \frac{1}{2}m_0(\sigma)M_0(\sigma) + \qquad (1.4)$$
$$\frac{1}{4}m_-(\sigma)|M_{23}(\sigma)|\cos\{\phi_2(\sigma) - \phi_1(\sigma) + \arg(M_{23}(\sigma))\} +$$
$$\frac{1}{2}m_2(\sigma)M_1(\sigma)\cos\phi_2(\sigma) -$$
$$\frac{1}{4}m_+(\sigma)|M_{23}(\sigma)|\cos\{\phi_2(\sigma) + \phi_1(\sigma) - \arg(M_{23}(\sigma))\}$$

where $$M_{23}(\sigma) = M_2(\sigma) + iM_3(\sigma) \qquad (1.5)$$

[Mathematical Expression 4]

$$M_0(\sigma) = \frac{1}{2}P_0(\sigma)[\hat{m}_{00}(\sigma) + \hat{m}_{10}(\sigma)\cos 2\theta + \hat{m}_{20}(\sigma)\sin 2\theta] \qquad (1.6a)$$

$$M_1(\sigma) = \frac{1}{2}P_0(\sigma)[\hat{m}_{01}(\sigma) + \hat{m}_{11}(\sigma)\cos 2\theta + \hat{m}_{21}(\sigma)\sin 2\theta] \qquad (1.6b)$$

$$M_2(\sigma) = \frac{1}{2}P_0(\sigma)[\hat{m}_{02}(\sigma) + \hat{m}_{12}(\sigma)\cos 2\theta + \hat{m}_{22}(\sigma)\sin 2\theta] \qquad (1.6c)$$

$$M_3(\sigma) = \frac{1}{2}P_0(\sigma)[\hat{m}_{03}(\sigma) + \hat{m}_{13}(\sigma)\cos 2\theta + \hat{m}_{23}(\sigma)\sin 2\theta] \qquad (1.6d)$$

Here, $M_0(\sigma)$ to $M_3(\sigma)$ are referred to as spectroscopic quasi-Stokes parameters of the sample. As thus described, the spectroscopic quasi-Stokes parameter is expressed by the sum of values each obtained by multiplying each element of each column of the Mueller matrix of the sample by a coefficient determined by an azimuth of the analyzer. The spectropolarization parameter of the sample can be obtained by simultaneously solving the equations of 1.6a to 1.6d. $m_0(\sigma)$, $m_-(\sigma)$, $m_2(\sigma)$, and $m_+(\sigma)$ each shows a ratio of amplitude attenuation due to failure of the spectrometer to follow a fine vibration component. $P_0(\sigma)$ shows a "spectrum of the light source". However, in the optical system, attenuation exists caused by the retarder, the polarizer, a lens, a fiber or the like. Therefore, in the present specification, the "spectrum of the light source" $P_0(\sigma)$ includes the attenuated portion. Further, $\phi_1$ and $\phi_2$ are retardations of the retarder R1 and R2.

The elements of the Mueller matrix of the sample included in $M_0(\sigma)$ to $M_3(\sigma)$ are each relative to "each column" of the Mueller matrix $M(\sigma)$.

[Mathematical Expression 5]

$$M(\sigma) = \begin{bmatrix} \hat{m}_{00}(\sigma) & \hat{m}_{01}(\sigma) & \hat{m}_{02}(\sigma) & \hat{m}_{03}(\sigma) \\ \hat{m}_{10}(\sigma) & \hat{m}_{11}(\sigma) & \hat{m}_{12}(\sigma) & \hat{m}_{13}(\sigma) \\ \hat{m}_{20}(\sigma) & \hat{m}_{21}(\sigma) & \hat{m}_{22}(\sigma) & \hat{m}_{23}(\sigma) \\ \hat{m}_{30}(\sigma) & \hat{m}_{31}(\sigma) & \hat{m}_{32}(\sigma) & \hat{m}_{33}(\sigma) \end{bmatrix} \qquad (1.7)$$

Information inside the frames (sum of values each obtained by multiplying each element of each column by a coefficient determined by an azimuth angle (θ) of the analyzer A can be demodulated.

While 16 elements exist in the 4×4 Mueller matrix, it is extremely rare that all those elements are independent. In many cases, in polarimetry, only two to three independent parameters at most are included in the Mueller matrix of the sample. Even with a spectrum intensity of the light source included, the total number of parameters required to be measured is often as small as four at most. It is therefore possible by simultaneously solving obtained four equations to obtain up to four parameters, which are independent from each other and show the polarization characteristic of the sample.

For the sake of understanding the property of this expression, Expression (1.2) is substituted therein as follows.

[Mathematical Expression 6]

$$P(\sigma) = \frac{1}{2}m_0(\sigma)M_0(\sigma) + \qquad (1.8)$$
$$\frac{1}{4}m_-(\sigma)|M_{23}(\sigma)|\cos[2\pi L_-\sigma + \Phi_-(\sigma) + \arg\{M_{23}(\sigma)\}] +$$
$$\frac{1}{2}m_2(\sigma)M_1(\sigma)\cos[2\pi L_2\sigma + \Phi_2(\sigma)] -$$
$$\frac{1}{4}m_+(\sigma)|M_{23}(\sigma)|\cos[2\pi L_+\sigma + \Phi_+(\sigma) - \arg\{M_{23}(\sigma)\}]$$

where it is found that the following expressions are satisfied.

$$L_- = L_2 - L_1 \qquad (1.9a)$$

$$L_+ = L_2 + L_1 \qquad (1.9b)$$

$$\phi_-(\sigma) = \phi_2(\sigma) - \phi_1(\sigma) \qquad (1.9c)$$

$$\phi_+(\sigma) = \phi_2(\sigma) + \phi_1(\sigma) \qquad (1.9d)$$

Figure 4:
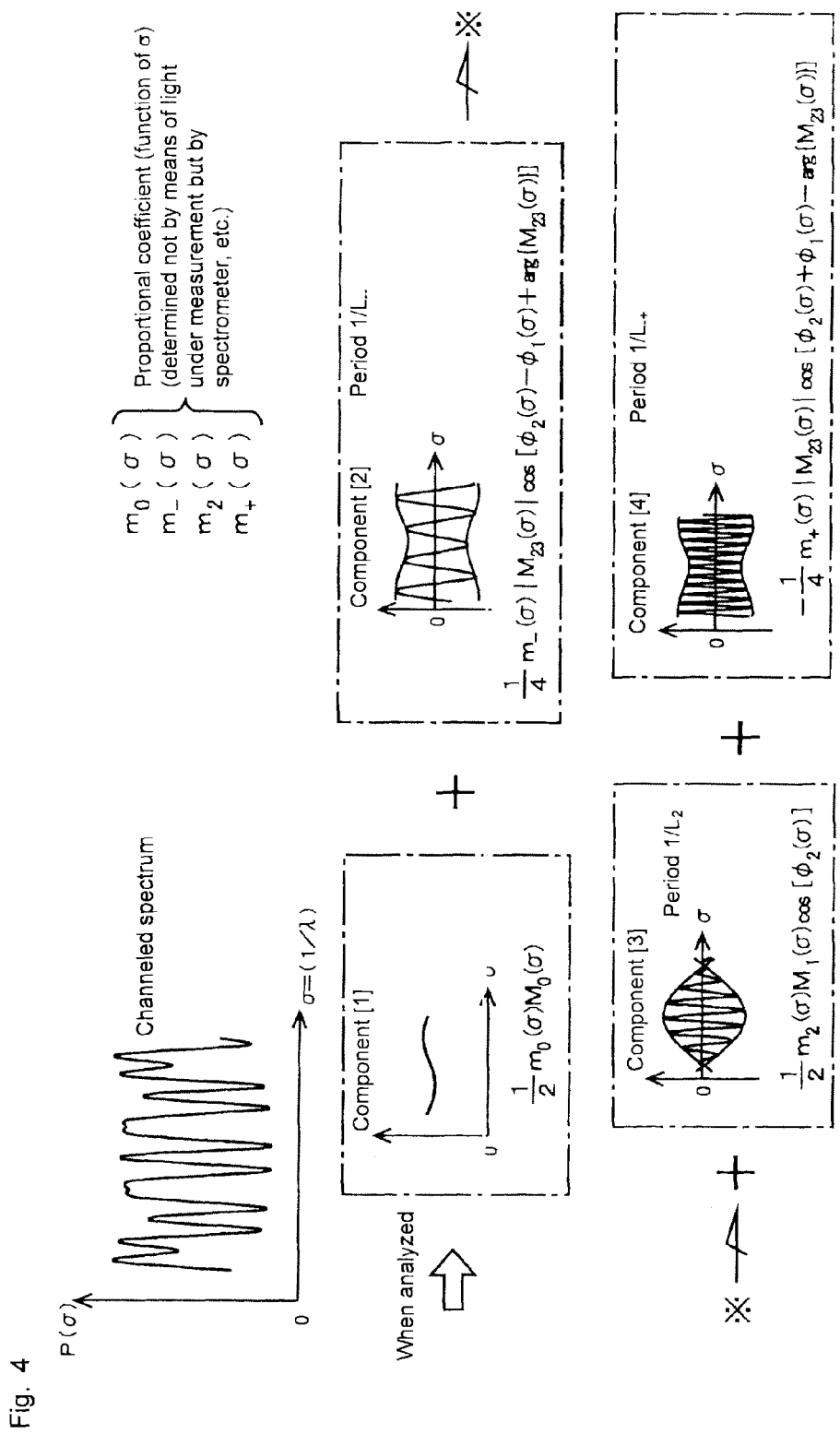
FIG. 4 shows a view for explaining a relation between a channeled spectrum obtained from a spectrometer and its four components.

As seen from Expression (1.8), the spectrum $P(\sigma)$ obtained from the spectrometer contains four components. One of them is a component gently varies with wavenumber σ, and the other three components are quasi-sinusoidal components that vibrate with wavenumber σ. These are schematically shown in FIG. 4.

Here, the central periods of each of the three vibration components are respectively $1/L_-$, $1/L_2$ and $1/L_+$. The spectrum containing components that periodically finely vibrate with wavenumber (wavelength) as in the figure is referred to as a channeled spectrum.

What needs to be concerned here is that these four components have information of any one of $M_0(\sigma)$, $M_1(\sigma)$ and $M_{23}(\sigma)$. When each component can be separated, it is possible to determine all the spectroscopic quasi-Stokes parameters $M_0(\sigma)$, $M_1(\sigma)$, $M_2(\sigma)$ and $M_3$ from one spectrum $P(\sigma)$.

1.3 When Crossing Angle Between Elements is not 45°

Next described is a spectrum acquired in the spectrometer 5 when a crossing angle between the elements is not 45°.

Here also described as a supplemental explanation is a spectrum obtained when a crossing angle between each element in the optical system is not 45°.

It is assumed now that, in the optical system in FIG. 2, the angle formed between the fast axes of the retarders R1 and R2 is $\theta_{RR}$ and the angle formed between the fast axis of the retarder R2 and the transmission axis of the polarizer P is $\theta_{PR}$. So far, the calculation has been made only in a limited case of $\theta_{RR} = -45°$ and $\theta_{PR} = 45°$. Below, a case where those angles are more common ones is shown.

An expression for the obtained channeled spectrum $P(\sigma)$ is given as follows.

[Mathematical Expression 7]

$$P(\sigma) = \quad (1.10)$$
$$\frac{1}{2}m_0(\sigma)[M_0(\sigma) + \underline{\cos 2\theta_{PR}\cos 2\theta_{RR}M_1(\sigma)}] - \frac{1}{2}(\sin 2\theta_{PR}\sin^2\theta_{RR})$$
$$m_-(\sigma)|M_{23}(\sigma)|\cos[\phi_2(\sigma) - \phi_1(\sigma) + \arg\{M_{23}(\sigma)\}] -$$
$$\frac{1}{2}(\sin 2\theta_{PR}\sin 2\theta_{RR})m_2(\sigma)M_1(\sigma)\cos[\phi_2(\sigma)] +$$
$$\frac{1}{2}(\sin 2\theta_{PR}\cos^2\theta_{RR})m_+(\sigma)|M_{23}(\sigma)|$$
$$\cos[\phi_2(\sigma) + \phi_1(\sigma) - \arg\{M_{23}(\sigma)\}] +$$
$$\frac{1}{2}(\cos 2\theta_{PR}\sin 2\theta_{RR})m_1(\sigma)|M_{23}(\sigma)|\cos[\phi_1(\sigma) - \arg\{M_{23}(\sigma)\}]$$

When this expression is compared with the spectrum in the previous expression (1.4), namely when the angles $\theta_{PR}$ and $\theta_{PR}$ are respectively limited to −45° and 45°, the following differences are found in addition to a mere difference in constant multiple of a coefficient. It is to be noted that the different part is indicated by an underline in Expression (1.10).

The component that gently varies with wavenumber σ depends not only upon $M_0(\sigma)$ but additionally upon $M_1(\sigma)$.

A component that quansi-sinusoidally vibrates according to the phase $\phi_1(\sigma)$, namely a component that vibrates at a central period $1/L_1$, is added. It should be noted that this component has information of $M_{23}(\sigma)$, as in the cases of the two respective components that vibrate according to $(\phi_2(\sigma)-\phi_1(\sigma))$ and $(\phi_2(\sigma)+\phi_1(\sigma))$. It means that this term can be treated in the same manner as the other two terms including $M_{23}(\sigma)$.

Here, conditions for nonappearance of the above two components are considered.

The former term appears in a limited case "where both $\theta_{RR}\neq\pm 45°$ and $\theta_{PR}\neq\pm 45°$ are satisfied". In the meantime, the latter term appears in a case "where $\theta_{PR}\neq\pm 45°$ "(regardless of whether $\theta_{RR}$ agrees with ±45° or not)". From these, the following fact can be mentioned.

When the fast axis of the retarder R2 and the transmission axis of the polarizer P cross each other at an angle of 45° (i.e. $\theta_{PR}=\pm 45°$), the channeled spectrum is given by Expression (1.4) except for the difference in constant multiple of the coefficient of each term. Here, whether the angle $\theta_{RR}$ formed between the principle axes of the retarders R1 and R2 agrees with ±45° or not is irrelevant.

In other words, the channeled spectrum can take the form of Expression (1.4) under a condition that the fast axis of the retarder R2 and the transmission axis of the polarizer P cross each other at an angle of ±45°. Meanwhile, whether the angle formed between the fast axes of the retarders R1 and R2 agrees with ±45° or not is irrelevant.

1.4 When the Number of Retarders is Three or More

The case where the number of retarders is two was described above regarding the spectrum acquired in the spectrometer 5. In the same manner as this case, a spectrum having information of a spectroscopic quasi-Stokes parameter particular to each component is obtained in a case where the number of retarders is three or more. As in the case of the number of retarders is two, each element is separated so as to demodulate all spectroscopic quasi-Stokes parameters from one spectrum P(σ). By simultaneously solving the obtained expressions, it is possible to obtain a spectropolarization parameter of the sample.

1.5 Procedure for Demodulating Spectrometric Stokes Parameter

Figure 5:
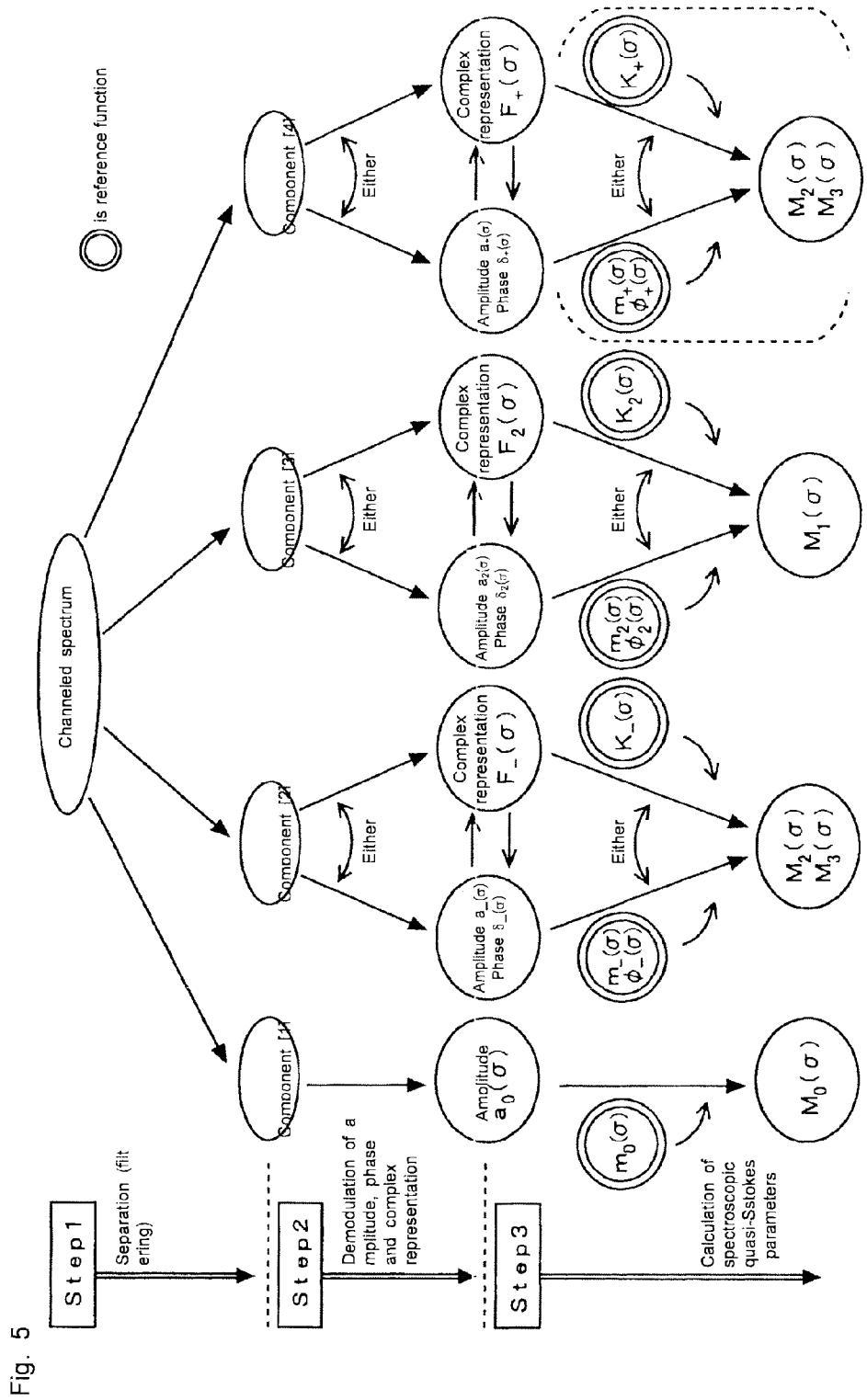
FIG. 5 shows a view for explaining a procedure (flows of signal processing) for demodulating a spectrometric quasi-Stokes parameter.

A specific procedure for demodulating a spectrometric quasi-Stokes parameter is described below with reference to FIG. 5. A brief description of the flow of the procedure is as follows.

Step 1: Each term is separated from Spectrum P(σ).

Step 2: An amplitude and a phase of each component are obtained. (Or equivalent quantities, e.g. a real part and an imaginary part in complex representation are obtained).

Step 3: Reference functions (below) included in the amplitude and phase of each vibration component are removed.

[Mathematical Expression 8]

$$\text{Reference amplitude function} \begin{cases} m_0(\sigma) \\ m_-(\sigma) \\ m_2(\sigma) \\ m_+(\sigma) \end{cases}$$

$$\text{Reference phase function} \begin{cases} \phi_1(\sigma) \\ \phi_2(\sigma) \end{cases}$$

Spectrometric Stokes parameters $M_0(\sigma)$, $M_1(\sigma)$, $M_2(\sigma)$, and $M_3(\sigma)$ are then obtained (These reference functions are peculiar to the polarimeter, depending not upon the sample but only upon parameters of the polarimeter.

Each of the steps is described as follows.

[Step 1]

As described in the previous section, the spectrum P(σ) contains four components. An operation for taking out each component by a signal processing is performed. What is applied to this operation is that each component vibrates at a different period (frequency). With the use of (any one of) a variety of frequency filtering techniques being broadly used in fields of communication engineering, signal analysis and the like, it is possible to separate each component.

[Mathematical Expression 9]

Component [1] (low frequency component) (1.11a)
$$\frac{1}{2}m_0(\sigma)M_0(\sigma)$$

Component [2] (central period $1/L_-$) (1.11b)
$$\frac{1}{4}m_-(\sigma)|M_{23}(\sigma)|\cos[\phi_2(\sigma) - \phi_1(\sigma) + \arg\{M_{23}(\sigma)\}]$$

Component [3] (central period $1/L_2$) (1.11c)
$$\frac{1}{2}m_2(\sigma)M_1(\sigma)\cos[\phi_2(\sigma)]$$

Component [4] (central period $1/L_+$) (1.11d)
$$-\frac{1}{4}m_+(\sigma)|M_{23}(\sigma)|\cos[\phi_2(\sigma) + \phi_1(\sigma) - \arg\{M_{23}(\sigma)\}]$$

Component [1] above is a first spectral intensity component which nonperiodically vibrates with wavenumber. Component [2] is a second spectral intensity component which vibrates at a frequency depending upon a difference between a reference phase function (retardation) $\phi_1(\sigma)$ of the first retarder R1 and a reference phase function (retardation) $\phi_2(\sigma)$ of the second retarder R2 with wavenumber. Component [3] is a third spectral intensity component which vibrates at a frequency depending upon the reference phase function $\phi_2(\sigma)$ of the second retarder and not depending upon the reference phase function $\phi_1(\sigma)$ of the first retarder, with wavenumber. Component [4] is a fourth spectral intensity component which vibrates at a frequency depending upon the sum of the reference phase function $\phi_1(\sigma)$ of the first retarder and the reference phase function $\phi_2(\sigma)$ of the second retarder with wavenumber. It is to be noted that, when the crossing angle between the elements is not 45°, Component [5] is generated. Component [5] vibrates at a frequency depending upon the reference phase function $\phi_1(\sigma)$ of the first retarder and not depending upon the reference phase function $\phi_2(\sigma)$ of the second retarder, with wavenumber.

With reference to Expressions (1.11a) to (1.11d) and Expression (1.5), it is found that $M_0$ is obtained from Component [1], $M_1$ is from Component [3], $M_2$ and $M_3$ are from Component [2] or Component [4]. It should be noted that, when the crossing angle between the elements is not 45°, $M_2$ and $M_3$ are obtained at least one of Component [2], Component [4] and Component [5].

[Step 2]

Figure 6:
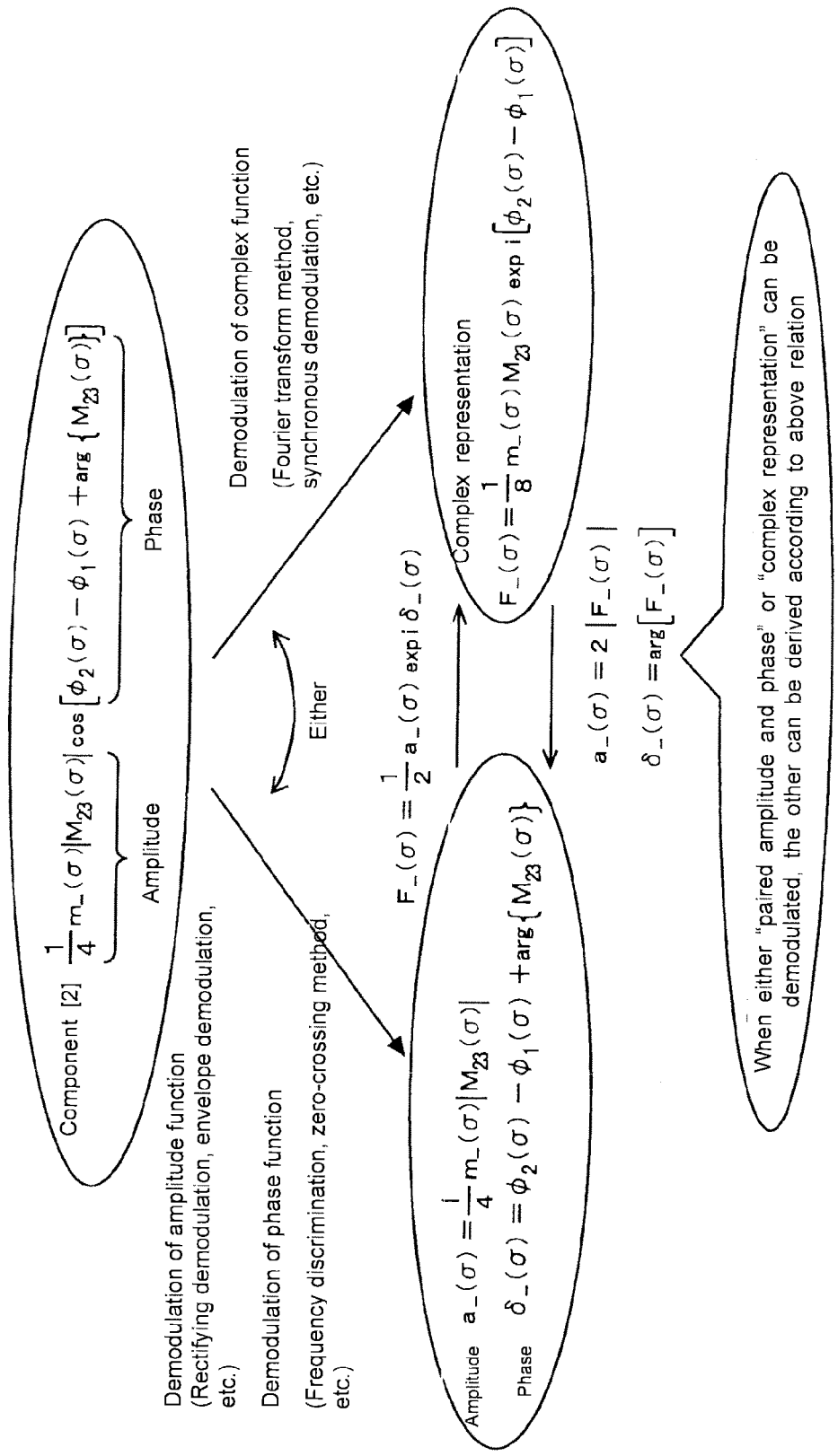
FIG. 6 shows a view for explaining one example of Step 2.

As for each component separated in Step 1, a "paired amplitude and phase" and a "complex representation" are obtained, as shown in FIG. 6. This can be readily realized by using a variety of demodulation methods in an operation which are common in fields of communication engineering, signal analysis and the like, as in Step 1. Examples of those methods include:

Amplitude demodulation: rectifying demodulation, envelope demodulation, etc.

Phase demodulation: frequency discrimination, zero-crossing method, etc.

Complex representation demodulation: Fourier transform method (later described), synchronous demodulation, etc.

Here, definitions and basic properties of the "amplitude", "phase" and "complex representation" of a vibration component are summarized below. As seen from Expressions (1.11a) to (1.11d), each of the separated components except for Component [1] takes the form of:

$$a(\sigma)\cos\delta(\sigma).$$

$a(\sigma)$ and $\delta(\sigma)$ here are respectively referred to as the "amplitude" and "phase" of the vibration component. It is to be noted that, if assuming that the phase $\Delta_0(\sigma)=0$ (i.e. $\cos\delta(\sigma)=0$) also in Component [1], the amplitude of Component [1] can also be defined.

Further, $F(\sigma)$ having the following relation with the amplitude and the phase is called a complex representation.

[Mathematical Expression 10]

$$F(\sigma) = \frac{1}{2}a(\sigma)\exp[i\delta(\sigma)] \quad (1.12a)$$

$$= \left[\frac{1}{2}a(\sigma)\cos\delta(\sigma)\right] + i\left[\frac{1}{2}a(\sigma)\sin\delta(\sigma)\right] \quad (1.12b)$$

The real part of $F(\sigma)$ is formed by dividing the amplitude of the vibration component into halves, and the imaginary part thereof is displaced from the real part at the angle of 90°. It should be noted that in Component [1], the amplitude is not divided into halves since $\delta(\sigma)=0$, i.e. no imaginary part exists.

What needs to be concerned here is that when either the "paired amplitude and phase" or the "complex representation" can be demodulated, the other one can be immediately calculated by use of the following relational expression.

[Mathematical Expression 8]

"amplitude $a(\sigma)$, phase $\delta(\sigma)$" → "complex representation $F(\sigma)$"

$$F(\sigma) = \frac{1}{2}a(\sigma)e^{i\delta(\sigma)} \quad (1.13)$$

"complex representation $F(\sigma)$" →

"amplitude $a(\sigma)$, phase $\delta(\sigma)$"

$$a(\sigma) = 2|F(\sigma)| \quad (1.14a)$$

$$\delta(\sigma) = \arg[F(\sigma)] \quad (1.14b)$$

Namely, demodulation of one of the paired amplitude and phase and the complex representation enables immediate calculation of the other according to need.

When the "amplitude" and "phase" of each component are demodulated, the following results are obtained.

[Mathematical Expression 12]

Component [1] (low frequency component): (1.15a)

[Amplitude] $a_0(\sigma) = \frac{1}{2}m_0(\sigma)M_0(\sigma)$

[Phase] $\delta_0(\sigma) = 0$

Component [2] (central period $1/L_-$): (1.15b)

[Amplitude] $a_-(\sigma) = \frac{1}{4}m_-(\sigma)|M_{23}(\sigma)|$

[Phase] $\delta_-(\sigma) = \phi_2(\sigma) - \phi_1(\sigma) + \arg\{M_{23}(\sigma)\}$ Component [3] (central period $1/L_2$): (1.15c)

[Amplitude] $a_2(\sigma) = \frac{1}{2}m_2(\sigma)M_1(\sigma)$

[Phase] $\delta_2(\sigma) = \phi_2(\sigma)$

Component [4] (central period $1/L_+$): (1.15d)

[Amplitude] $a_+(\sigma) = \frac{1}{4}m_+(\sigma)|M_{23}(\sigma)|$

[Phase] $\delta_+(\sigma) = \phi_2(\sigma) + \phi_1(\sigma) - \arg\{M_{23}(\sigma)\} + \pi$ On the other hand, when the "complex representation" of each component is demodulated, the following results are obtained.

[Mathematical Expression 13]

Component [1] (low frequency component): (1.16a)

[Complex representation] $F_0(\sigma) = \frac{1}{2}m_0(\sigma)M_0(\sigma)$

Component [2] (central period $1/L_-$): (1.16b)

[Complex representation] $F_-(\sigma) =$ $$\frac{1}{8}m_-(\sigma)M_{23}(\sigma)\exp i[\phi_2(\sigma) - \phi_1(\sigma)]$$

Component [3] (central period $1/L_2$): (1.16c)

[Complex representation] $F_2(\sigma) = \frac{1}{4}m_2(\sigma)M_1(\sigma)\exp i\phi_2(\sigma)$ Component [4] (central period $1/L_+$): (1.16d)

[Complex representation] $F_+(\sigma) =$ $$-\frac{1}{8}m_+(\sigma)M_{23}^*(\sigma)\exp i[\phi_2(\sigma) + \phi_1(\sigma)]$$

Here, * indicates a complex conjugation. It is to be noted that, for the sake of what is described below, the expressions of the complex representations are rewritten as follows.

[Mathematical Expression 14]

Component [1] (low frequency component): (1.17a)
[Complex representation] $F_0(\sigma) = K_0(\sigma)M_0(\sigma)$ Component [2] (central period $1/L_-$): (1.17b)
[Complex representation] $F_-(\sigma) = K_-(\sigma)M_{23}(\sigma)$ Component [3] (central period $1/L_2$): (1.17c)
[Complex representation] $F_2(\sigma) = K_2(\sigma)M_1(\sigma)$ Component [4] (central period $1/L_+$): (1.17d)
[Complex representation] $F_+(\sigma) = K_+(\sigma)M_{23}^*(\sigma)$
where $$K_0(\sigma) = \frac{1}{2}m_0(\sigma) \quad (1.18a)$$

$$K_-(\sigma) = \frac{1}{8}m_-(\sigma)\exp i[\phi_2(\sigma) - \phi_1(\sigma)] \quad (1.18b)$$

$$K_2(\sigma) = \frac{1}{4}m_2(\sigma)\exp i\phi_2(\sigma) \quad (1.18c)$$

$$K_+(\sigma) = -\frac{1}{8}m_+(\sigma)\exp i[\phi_2(\sigma) + \phi_1(\sigma)] \quad (1.18d)$$

[Step 3]

Finally, from the "amplitude" and the "phase" or the "complex representation" obtained in Step 2 above, the spectrometer parameters $M_0(\sigma)$, $M_1(\sigma)$, $M_2(\sigma)$, and $M_3(\sigma)$ are determined as functions of the wavenumber $\sigma$.

The "amplitude" and the "phase" obtained in Step 2 above include, other than the spectrometric Stokes parameters to be obtained, parameters shown below.

[Mathematical Expression 15]

Parameter (function) determined based only upon characteristic of polarimeter itself
$$\left\{\begin{array}{l} m_0(\sigma) \\ m_-(\sigma) \\ m_2(\sigma) \\ m_+(\sigma) \end{array}\right\} \text{ and } \left\{\begin{array}{l} \phi_-(\sigma) = \phi_2(\sigma) - \phi_1(\sigma) \\ \phi_2(\sigma) \\ \phi_+(\sigma) = \phi_2(\sigma) + \phi_1(\sigma) \end{array}\right\}$$

The former are included in the amplitude while the latter are included in the phase. These parameters provide references in determining spectrometric quasi-Stokes parameters from the amplitude and the phase of each vibration component. Thus, each of these parameters is hereinafter referred to as a "reference amplitude function" or a "reference phase function". Since these parameters do not depend upon the sample, each of the parameters is subjected to division or subtraction, to be determined as follows.

$M_0(\sigma)$ can be determined from [Component [1]].
$M_2(\sigma)$ and $M_3(\sigma)$ can be determined from (either) [Component [2]] or [Component [4]].
$M_1(\sigma)$ can be determined from [Component [3]].

Meanwhile, in the case of the "complex representation", parameters (functions) determined only by the characteristic of the polarimeter itself are $K_0(\sigma)$, $K_-(\sigma)$, $K_2(\sigma)$, and $K_+(\sigma)$ which are defined by Expressions (1.18a) to (1.18d). These are, so to speak, "reference complex functions".

As revealed from Expressions (1.17a) to (1.17d), if the above reference complex functions have been obtained, by division of the complex representation of each vibration component demodulated in Step 2, the parameters can be determined as follows.

$M_0(\sigma)$ can be determined from [Component [1]]
$M_2(\sigma)$ and $M_3(\sigma)$ can be determined from (either) [Component [2]] or [Component [4]].
$M_1(\sigma)$ can be determined from [Component [3]].

When the angle formed between the retarder R2 and the polarizer P is not 45°, a fifth term that appears can be used in place of [component [2]] and [component [4]]. Namely, the description on lines 2-3 above can be rewritten to:

$M_2(\sigma)$ and $M_3(\sigma)$ can be determined from any one of [component [2]], [component [4]] and [component [5]].

Next, as one of signal processing methods for demodulating spectrometric quasi-Stokes parameters, a "Fourier transform method" is described with reference to FIG. 7. The use of this method allows efficient concurrent performance of Steps 1 and 2, leading to immediate determination of all complex representations of each vibration component.

In this method, first, the spectrum $P(\sigma)$ measured with the spectrometer in the channeled spectroscopic polarimeter is subjected to inverse Fourier transformation, to obtain the following correlation function of light incident on the spectrometer.

[Mathematical Expression 16]

$$C(h) = A_0(h) + A_-(h - L_-) + A_-^*(-h - L_-) + A_2(h - L_2) + \quad (1.19)$$
$$A_2^*(-h - L_2) + A_+(h - L_+) + A_+^*(-h - L_+) \text{ where}$$

$$A_0(h) = F^{-1}\left[\frac{1}{2}m_0(\sigma)M_0(\sigma)\right] \quad (1.20a)$$

$$A_-(h) = F^{-1}\left[\frac{1}{8}m_-(\sigma)M_{23}(\sigma)\exp i\Phi_-(\sigma)\right] \quad (1.20b)$$

$$A_2(h) = F^{-1}\left[\frac{1}{4}m_2(\sigma)M_1(\sigma)\exp i\Phi_2(\sigma)\right] \quad (1.20c)$$

$$A_+(h) = F^{-1}\left[-\frac{1}{8}m_+(\sigma)M_{23}^*(\sigma)\exp i\Phi_+(\sigma)\right] \quad (1.20d)$$

Figure 7:
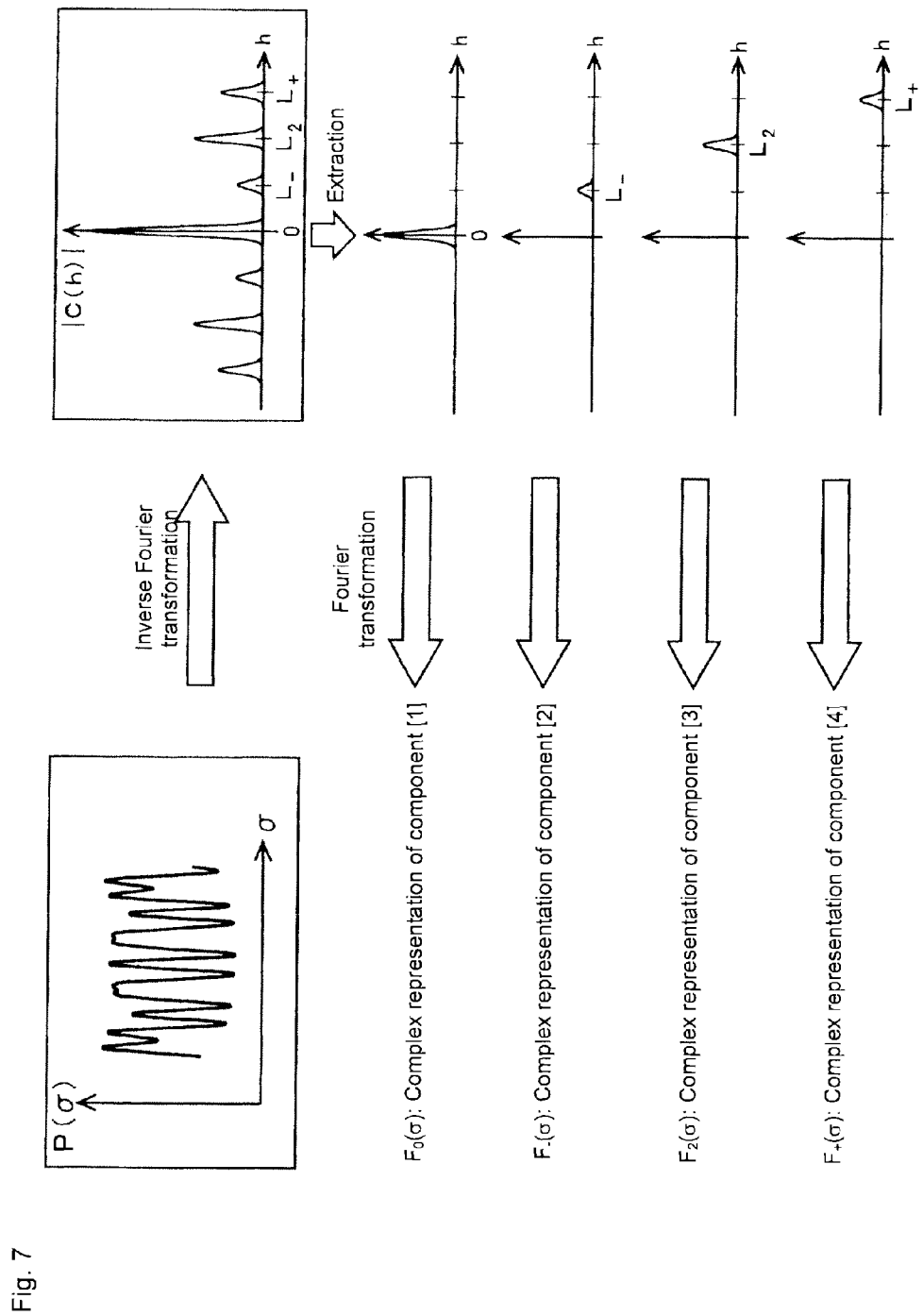
FIG. 7 shows a view for explaining Fourier transformation.
Figure 8:
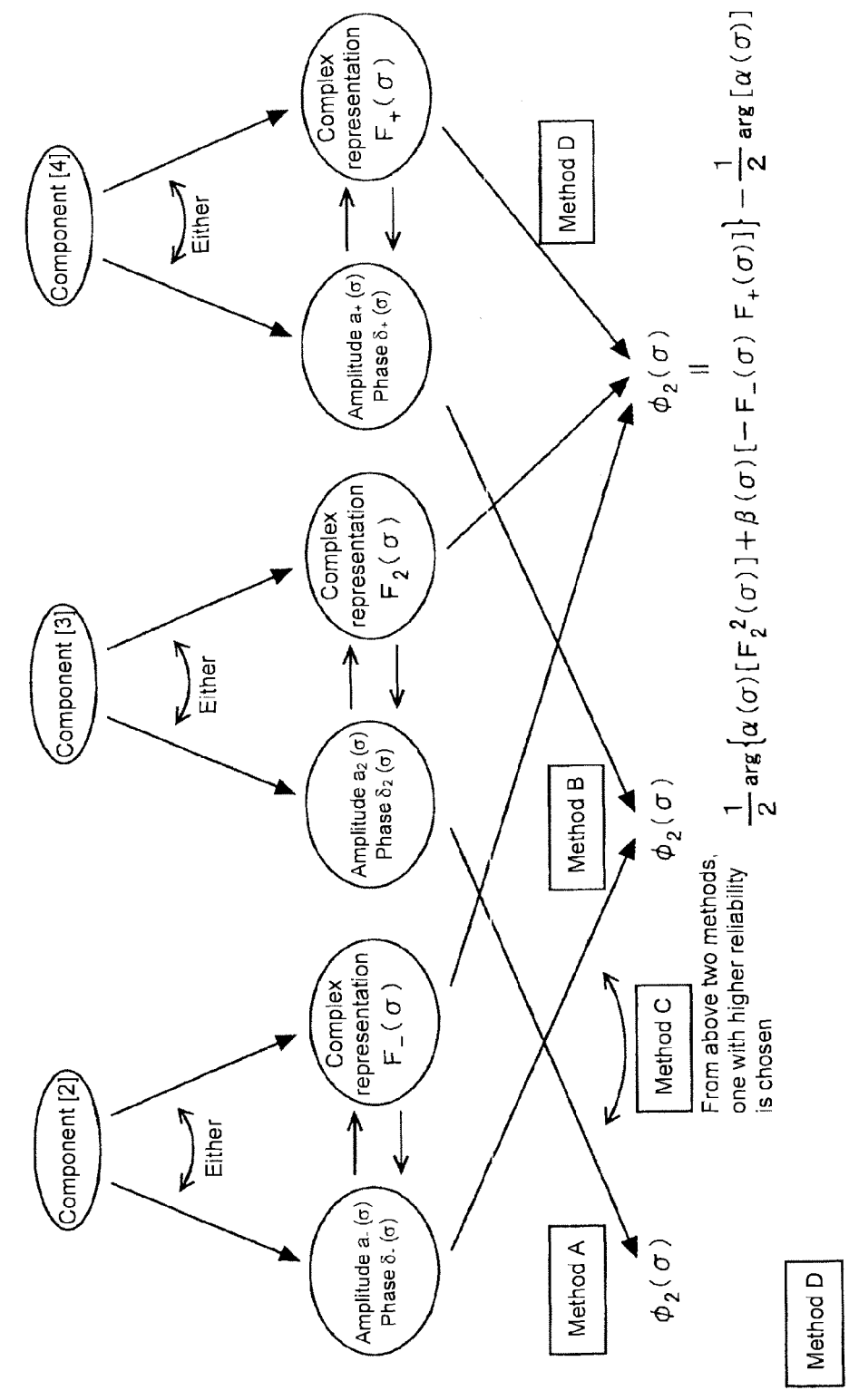
FIG. 8 shows a view for explaining flows of signals for calibration during measurement.

As shown in the upper right part of FIG. 7, this correlation function $C(h)$ contains seven components including inverse numbers of a period of each vibration component, 0, $\pm L_-$, $\pm L_2$, $\pm L_+$ as main components.

Here, appropriate selection of these inverse numbers of the period enables separation of each component, contained in $C(h)$, from each other on the h-axis. When four components as the main components, $h=0$, $L_-$, $L_2$, and $L_+$, are taken out and then subjected to the Fourier transformation, the following expressions are satisfied.

[Mathematical Expression 17]

$$F[A_0(h)] = \frac{1}{2}m_0(\sigma)M_0(\sigma) = F_0(\sigma) \quad (1.21a)$$

$$F[A_-(h - L_-)] = \frac{1}{8}m_-(\sigma)M_{23}(\sigma)\exp i[\phi_2(\sigma) - \phi_1(\sigma)] \quad (1.21b)$$
$$= F_-(\sigma)$$

$$F[A_2(h - L_2)] = \frac{1}{4}m_2(\sigma)M_1(\sigma)\exp i\phi_2(\sigma) \quad (1.21c)$$
$$= F_2(\sigma)$$

$$F[A_+(h-L_+)] = -\frac{1}{8}m_+(\sigma)M_{23}^*(\sigma)\exp i[\phi_2(\sigma)+\phi_1(\sigma)] \quad (1.21d)$$
$$= F_+(\sigma)$$

As seen from the expressions above, what are obtained in the above operation are just the complex representations of the components [1] to [4] to be obtained in foregoing Step 2. Namely, in the above operation, Steps 1 and 2 are concurrently realized. Hence, when Step 3 is performed using the results of Steps 1 and 2, spectrometric quasi-Stokes parameters are obtained all at once.

1.6 Pre-Calibration Calibration of Reference Amplitude Function, Reference Phase Function, Reference Complex Function "Prior to Measurement"

As described in the previous section, when a spectrometric quasi-Stokes parameter is determined from a channeled spectrum, it is necessary in Step 3 to in advance determine parameters to be obtained based only upon a characteristic of a polarimeter itself parameters, namely:

"reference amplitude function" $m_0(\sigma)$, $m_-(\sigma)$, $m_2(\sigma)$, $m_+(\sigma)$, and "reference phase function" $\phi_2(\sigma)$ and $\phi_1(\sigma)$, or "reference complex function" $K_0(\sigma)$, $K_-(\sigma)$, $K_2(\sigma)$, $K_+(\sigma)$ The former ("reference amplitude function" and "reference phase function") and the latter ("reference complex function") are required in the respective cases of obtaining spectrometric quasi-Stokes parameters from the "amplifier and phase" and the "complex representation" of each vibration component. Since these are functions not depending upon the sample, it is desirable to calibrate the functions at least prior to measurement.

In this section, a procedure for calibrating these reference functions "prior to measurement, i.e. in advance" is described. There are two typical methods as follows.

[Method 1]: a method for calibrating reference phase functions and reference amplitude functions from a characteristic of each element for use in the optical system.

[Method 2]: a method for calibrating reference phase functions and reference amplitude functions by use of a sample having a known polarization characteristic.

1.6.1 [Method 1]

Method for Calibrating Reference Phase Function and Reference Amplitude Function from Characteristic of Each Element for Use in Optical System Characteristics of a reference phase function and a reference amplitude function are essentially determined based upon elements for use in a channeled spectroscopic polarimeter. Therefore, optical characteristics of individual elements are repeatedly examined by experiment or calculation to perform calibration of parameters.

1.6.2 [Method 2]

Method for Calibrating Reference Phase Function and Reference Amplitude Function by Use of Sample Having Known Polarization Characteristic.

The reference phase function and the reference amplitude function are in amount determined based not upon the "polarization characteristic of the object to be measured (sample)", but only upon the characteristic of the "channeled spectroscopic polarimeter". Accordingly, a "sample having a known polarization characteristic" (light whose measurement result is known)" is inputted into the polarimeter, and using the result of the input, it is possible to calculate backward the reference phase function and the reference amplitude function.

Below, the procedure for calibration is shown. As described at the beginning of this section, the following should be noted.

When the SOP is obtained from the "amplitude and phase" of each vibration component, the "reference amplitude function" and the "reference phase function" are required.

When the SOP is obtained from the "complex representation" of each vibration component, the "reference complex function" is required.

In the following, the procedures for calibration in the above respective cases are described. Although these procedures are essentially equivalent and different only in calculation method, they are separately put down for the sake of convenience.

A. Calibration Procedure for Separately Obtaining Reference Amplitude Function and Reference Phase Function In this calibration, first, a "sample having a known polarization characteristic" is prepared, and then inputted into a channeled spectroscopic polarimeter. In this case, spectrometric quasi-Stokes parameters of light are referred to as WPM, $M_1^{(0)}(\sigma)$, $M_2^{(0)}(\sigma)$, and $M_3^{(0)}(\sigma)$. When the sampler is subjected to the above-mentioned demodulation means, the amplitude and the phase obtained in Step 2 are expressed as follows according to Expressions (1.15a) to (1.15d).

[Mathematical Expression 18]

Component [1] (low frequency component): (1.22a)

[Amplitude] $a_0^{(0)}(\sigma) = \frac{1}{2}m_0(\sigma)M_0^{(0)}(\sigma)$

[Phase] $\delta_0^{(0)}(\sigma) = 0$

Component [2] (central period $1/L_-$): (1.22b)

[Amplitude] $a_-^{(0)}(\sigma) = \frac{1}{4}m_-(\sigma)|M_{23}^{(0)}(\sigma)|$

[Phase] $\delta_-^{(0)}(\sigma) = \phi_2(\sigma) - \phi_1(\sigma) + \arg\{M_{23}^{(0)}(\sigma)\}$ Component [3] (central period $1/L_2$): (1.22c)

[Amplitude] $a_2^{(0)}(\sigma) = \frac{1}{2}m_2(\sigma)M_1^{(0)}(\sigma)$

[Phase] $\delta_2^{(0)}(\sigma) = \phi_2(\sigma)$

Component [4] (central period $1/L_+$): (1.22d)

[Amplitude] $a_+^{(0)}(\sigma) = \frac{1}{4}m_+(\sigma)|M_{23}^{(0)}(\sigma)|$

[Phase] $\delta_+^{(0)}(\sigma) = \phi_2(\sigma) + \phi_1(\sigma) - \arg\{M_{23}^{(0)}(\sigma)\} + \pi$ where, $$M_{23}^{(0)}(\sigma) = M_2^{(0)}(\sigma) - iM_3^{(0)}(\sigma) \quad (1.23)$$

It is to be noted that this is mere replacement of $M_0(\sigma)$ to $M_3(\sigma)$ with $M_0^{(0)}(\sigma)$ to $M_3^{(0)}(\sigma)$.

The amplitude and the phase of each vibration component are determined only by the spectrometric quasi-Stokes parameters, the reference phase functions and the reference amplitude functions. Here, since the spectrometric quasi-Stokes parameters are known in a "case where the sample having a known polarization characteristic", the remaining reference amplitude functions $m_0(\sigma)$, $m_-(\sigma)$, $m_2(\sigma)$, $m_+(\sigma)$, and the remaining reference phase functions $\phi_1(\sigma)$ and $\phi_2(\sigma)$ are determined from the demodulated amplitude and phase. Specifically, these functions are given according to the following expressions:

$$m_0(\sigma) = \frac{2a_0^{(0)}(\sigma)}{M_0^{(0)}(\sigma)} \tag{1.24a}$$

$$m_-(\sigma) = \frac{4a_-^{(0)}(\sigma)}{|M_{23}^{(0)}(\sigma)|} \tag{1.24b}$$

$$m_2(\sigma) = \frac{2a_2^{(0)}(\sigma)}{M_1^{(0)}(\sigma)} \tag{1.24c}$$

$$m_+(\sigma) = \frac{4a_+^{(0)}(\sigma)}{|M_{23}^{(0)}(\sigma)|} \tag{1.24d}$$

$$\phi_-(\sigma) = \phi_2(\sigma) - \phi_1(\sigma) = \delta_-^{(0)}(\sigma) - \arg\{M_{23}^{(0)}(\sigma)\} \tag{1.24e}$$

$$\phi_2(\sigma) = \delta_2^{(0)}(\sigma) \tag{1.24f}$$

$$\phi_+(\sigma) = \phi_2(\sigma) + \phi_1(\sigma) = \delta_+^{(0)}(\sigma) + \arg\{M_{23}^{(0)}(\sigma)\} - \pi \tag{1.24g}$$

Once these reference functions are obtained (can be calibrated), spectrometric quasi-Stokes parameters of a sample having an unknown spectropolarization characteristic can be determined.

When the case of leaving the analyzer without using the sample is considered as an example, the following expressions are formed where the azimuth angle of the analyzer with respect to the fast axis of the retarder R1 is θ.

$$M_0^{(0)}(\sigma) = P_0^{(0)}(\sigma)/2 \tag{1.25a}$$

$$M_1^{(0)}(\sigma) = P_0^{(0)}(\sigma)\cos 2\theta/2 \tag{1.25b}$$

$$M_2^{(0)}(\sigma) = P_0^{(0)}(\sigma)\sin 2\theta/2 \tag{1.25c}$$

$$M_3^{(0)}(\sigma) = 0 \tag{1.25d}$$

Here, $P_0^{(0)}(\sigma)$ is a spectrum of the light source. In this case, the above expressions (1.24a) to (1.24g) are expressed as follows.

[Mathematical Expression 20]

$$m_0(\sigma) = \frac{2a_0^{(0)}(\sigma)}{\frac{1}{2}P_0^{(0)}(\sigma)} \tag{1.26a}$$

$$m_-(\sigma) = \frac{4a_-^{(0)}(\sigma)}{\frac{1}{2}P_0^{(0)}(\sigma)\sin 2\theta} \tag{1.26b}$$

$$m_2(\sigma) = \frac{2a_2^{(0)}(\sigma)}{\frac{1}{2}P_0^{(0)}(\sigma)\cos 2\theta} \tag{1.26c}$$

$$m_+(\sigma) = \frac{4a_+^{(0)}(\sigma)}{\frac{1}{2}P_0^{(0)}(\sigma)\sin 2\theta} \tag{1.26d}$$

$$\phi_-(\sigma) = \phi_2(\sigma) - \phi_1(\sigma) = \delta_-^{(0)}(\sigma) \tag{1.26e}$$

$$\phi_2(\sigma) = \delta_2^{(0)}(\sigma) \tag{1.26f}$$

$$\phi_+(\sigma) = \phi_2(\sigma) + \phi_1(\sigma) = \delta_+^{(0)}(\sigma) - \pi \tag{1.26g}$$

It is revealed from the above that the reference amplitude function and the reference phase function can be obtained so long as the direction θ and the spectrum $P_0^{(0)}(\sigma)$ of the light source are known in advance. Further, even with $P_0^{(0)}(\sigma)$ unknown, if only the direction θ is known, it serves sufficiently for obtaining part of (essential) polarization parameters.

B. Calibration Procedure for Obtaining Amplitude and Phase Altogether (by Regarding Both as Reference Complex Function) at Once The above-mentioned method was a method for calculating the "amplitude" and the "phase" of each vibration component separately. However, it may be more convenient (efficient) in some cases to calculate them as the "complex representation" of each vibration component. One example of such calculation may be the case of directly obtaining the "complex representation" (Expressions (1.17a) to (1.17d)), as in the Fourier transform method shown in FIG. 7 above. In such a case, calibration is efficiently performed by calibration of the "complex representation" as it is without separation into the "amplitude" and "phase".

In the following, mathematical expressions for the above-mentioned case are shown. What needs to be concerned here is that the physical properties of the cases of using "amplitude and phase" and the "complex representation" are completely the same. It is just that in the latter case, a calculation is made using complex numbers, and thus more efficient.

Similarly to the previous section, a case is considered where the sample having a known polarization characteristic is inserted into the channeled spectroscopic polarimeter. A complex representation of each vibration component is obtained according to Expressions (1.17a) to (1.17d) as follows.

$$F_0^{(0)}(\sigma) = K_0(\sigma)M_0^{(0)}(\sigma) \tag{1.27a}$$

$$F_-^{(0)}(\sigma) = K_-(\sigma)M_{23}^{(0)}(\sigma) \tag{1.27b}$$

$$F_2^{(0)}(\sigma) = K_2(\sigma)M_1^{(0)}(\sigma) \tag{1.27c}$$

$$F_+^{(0)}(\sigma) = K_+(\sigma)M_{23}^{(0)*}(\sigma) \tag{1.27d}$$

Here, the complex functions $K_0(\sigma)$, $K_-(\sigma)$, $K_2(\sigma)$, and $K_+(\sigma)$ are in amount (reference complex function) determined based not upon the sample, but only upon the reference amplitude function and the reference phase function, as seen from Expressions (1.18a) to (1.18d). Accordingly, these can be calculated backward as follows.

[Mathematical Expression 21]

$$K_0(\sigma) = \frac{F_0^{(0)}(\sigma)}{M_0^{(0)}(\sigma)} \tag{1.28a}$$

$$K_-(\sigma) = \frac{F_-^{(0)}(\sigma)}{M_{23}^{(0)}(\sigma)} \tag{1.28b}$$

$$K_2(\sigma) = \frac{F_2^{(0)}(\sigma)}{M_1^{(0)}(\sigma)} \tag{1.28c}$$

$$K_+(\sigma) = \frac{F_+^{(0)}(\sigma)}{M_{23}^{(0)*}(\sigma)} \tag{1.28d}$$

Similar to the case of calculating the amplitude and the phase separately, once the above reference complex function is obtained (can be calibrated), spectrometric quasi-Stokes parameters of the sample having an unknown polarization characteristic can be obtained.

It is to be noted that, just for reference, mathematical expressions in the case of leaving the analyzer without using the sample are shown below.

[Mathematical Expression 22]

$$K_0(\sigma) = \frac{F_0^{(0)}(\sigma)}{\frac{1}{2}P_0^{(0)}(\sigma)} \quad (1.29a)$$

$$K_-(\sigma) = \frac{F_-^{(0)}(\sigma)}{\frac{1}{2}P_0^{(0)}(\sigma)\sin2\theta} \quad (1.29b)$$

$$K_2(\sigma) = \frac{F_2^{(0)}(\sigma)}{\frac{1}{2}P_0^{(0)}(\sigma)\cos2\theta} \quad (1.29c)$$

$$K_+(\sigma) = \frac{F_+^{(0)}(\sigma)}{\frac{1}{2}P_0^{(0)}(\sigma)\sin2\theta} \quad (1.29d)$$

Chapter 2: Problems of Channeled Spectroscopic Polarimeter

As described in Step 3 in Section 1.5, for demodulation of spectrometric quasi-Stokes parameters $M_0(\sigma)$, $M_1(\sigma)$, $M_2(\sigma)$, and $M_3(\sigma)$ from a measured channeled spectrum $P(\sigma)$, it is necessary to obtain (calibrate) the following functions in advance.

[Mathematical Expression 23]

$$\text{Reference amplitude function,} \begin{Bmatrix} m_0(\sigma) \\ m_-(\sigma) \\ m_2(\sigma) \\ m_+(\sigma) \end{Bmatrix}$$

$$\text{Reference phase function, or } \begin{Bmatrix} \phi_1(\sigma) \\ \phi_2(\sigma) \end{Bmatrix}$$

$$\text{Reference complex function} \begin{Bmatrix} K_0(\sigma) \\ K_-(\sigma) \\ K_2(\sigma) \\ K_+(\sigma) \end{Bmatrix}$$

However, the reference phase functions $\phi_1(\sigma)$ and $\phi_2(\sigma)$ have the property of varying for a variety of reasons. When these functions vary, there occurs a problem in that a large error occurs in measured values of the spectropolarization parameters of the sample.

2.1 Cause of Variations in Reference Phase Function 2.1.1 Temperature Change

The reference phase functions $\phi_1(\sigma)$ and $\phi_2(\sigma)$ are amounts (retardation) determined by the retarders R1 and R2 in the spectroscopic polarimeter. This retardation has the property of changing sensitively with respect to a temperature. Hence the phase of the channeled spectrum is displaced due to the temperature change. As a result, due to a temperature rise, a measured value is displaced to cause occurrence of an error therein. Moreover, a similar change occurs with pressure change.

2.1.2 Variations in Wavelength Axis of Spectrometer

When a wavelength to be sampled with the spectrometer is displaced, a problem that is "equivalent" to fluctuations in the reference phase function occurs. When the wavelength to be sampled is displaced during measurement, a similar effect to an effect in lateral displacement of the spectrum is produced. This is an equivalent phase displacement. In particular, in an ordinary spectrometer (type of rotating a diffraction grating with a motor), a wavelength to be sampled is displaced by small degrees (at random) in every measurement, due to backlash of a motor or the like.

2.1.3 Solution Easily Found

For preventing variations in reference phase function of each vibration component, stabilizing a cause of the fluctuations is considered. However, this is very hard to realize. For example, when noting the temperature variation, the accuracy required for wavenumber-distribution of an ellipsometric parameter in spectrometric ellipsometry is in the order of 0.1° or smaller, and for satisfying this, it is necessary to keep the temperature variation within the order of 0.5° C. This necessitates large equipment for temperature stabilization, unfavorably leading to a loss of a variety of advantages (size reduction, non-inclusion of an active element, etc.) of the channeled spectroscopic polarimetry.

Chapter 3: Solution Against Variations in Reference Phase Function

The reference phase functions $\phi_1(\sigma)$ and $\phi_2(\sigma)$ (depending not upon the sample but only upon parameters of the polarimeter) included in the channeled spectrum vary by a variety of factors, which becomes a major contributor to an error. In consideration of this respect, in one embodiment of the present invention, the channeled spectroscopic polarimeter is provided with a function capable of calibrating the reference phase functions $\phi_1(\sigma)$ and $\phi_2(\sigma)$ of each vibration component during measurement (concurrently with measurement) (cf. FIGS. 8 to 10).

3.1 Method for Calibration "During Measurement" (No. 1)

The calibration method described in Section 1.6 was a method for calibration "prior to measurement". As opposed to this, in the following section, a method for calibration "during measurement" is shown.

3.1.1 Basic Idea

The amplitude and the phase obtained in Step 2 in Chapter 1 during measurement (when light in an unknown SOP is incident on the channeled spectroscopic polarimeter) is shown again below.

[Mathematical Expression 24]

Component [1] (low frequency component): (3.1a)

[Amplitude] $a_0(\sigma) = \frac{1}{2}m_0(\sigma)M_0(\sigma)$

[Phase] $\delta_0(\sigma) = 0$

Component [2] (central period $1/L_-$): (3.1b)

[Amplitude] $a_-(\sigma) = \frac{1}{4}m_-(\sigma)|M_{23}(\sigma)|$

[Phase] $\delta_-(\sigma) = \phi_2(\sigma) - \phi_1(\sigma) + \arg\{M_{23}(\sigma)\}$ Component [3] (central period $1/L_2$): (3.1c)

[Amplitude] $a_2(\sigma) = \frac{1}{2}m_2(\sigma)M_1(\sigma)$

[Phase] $\delta_2(\sigma) = \phi_2(\sigma)$

Component [4] (central period $1/L_+$): (3.1d)

[Amplitude] $a_+(\sigma) = \frac{1}{4}m_+(\sigma)|M_{23}(\sigma)|$

[Phase] $\delta_+(\sigma) = \phi_2(\sigma) + \phi_1(\sigma) - \arg\{M_{23}(\sigma)\} + \pi$ Here, all needed for obtaining the four spectrometric quasi-Stokes parameters are found to be:

"amplitude" of Component [1]→$M_0(\sigma)$

"amplitude" and "phase" of one of Component [2] and Component [4]→$M_2(\sigma)$ and $M_3(\sigma)$ "amplitude" of Component [3]→$M_1(\sigma)$ It is found that the remaining ones as follows are not used for demodulation of the spectrometric quasi-Stokes parameters.

"phase" of Component [3]

"amplitude" and "phase" of the remaining one of Component [2] and component [4]

The present inventors and the like found it possible to obtain not only the four spectrometric quasi-Stokes parameters but also the "reference phase functions ($\phi_1(\sigma)$, $\phi_2(\sigma)$, etc.)" all at once through use of the remaining component. In this method, it is meant that calibration can be concurrently performed in the midst of measurement without particular input of light in a known SOP.

3.1.2 Preparation

In order to use the "calibration method during measurement", the following prior preparation is necessary.

Figure 9:
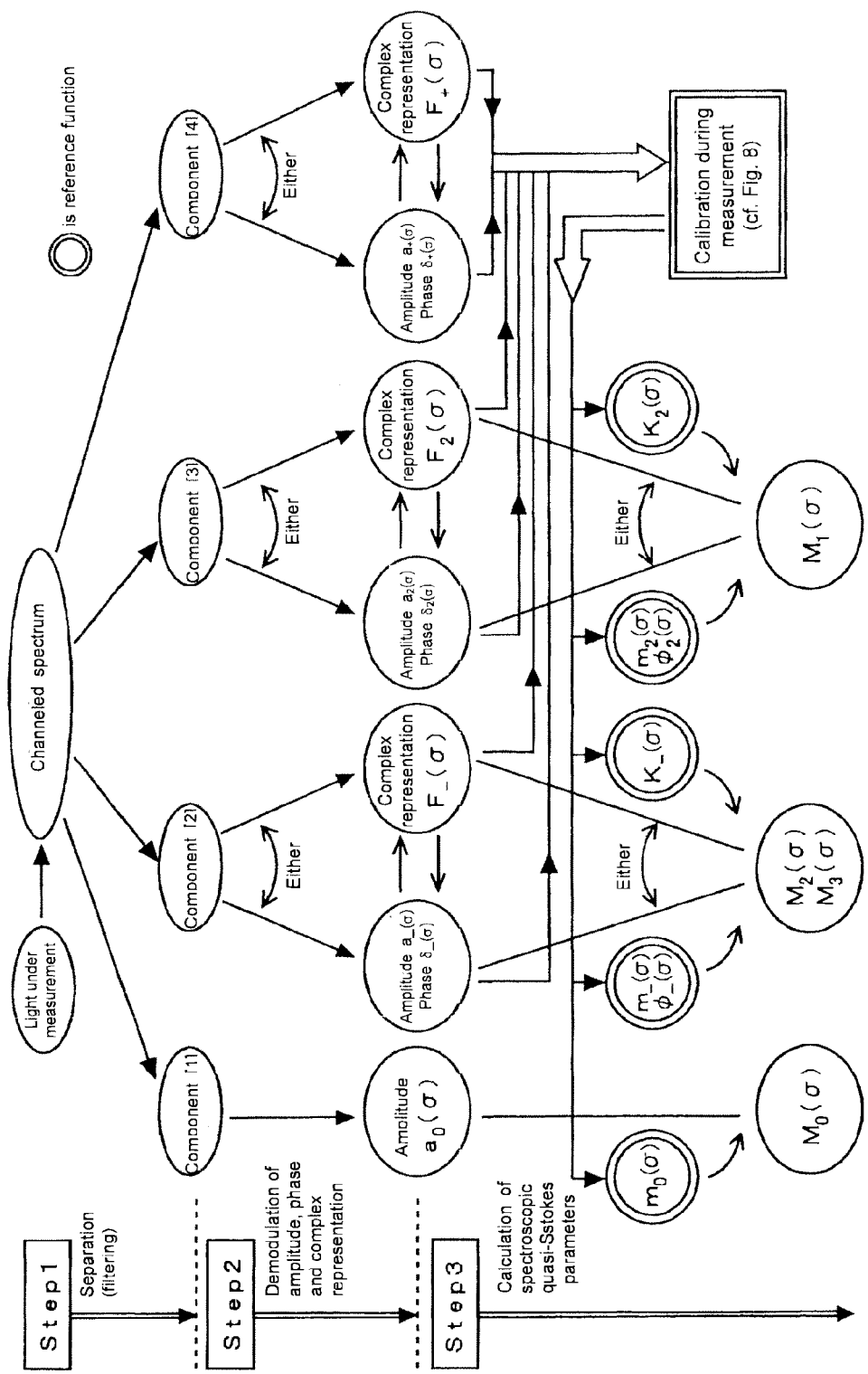
FIG. 9 shows a view for explaining flows of signals in combination of "calibration during measurement" and "measurement of a spectrometric quasi-Stokes parameter".

The reference amplitude functions $m_0(\sigma)$, $m_-(\sigma)$, $m_2(\sigma)$, and $m_+(\sigma)$ are subjected to pre-calibration (cf. FIG. 9)

Since the following method is effective only on the reference phase function, any one of the methods descried in Section 1.6 is to be performed as for the reference amplitude function. It is to be noted that the fluctuations in the reference amplitude function during measurement typically have considerably small magnitude, and are ignorable in many cases. Namely, in contrast to the reference phase function, there is generally almost no need for re-calibration of the reference amplitude function during measurement.

As for the reference phase function, the pre-calibration is not necessarily required. However, a ratio between $\phi_1(\sigma)$ and $\phi_2(\sigma)$ needs to be obtained in advance.

Example 1: when the retarders $R_1$ and $R_2$ are made of the same medium, the ratio between $\phi_1(\sigma)$ and $\phi_2(\sigma)$ is determined from a ratio between thicknesses of the two retarders.

Example 2: By further pre-calibration of the reference phase function, the ratio between $\phi_1(\sigma)$ and $\phi_2(\sigma)$ is determined (this ratio may be considered not to change during measurement).

Note here that, in cases including a case where the ratio between the retarders $R_1$ and $R_2$ changes (e.g. temperatures of the two retarders are different) during measurement, a method described below cannot be used.

3.1.3 Actual Calibration Method

Based upon the above-mentioned idea, a method for actual calibration is described below.

A. Method for Obtaining Reference Phase Function $\phi_2(\sigma)$ from Vibration Component [3]

By noting only Vibration component [3], the amplitude and the phase thereof are shown again as follows.

[Mathematical Expression 25]

$$\begin{cases} \text{[Amplitude]} & a_2(\sigma) = \frac{1}{2}m_2(\sigma)M_1(\sigma) \\ \text{[Phase]} & \delta_2(\sigma) = \phi_2(\sigma) \end{cases} \quad (3.2)$$

What needs to be noted here is that the phase $\delta_2(\sigma)$ of this component is one ($\phi_2(\sigma)$) of the reference phase functions (itself). Namely, when the phase $\delta_2(\sigma)$ of Component [3] is measured, one ($\phi_2(\sigma)$) of the reference phase functions is immediately determined according to the following expression.

$$\phi_2(\sigma) = \delta_2(\sigma) \quad (3.3)$$

This relational expression is constantly satisfied regardless of a polarization characteristic of a measurement sample, meaning that one of the reference phase functions can be immediately obtained from a measured value, even from a channeled spectrum by any kind of sample. This is a calibration method that can be performed utterly concurrently during measurement, and in the case of "using a sample having a known polarization characteristic", there is no need for performing calibration "prior to measurement or after discontinuation of measurement" as in (Section 1.6). However, it should be noted that at this time, the condition of observing Component [3] at a sufficient SN ratio needs to be satisfied (cf. later-described C).

It is to be noted that, when the "complex representation" is obtained in place of the "paired amplitude and phase" in Step 2 of the "procedure for demodulating spectrometric quasi-Stokes parameters" in Section 1.5, a calculation method, rewritten from the above and described below, may be applied.

From Expression (1.14)b, $\delta_2(\sigma)$ has the following relation with the complex representation $F_2(\sigma)$ of Component [3].

$$\delta_2(\sigma) = \arg[F_2(\sigma)] \quad (3.4)$$

Therefore, the reference phase function $\phi_2(\sigma)$ can be obtained from the complex representation of Component [3] according to the following expression.

$$\phi_2(\sigma) = \arg[F_2(\sigma)] \quad (3.5)$$

It should be noted that what is needed at the time of complex representation is not the reference phase function $\phi_2(\sigma)$ but the reference complex function $K_2(\sigma)$. Since there is a relation between these two functions as expressed by Expression (1.18c), once $\phi_2(\sigma)$ is determined, $K_2(\sigma)$ can also be determined (this will be later described in details in F).

B. Method for Obtaining Reference Phase Function $\phi_2(\sigma)$ from a plurality of vibration components (paired [2] and [4], etc.)

The respective phases of Vibration Components [2] and [4] are again shown as follows.

Phase of Component [2]:

$$\delta_-(\sigma) = \phi_2(\sigma) - \phi_1(\sigma) + \arg\{M_{23}(\sigma)\} \quad (3.6a)$$

Phase of Component [4]:

$$\delta_+(\sigma) = \phi_2(\sigma) + \phi_1(\sigma) - \arg\{M_{23}(\sigma)\} + \pi \quad (3.6b)$$

When the one phase is added to the other, $\phi_1(\sigma)$ and $\arg\{M_{23}(\sigma)\}$ are canceled out, whereby it is found that the following expression is satisfied.

[Mathematical Expression 26]

$$\phi_2(\sigma) = \frac{1}{2}\{\delta_-(\sigma) + \delta_+(\sigma)\} - \frac{\pi}{2} \quad (3.7)$$

The right side of the above expression means that one ($\phi_2(\sigma)$) of the reference phase functions can be obtained by taking an average of the phases of Vibration components [2] and [4]. Similarly to Method A, this relational expression can also be constantly satisfied regardless of the SOP of the sample, meaning that one of the reference phase functions can be immediately obtained from a measured value, even from a channeled spectrum by any kind of sample.

Namely, similarly to the case of Method A, this is a "calibration method that can be performed utterly concurrently during measurement", and in the case of "using a sample having a known polarization characteristic", there is no need for performing calibration "prior to measurement or after discontinuation of measurement" as in (Section 1.6).

However, it should be noted that the condition of observing Components [2] and [4] at a sufficient SN ratio needs to be satisfied (cf. later-described C).

Here, similarly to the case of Method A, a calculation method is described which is used in the case of obtaining the "complex representation" in place of the "paired amplitude and phase" in Step 2 of Section 1.5.

From Expression (1.14b), $\delta_-(\sigma)$ and $\delta_+(\sigma)$ have the following relations with the complex representations $F_-(\sigma)$ and $F_+(\sigma)$ of Components [2] and [4].

$$\delta_-(\sigma)=\arg[F_-(\sigma)] \quad (3.8a)$$

$$\delta_+(\sigma)=\arg[F_+(\sigma)] \quad (3.8b)$$

Therefore, the reference phase function $\phi_2(\sigma)$ can be obtained from the complex representations of the two components as follows.

[Mathematical Expression 27]

$$\phi_2(\sigma) = \frac{1}{2}\{\arg[F_-(\sigma)] + \arg[F_+(\sigma)]\} - \frac{\pi}{2} \quad (3.9)$$

Or, the following expression obtained by rewriting the above expression to a simple formula of the complex function may be applied.

[Mathematical Expression 28]

$$\phi_2(\sigma) = \frac{1}{2}\arg[-F_-(\sigma)F_+(\sigma)] \quad (3.10)$$

In the optically system (channeled spectroscopic polarimeter) in FIG. 2, an obtained spectrum includes another component having a different period as described above except for the case where the angle formed between the retarder $R_2$ and the polarizer P is not 45°.

As seen from Expression (1.10), the phase of this component is "$\delta_1(\sigma)-\phi_1(\sigma)-\arg\{M_{23}(\sigma)\}$", and similar to the phase terms of above Vibration components [2] and [4]. Hence, even when the above component is combined with Components [2] and [4] (or replaced by one of them), it is possible to calibrate $\phi_2(\sigma)$ in the same manner.

C. Combination of A and B

The two methods (Method A and Method B) described above are methods in which one ($\phi_2(\sigma)$) of the reference phase functions can be calibrated utterly concurrently during measurement. However, the vibration components used are different between the two methods. What should be concerned here is that the amplitude of Vibration component [3] used in Method A is proportional to $M_1(\sigma)$, while the amplitudes of Vibration Components [2] and [4] used in Method B are proportional to the following.

[Mathematical Expression 29]

$$|M_{23}(\sigma)|=\sqrt{M_2{}^2(\sigma)+M_3{}^2(\sigma)}$$

Since the polarization characteristic of the sample is unknown, there is no guarantee that the spectrometric quasi-Stokes parameters are constantly sufficiently large for phase measurement for each component. For example, when $M_1(\sigma)$ is small, obtaining $\phi_2(\sigma)$ by Method A using the phase of this component might result in occurrence of a large error. For solving this problem, adaptive combination of Methods A and B is desired. Specifically, a value of $\phi_2(\sigma)$ with more certainty can be obtained by selecting, or weighting up and balancing, results of the two methods.

D. Combination of A and B (No. 2)

One idea for efficiently combining A and B is shown below. This is a method in which direct calculation is possible without particular separation by case. It should be noted that, in this part (Method D), three complex representation functions $F_-(\sigma)$, $F_2(\sigma)$ and $F_-(\sigma)$ of Components [2] to [4] are used for calculation. When a calculation is to be made from the "paired amplitude and phase" of each vibration component, this pair may once be changed to the "complex representation" according to Expression (1.13), and then the following calculation procedure may be performed.

As a preparation for explaining this method, first, the following two expressions are derived and the properties thereof are described. By transforming Expression (3.5), the following expression can be obtained.

$$2\phi_2(\sigma)=\arg[F_2{}^2(\sigma)] \quad (3.11)$$

Meanwhile, by doubling both sides of Expression (3.10), the following expression can be obtained.

$$2\phi_2(\sigma)=\arg[-F_-(\sigma)F_+(\sigma)] \quad (3.12)$$

It is found from the comparison between the above two expressions that the complex function in the brackets on the right side of each of the expressions has the same argument $2\phi_2(\sigma)$.

"Appropriate weighting functions $\alpha(\sigma)$ and $\beta(\sigma)$ which have the same argument" were respectively multiplied by the above two complex functions, and then the obtained two terms were added together.

[Mathematical Expression 30]

$$\alpha(\sigma)[F_2{}^2(\sigma)]+\beta(\sigma)[-F_-(\sigma)F_+(\sigma)] \quad (3.13)$$

The argument of this expression is constantly equivalent to $2\phi_2(\sigma)+\arg\alpha(\sigma)$. It is found that, through use of the properties thus described, $\phi_2(\sigma)$ can be obtained according to the following expression even if one of $M_1$ and $M_{23}$ decreases.

[Mathematical Expression 31]

$$\phi_2(\sigma) = \frac{1}{2}\arg\{\alpha(\sigma)[F_2^2(\sigma)] + \beta(\sigma)[-F_-(\sigma)F_+(\sigma)]\} - \frac{1}{2}\arg[\alpha(\sigma)] \quad (3.14)$$

There are a variety of specific ways to select $\alpha(\sigma)$ and $\beta(\sigma)$.

The simplest way to select $\alpha(\sigma)$ and $\beta(\sigma)$ is making the two functions the same constant (1). In this case, an expression for obtaining the reference phase function $\phi_2(\sigma)$ is shown below.

[Mathematical Expression 32]

$$\phi_2(\sigma) = \frac{1}{2}\arg\{[F_2^2(\sigma)] + [-F_-(\sigma)F_+(\sigma)]\} \quad (3.15)$$

E. Calculation of $\phi_1(\sigma)$

Since fluctuations in $\phi_1(\sigma)$ are considered to be similar to those in $\phi_2(\sigma)$, it is possible to obtain $\phi_1(\sigma)$ from a measured value of $\phi_2(\sigma)$ by proportional calculation (e.g. by using a thickness ratio).

F. Calculation of Reference Complex Function

In the demodulation in Step 2 of the "procedure for demodulating spectrometric quasi-Stokes parameters" in Section 1.5, when (not the "paired amplitude and phase" but) the "complex representation" is obtained, what are needed ultimately in the operation of Step 3 for obtaining the spectrometric quasi-Stokes parameters are not the reference phase functions $\phi_1(\sigma)$ and $\phi_2(\sigma)$ but the reference complex functions $K_0(\sigma)$, $K_-(\sigma)$, $K_2(\sigma)$, and $K_+(\sigma)$. However, these can also be immediately obtained through use of the relations of Expressions (1.18a) to (1.18d) if the reference phase functions $\phi_1(\sigma)$ and $\phi_2(\sigma)$ have been obtained by the procedures up to E above.

3.2 Method for Calibrating Reference Phase Function "During Measurement" (No. 2)

3.2.1 Basic Idea

In the same idea as described in the previous section 3.1, "only a variation" in reference phase function can be obtained.

In the previous method (in the previous section 3.1), the "reference amplitude function" was obtained in the pre-calibration, and it was not particularly necessary to obtain the "reference phase function". However, as appeared from Section 3.2, those two functions can be calibrated almost concurrently. It is thus possible to obtain an "initial value of the reference phase function in pre-calibration" so as to only track the variation thereof during measurement.

Advantages in this case include the following.

Slightly additional phase displacement part which might be generated due to characteristics of the spectrometer or the signal processing system can be removed.

Burdensome phase unwrapping is not necessary.

Since a variation in phase difference itself is small, a dynamic range in calculation can be made small. Further, as a result of this, a calculation error can be relatively made small in many cases.

Accordingly, "obtaining only the variation in reference phase function" has its own meaning.

Figure 10:
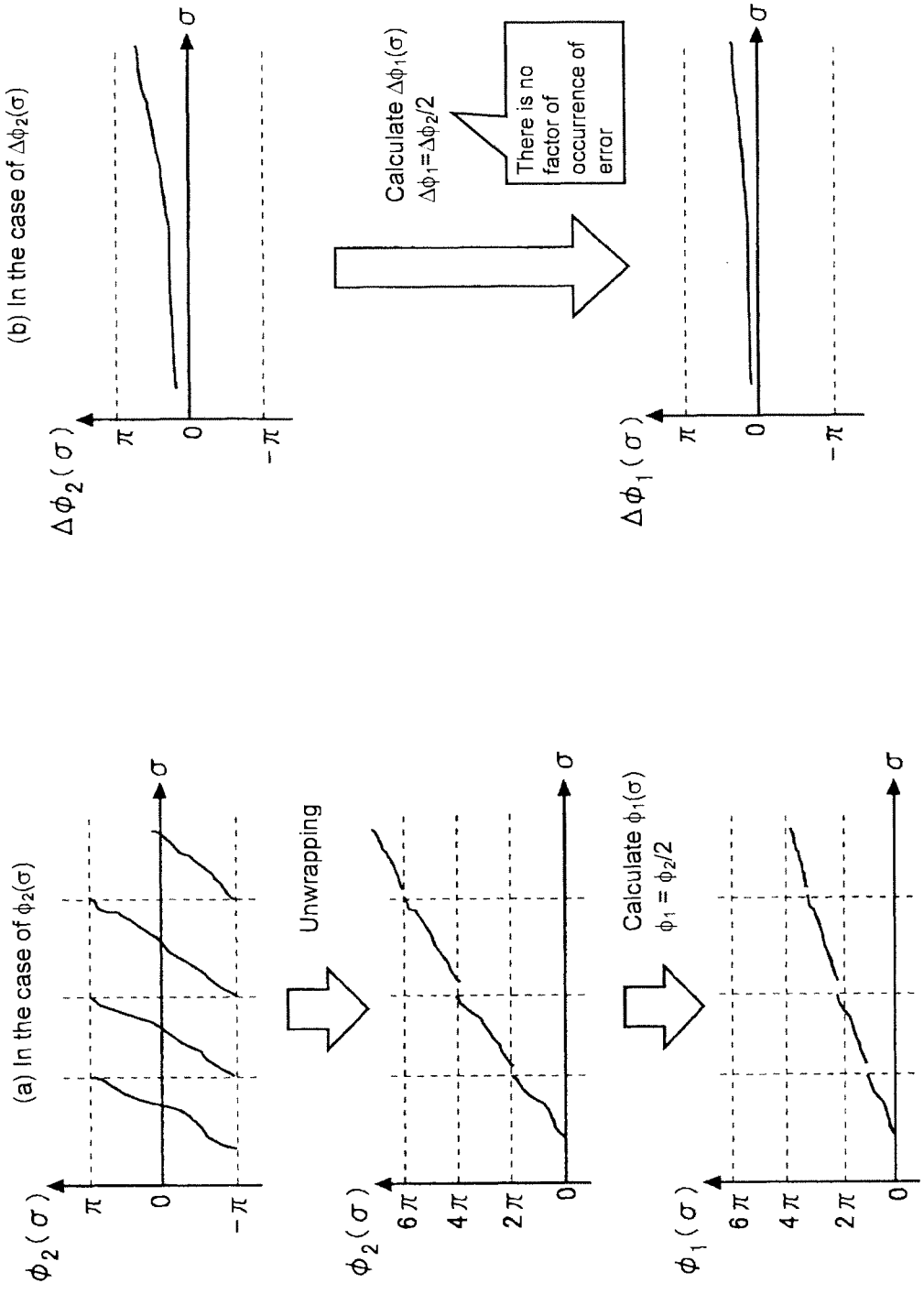
FIG. 10 shows a comparative view for explaining methods (No. 1, 2) for calibrating a reference phase function during measurement.

The following is described as supplement for the foregoing explanation. As shown in FIG. 10, the two methods have different factors of an error in the case of obtaining $\phi_1(\sigma)$ from $\phi_2(\sigma)$. Namely, as shown in FIG. 10A, it is necessary to perform phase unwrapping in the case of obtaining $\phi_1(\sigma)$ from $\phi_2(\sigma)$. This phase unwrapping is a major factor of the error. Especially when a period is at high frequency as compared with sampling, noise is included in the period, or the like, wrong phase unwrapping might be performed. With wrong phase wrapping performed, an error becomes an integer multiple of $2\pi$, leading to calculation of a wrong phase. Further, this error affects a broad wavenumber region. This difference is essentially caused by that a solution of an arg operator (or an arctan operator) for obtaining an argument has ambiguity by the integer multiple of $2\pi$. As opposed to this, as shown in FIG. 10B, it is not necessary in obtaining $\Delta\phi_1(\sigma)$ from $\Delta\phi_2(\sigma)$ to perform phase unwrapping since the variation $\Delta\phi_2(\sigma)$ from the initial value of the reference phase function is small. This allows the measurement error to be relatively small.

3.2.2 Preparation

The use of the "calibration method during measurement" is based upon the premise of pre-calibration of both the "reference amplitude function" and the "reference phase function" prior to measurement. It is to be noted that, as for the phase, highly accurately obtaining the reference phase function is not necessary since a phase value can be corrected later by the variance and the measurement error.

3.2.3 Actual Calibration Method

The basic idea on the calibration method is completely the same as in Section 3.1. There thus exists a calculation method corresponding to all A to E described in Section 3.1.3. Hence, in this section, an idea different from that in the previous section is shown and mathematical expressions are mainly cited in the following description.

First, a couple of symbols are defined. The reference phase functions obtained by the pre-calibration are defined as $\phi_1^{(i)}(\sigma)$ and $\phi_2^{(i)}(\sigma)$. Reference complex functions corresponding to these reference phase functions are expressed as follows according to Expressions (1.18a) to (1.18d).

[Mathematical Expression 33]

$$K_0^{(i)}(\sigma) = \frac{1}{2}m_0(\sigma) \tag{3.16a}$$

$$K_-^{(i)}(\sigma) = \frac{1}{8}m_-(\sigma)\exp i[\phi_2^{(i)}(\sigma) - \phi_1^{(i)}(\sigma)] \tag{3.16b}$$

$$K_2^{(i)}(\sigma) = \frac{1}{4}m_2(\sigma)\exp i\phi_2^{(i)}(\sigma) \tag{3.16c}$$

$$K_+^{(i)}(\sigma) = -\frac{1}{8}m_+(\sigma)\exp i[\phi_2^{(i)}(\sigma) + \phi_1^{(i)}(\sigma)] \tag{3.16d}$$

Assuming that the reference phase functions changed during measurement as follows.

$$\phi_1(\sigma)=\phi_1^{(i)}(\sigma)+\Delta\phi_1(\sigma) \tag{3.17a}$$

$$\phi_2(\sigma)=\phi_2^{(i)}(\sigma)+\Delta\phi_2(\sigma) \tag{3.17b}$$

Below described are methods for obtaining the variations $\Delta\phi_1(\sigma)$ and $\Delta\phi_2(\sigma)$ of the reference phase functions or changes in the reference complex functions corresponding to those variations.

A. Method for Obtaining Reference Phase Function $\phi_2$ from Vibration Component [3]

As described in Method A in the previous section, the phase of Component [3] is expressed as follows.

$$\delta_2(\sigma)=\phi_2(\sigma)=\phi_2^{(i)}(\sigma)+\Delta\phi_2(\sigma) \tag{3.18}$$

Here, the variation in $\phi_2(\sigma)$ can be obtained as $$\Delta\phi_2(\sigma)=\delta_2(\sigma)-\phi_2^{(i)}(\sigma) \tag{3.19}$$

Namely, this means that, once the phase $\delta_2$ of Component [3] is measured, one of the variations $\Delta\phi_2(\sigma)$ in reference phase functions can be immediately determined.

It is to be noted that in Step 2, when not the "paired amplitude and phase" but the "complex representation" is to be obtained, the variation is obtained according to the following expressions.

[Mathematical Expression 34]

$$\delta_2(\sigma) = \arg[F_2(\sigma)] \tag{3.20a}$$

$$\phi_2^{(i)}(\sigma) = \arg[K_2^{(i)}(\sigma)] \tag{3.20b}$$

From $$\Delta\phi_2(\sigma) = \arg[F_2(\sigma)] - \arg[K_2^{(i)}(\sigma)], \tag{3.21}$$

or $$\Delta\phi_2(\sigma) = \arg\left[\frac{F_2(\sigma)}{K_2^{(i)}(\sigma)}\right] \tag{3.22}$$

B. Method for Obtaining Reference Phase Function $\phi_2(\sigma)$ from a Plurality of Vibration Components (Paired [2] and [4], Etc.)

In the method for obtaining the variation in $\phi_2(\sigma)$ from the phase of each of Vibration components [2] and [4], the variation is obtained according to the following expression.

[Mathematical Expression 35]

$$\Delta\phi_2(\sigma) = \left[\frac{1}{2}\{\delta_-(\sigma) + \delta_+(\sigma)\} - \frac{\pi}{2}\right] - \phi_2^{(i)}(\sigma) \quad (3.23)$$

When not the "paired amplitude and phase" but the "complex representation" is to be obtained, the variation is obtained according to the following expression.

[Mathematical Expression 36]

$$\Delta\phi_2(\sigma) = \frac{1}{2}\{\arg[F_-(\sigma)] + \arg[F_+(\sigma)] - \arg[K_-^{(i)}(\sigma)] - \arg[K_+^{(i)}(\sigma)]\} \quad (3.24)$$

Or, the following expressions obtained by rewriting the above expression using a simple formula of the complex function may be applied.

[Mathematical Expression 37]

$$\Delta\phi_2(\sigma) = \frac{1}{2}\left\{\arg\left[\frac{F_-(\sigma)}{K_-^{(i)}(\sigma)}\right] + \arg\left[\frac{F_+(\sigma)}{K_+^{(i)}(\sigma)}\right]\right\}, \quad (3.25)$$

or $$\Delta\phi_2(\sigma) = \frac{1}{2}\arg\left[\frac{F_-(\sigma)}{K_-^{(i)}(\sigma)} \frac{F_+(\sigma)}{K_+^{(i)}(\sigma)}\right] \quad (3.26)$$

It is to be noted that, as noted at the end of Section 3.1.3, the same idea as shown above can be applied to the case of using another term.

C. Combination of A and B

As in the case described in the previous section, adaptive combination of Methods A and B is effective also in the case of obtaining only the "variation" in reference phase functions. It should be noted that a description of the combination is completely the same as that in the previous section and it is thus omitted.

D. Combination of A and B (No. 2)

One of desired mathematical expressions in the case of obtaining only the variation is as follows.

[Mathematical Expression 38]

$$\alpha(\sigma) = \left[\frac{1}{K_2^{(i)}(\sigma)}\right]^2 \quad (3.27a)$$

$$\beta(\sigma) = -\frac{1}{K_-^{(i)}(\sigma)K_+^{(i)}(\sigma)} \quad (3.27b)$$

Since $\arg[\alpha(\sigma)] = \arg[\beta(\sigma)] = 2\phi_2(\sigma)$ in the above expressions, the variation can be obtained as follows.

[Mathematical Expression 39]

$$\Delta\phi_2(\sigma) = \frac{1}{2}\arg\left\{\left[\frac{F_2(\sigma)}{K_2^{(i)}(\sigma)}\right]^2 + \frac{F_-(\sigma)}{K_-^{(i)}(\sigma)} \frac{F_+(\sigma)}{K_+^{(i)}(\sigma)}\right\} \quad (3.28)$$

E. Calculation of $\Delta\phi_1(\sigma)$

Fluctuations in $\Delta\phi_1(\sigma)$ are considered similar to those in $\Delta\phi_2(\sigma)$. It is thus possible to obtain $\Delta\phi_1(\sigma)$ from a measured value of $\Delta\phi_2(\sigma)$ by a comparative calculation using, for example, a thickness ratio.

F. Calculation of Reference Complex Function

In the demodulation of each vibration component in Step 2, when not the "paired amplitude and phase" but the "complex representation" is obtained, what are needed ultimately in obtaining the spectrometric quasi-Stokes parameters (operation of Step 3) are not the reference phase functions $\phi_1(\sigma)$ and $\phi_2(\sigma)$ but the reference complex functions $K_0(\sigma)$, $K_-(\sigma)$, $K_2(\sigma)$, and $K_+(\sigma)$.

If the reference phase function variations $\Delta\phi_1(\sigma)$ and $\Delta\phi_2(\sigma)$ have been obtained by the procedures up to E above, the reference complex functions can be immediately obtained as follows.

[Mathematical Expression 40]

$$K_0(\sigma) = K_0^{(i)}(\sigma) \quad (3.29a)$$

$$K_-(\sigma) = K_-^{(i)}(\sigma)e^{i[\Delta\phi_2(\sigma)-\Delta\phi_1(\sigma)]} \quad (3.29b)$$

$$K_2(\sigma) = K_2^{(i)}(\sigma)e^{i[\Delta\phi_2(\sigma)]} \quad (3.29c)$$

$$K_+(\sigma) = K_+^{(i)}(\sigma)e^{i[\Delta\phi_2(\sigma)+\Delta\phi_1(\sigma)]} \quad (3.29d)$$

Figure 11:
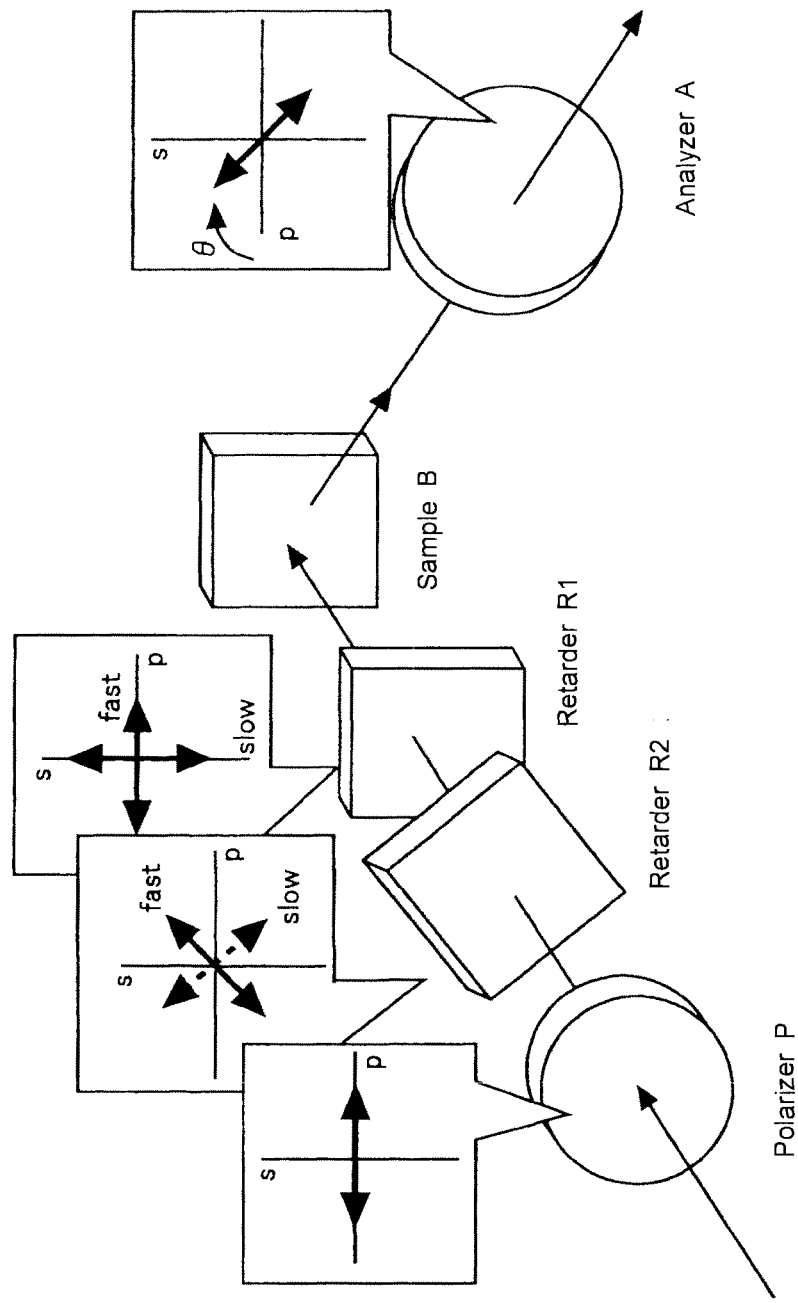
FIG. 11 shows a device configuration view (No. 1) in ellipsometry.
Figure 12:
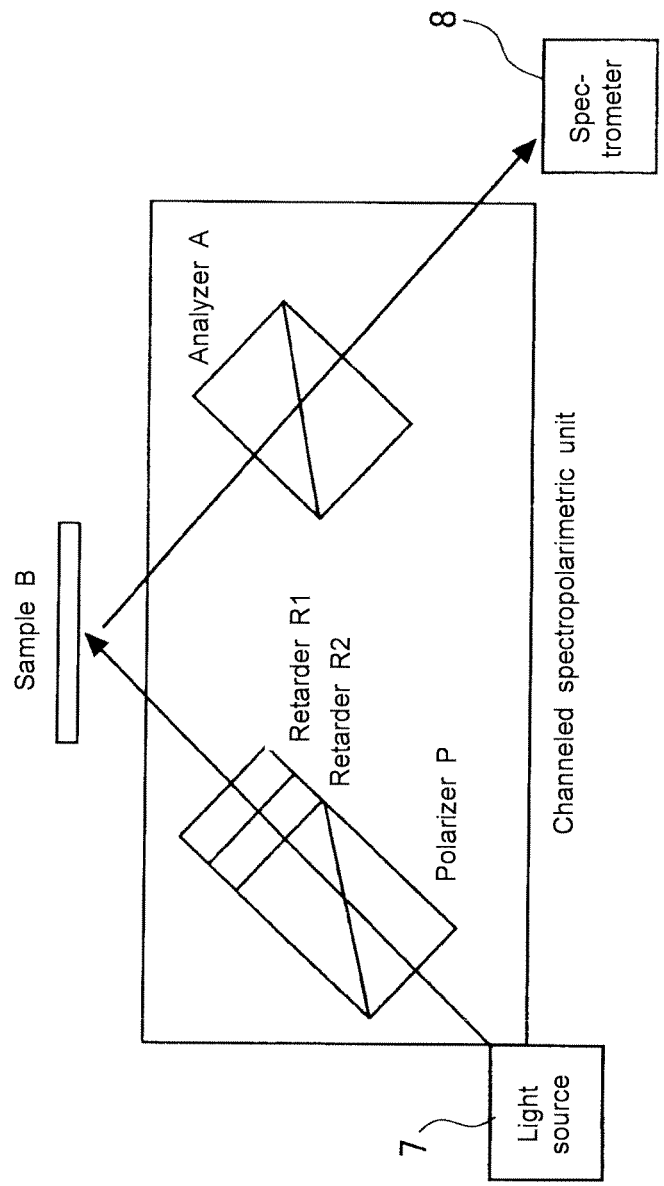
FIG. 12 shows a device configuration view (No. 2) in ellipsometry.

Chapter 4: Specific Embodiment of Present Invention 4.1 Case of Spectroscopic Polarimetry Performed by Reflecting Light on Sample An embodiment of the optical system in the case of measuring a spectropolarization characteristic of a sample by reflecting light on the sample is described in detail with reference to FIGS. 11 to 13. In this case, as shown in FIG. 11 and FIG. 12, the optical system includes the light source 7, the polarizer P, the retarder R2, the retarder R1, the analyzer A, and the spectroscope 8. It is to be noted that reference symbol B denotes a sample on which light is reflected. Further, light emitted from the light source 7 is transmitted through the polarizer P, the retarder R2 and the retarder R1 in this order. The light is then incident on the sample B in a slanting direction, to be reflected thereon. Thereafter, the light is transmitted through the analyzer A and then received in the spectroscope 8. Attention should be paid that this device is configured by arranging an optical element on the light source side with respect to the sample in the configuration of the conventional optical system as shown in FIG. 1B. Further, the orientation of the transmission axis of the polarizer P agrees with the orientation of the principal axis of the retarder R1, and the orientations of the fast axes of the retarder R1 and the retarder R2 are inclined at an angle of −45° from each other. θ shows the azimuth angle of the transmission axis of the analyzer with respect to the fast axis of the retarder R1. Further, the incident plane of the light agrees with the orientation of the fast axis of the retarder R1. It is to be noted that the device including the polarizer P, the retarder R2, the retarder R1 and the analyzer A is referred to as a channeled spectrometer unit.

Figure 13:
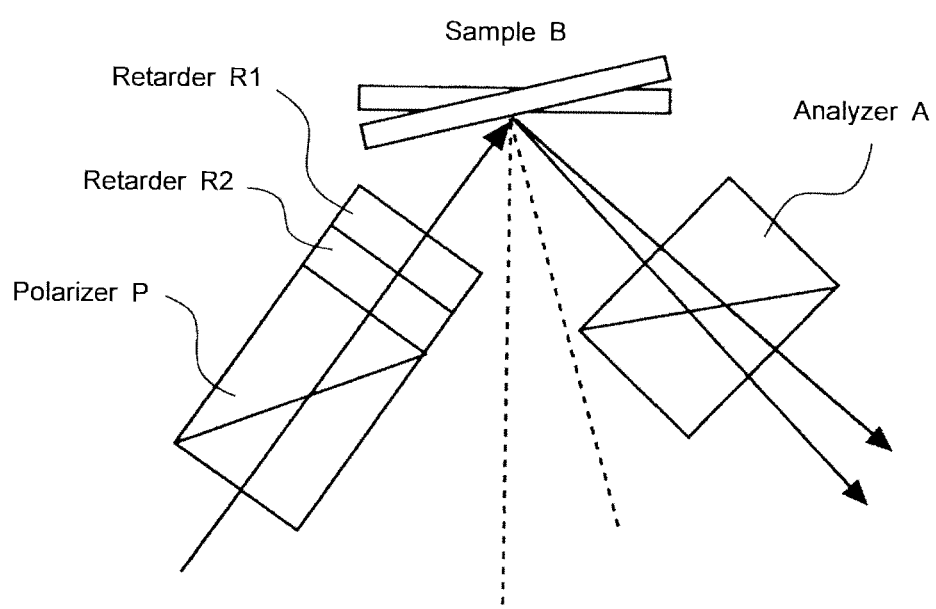
FIG. 13 shows a view for explaining a principle of solving a problem in the case of reflecting light on a sample.

At the same time, according to the optical system as shown in FIG. 11 and FIG. 12, a stable measurement can be realized since the incident direction of the wave surface of light that transmits through the retarders R1 and R2 is not susceptible to the sample, as shown in FIG. 13. That is, it is possible to solve the problem of the retardation change between the time of calibrating the retardation of the retarder and the time of measuring the sample due to changes in distance and direction of a light ray that passes through the retarder.

Further, an ellipsometric parameter and the like are determined from the light incident on the spectroscope 8. A procedure for such determination is described below.

Here, an arctangent of a rate of change in amplitude rate of a p-polarized light (light having an SOP where the polarizing direction runs parallel with the incident plane) and an s-polarized light (light having an SOP where the polarizing direction runs vertical to the incident plane) is expressed as $\psi(\sigma)$, and a phase difference is expressed as $\Delta(\sigma)$. Then, a Mueller matrix of an isotropic medium can be described as follows.

[Mathematical Expression 41]

$$M(\sigma) = \begin{bmatrix} 1 & -\cos 2\Psi(\sigma) & 0 & 0 \\ -\cos 2\Psi(\sigma) & 1 & 0 & 0 \\ 0 & 0 & \sin 2\Psi(\sigma)\cos\Delta(\sigma) & \sin 2\Psi(\sigma)\sin\Delta(\sigma) \\ 0 & 0 & -\sin 2\Psi(\sigma)\sin\Delta(\sigma) & \sin 2\Psi(\sigma)\cos\Delta(\sigma) \end{bmatrix} \quad (4.1)$$

It is thereby considered that $\psi(\sigma)$ and $\Delta(\sigma)$ are obtained as ellipsometric parameters.

Here, the following expressions are satisfied according to Expressions (1.5a) to (1.5d).

[Mathematical Expression 42]

$$M_0(\sigma) = \frac{1}{2} P_0(\sigma)[1 - \cos 2\Psi(\sigma)\cos 2\theta] \quad (4.2a)$$

$$M_1(\sigma) = -\frac{1}{2} P_0(\sigma)[-\cos 2\Psi(\sigma) + \cos 2\theta] \quad (4.2b)$$

$$M_2(\sigma) = \frac{1}{2} P_0(\sigma)\sin 2\Psi(\sigma)\cos\Delta(\sigma)\sin 2\theta \quad (4.2c)$$

$$M_3(\sigma) = \frac{1}{2} P_0(\sigma)\sin 2\Psi(\sigma)\sin\Delta(\sigma)\sin 2\theta \quad (4.2d)$$

Here, assuming that $\theta=45°$, the following expressions are satisfied.

[Mathematical Expression 43]

$$M_0(\sigma) = \frac{1}{2} P_0(\sigma) \quad (4.3)$$

$$M_1(\sigma) = \frac{1}{2} P_0(\sigma)\cos 2\Psi(\sigma)$$

$$M_2(\sigma) = \frac{1}{2} P_0(\sigma)\sin 2\Psi(\sigma)\cos\Delta(\sigma)$$

$$M_3(\sigma) = \frac{1}{2} P_0(\sigma)\sin 2\Psi(\sigma)\sin\Delta(\sigma)$$

Since $M_0(\sigma)$ to $M_3(\sigma)$ which are obtained by demodulation processing include three unknowns: the spectrum $P_0(\sigma)$ and the ellipsometric parameters $\psi(\sigma)$ and $\Delta(\sigma)$, as expressed in the above expressions, it is possible to determine the ellipsometric parameters $\psi(\sigma)$ and $\Delta(\sigma)$.

Moreover, one example of a case where modulating at least one "component" shown in Expressions (1.11a) to (1.11d) gives a useful application is described here.

For example, it is assumed that there is a sample, only a value of $\Delta(\sigma)$ of which is desired to be measured. In such a case, by obtaining only $M_{23}(\sigma)$, two equations of $M_2(\sigma)$ and $M_3(\sigma)$ are obtained. Solving these equations can lead to calculation of the ellipsometric parameter $\Delta(\sigma)$ as follows.

[Mathematical Expression 44]

$$\Delta(\sigma) = \tan^{-1}\left\{\frac{M_3(\sigma)}{M_2(\sigma)}\right\} \quad (4.4)$$

As described before, $M_0(\sigma)$ is obtained from the first spectral intensity, $M_1(\sigma)$ is from the third spectral intensity, and $M_2(\sigma)$ and $M_3(\sigma)$ are from at least one of the second spectral intensity, the fourth spectral intensity, and the fifth spectral intensity. Therefore, with reference to Expression (4.3), $\psi(\sigma)$ which is obtained from the expressions of $M_0(\sigma)$ and $M_1(\sigma)$ can be obtained from the first spectral intensity and the third spectral intensity. In this case, even if the reference phase function is to be calibrated during measurement, calibration of only $\phi_2(\sigma)$ sufficiently meets the need. $\psi(\sigma)$ can also be obtained from at least one of the first spectral intensity and the third spectral intensity and at least one of the second spectral intensity, the fourth spectral intensity and the fifth spectral intensity. Since $\Delta(\sigma)$ can be obtained from $M_2(\sigma)$ and $M_3(\sigma)$, at least one of the second spectral intensity, the fourth spectral intensity and the fifth spectral intensity can be obtained.

Figure 16:
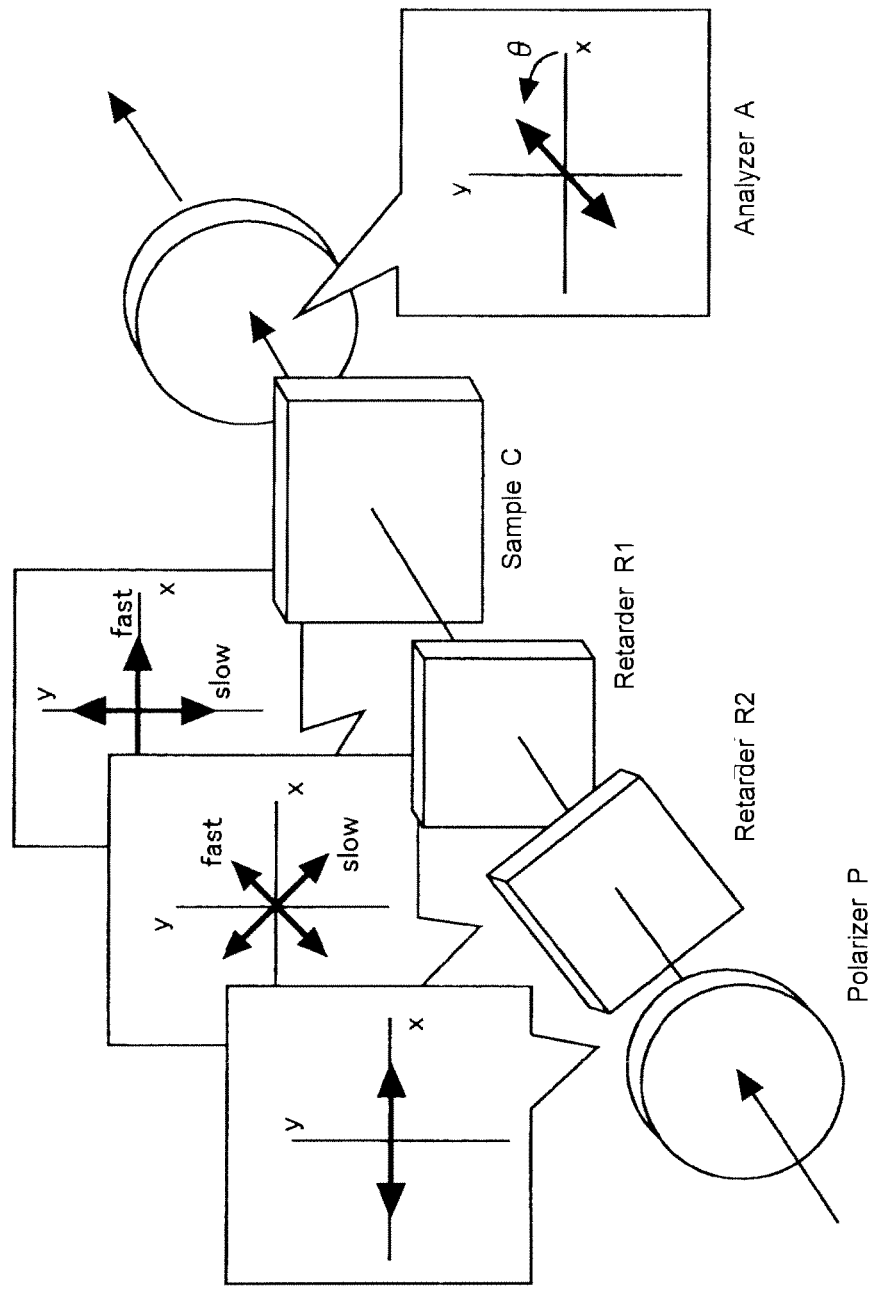
FIG. 16 shows a view for explaining a device configuration (No. 1) in a double refraction measurement.
Figure 17:
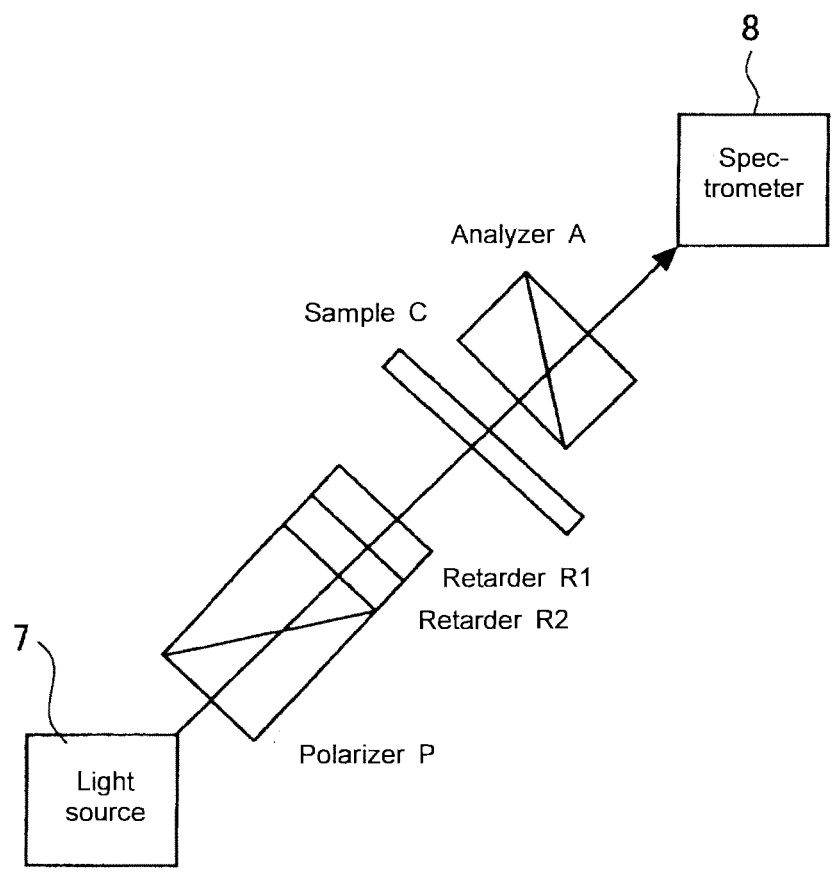
FIG. 17 shows a view for explaining a device configuration (No. 2) in the double refraction measurement.

4.2 Case of Spectroscopic Polarimetry Performed by Transmitting Light Through Sample An embodiment of the optical system in the case of measuring a spectropolarization characteristic of a sample by transmitting light through the sample is described in detail with reference to FIGS. 16 to 18. In this case, as shown in FIG. 16 and FIG. 17, the optical system includes the light source 7, the polarizer P, the retarder R2, the retarder R1, the analyzer A, and the spectroscope 8. It is to be noted that reference symbol C denotes a sample through which light is transmitted. Further, light emitted from the light source 7 is transmitted through the polarizer P, the retarder R2 and the retarder R1 in this order. The light is then incident on the sample C in a vertical direction, to be transmitted therethrough. Thereafter, the light is transmitted through the analyzer A and then received in the spectroscope 8. Note should be taken that this device is configured by arranging an optical element on the light source side with respect to the sample in the configuration of the conventional optical system as shown in FIG. 1B. Here, the orientation of the transmission axis of the polarizer P agrees with the orientation of the fast axis of the retarder R1, while the orientations of the fast axes of the retarder R1 and the retarder R2 are inclined at an angle of −45° from each other. $\theta$ shows the azimuth angle of the transmission axis of the analyzer A with respect to the fast axis of the retarder R1.

Moreover, according to the optical system as shown in FIG. 16 and FIG. 17, since the incident direction of the wave surface of light that transmits through the retarders R1 and R2 is not susceptible to the inclination characteristic (cf. FIG. 18A) and the surface state (cf. FIG. 18B) of the sample, a stable measurement can be realized without restrictions of being unable to measure the surface shape of the sample and a disturbing substance (living body, etc.). Namely, it is possible to solve the problem of the retardation change between the time of calibrating the retardation of the retarder and the time of measuring the sample due to changes in distance and direction of a light ray that passes through the retarder.

Below described is a procedure for obtaining an azimuth angle R of a birefringent axis of a sample (birefringent medium) with respect to the fast axis of the retarder R1, as well as a retardation $\delta(\sigma)$, from light incident on the spectroscope 8.

When the azimuth angle of the birefringent axis of the sample (birefringent medium) with respect to the fast axis of the retarder R1 is R, and the retardation of the sample (birefringent medium) is $\delta(\sigma)$, a Mueller matrix for expressing the sample (birefringent medium) is described as follows.

[Mathematical Expression 45]

$$M(\sigma) = \begin{bmatrix} 1 & 0 & 0 & 0 \\ 0 & \cos^2 2R + \cos\delta(\sigma)\sin^2 2R & \cos 2R\sin 2R(1 - \cos\delta(\sigma)) & -\sin\delta(\sigma)\sin 2R \\ 0 & \cos 2R\sin 2R(1 - \cos\delta(\sigma)) & \sin^2 2R + \cos\delta(\sigma)\cos^2 2R & \cos 2R\sin\delta(\sigma) \\ 0 & \sin\delta(\sigma)\sin 2R & -\cos 2R\sin\delta(\sigma) & \cos\delta(\sigma) \end{bmatrix} \quad (5.1)$$

Here, the following expressions are satisfied according to Expressions (1.5a) to (1.5d).

[Mathematical Expression 46]

$$M_0(\sigma) = \frac{1}{2} P_0(\sigma) \quad (5.2a)$$

$$M_1(\sigma) = \frac{1}{2} P_0(\sigma) \begin{Bmatrix} \cos 2R \cos(2R - 2\theta) + \\ \cos\delta(\sigma)\sin 2R \sin(2R - 2\theta) \end{Bmatrix} \quad (5.2b)$$

$$M_2(\sigma) = \frac{1}{2} P_0(\sigma) \begin{Bmatrix} \sin 2R \cos(2R - 2\theta) - \\ \cos\delta(\sigma)\cos 2R \sin(2R - 2\theta) \end{Bmatrix} \quad (5.2c)$$

$$M_3(\sigma) = -\frac{1}{2} P_0(\sigma)\sin\delta(\sigma)\sin(2R - 2\theta) \quad (5.2d)$$

Here, assuming that $\theta = 45°$, the following expressions are satisfied.

[Mathematical Expression 47]

$$M_0(\sigma) = \frac{1}{2} P_0(\sigma) \quad (5.3a)$$

$$M_1(\sigma) = \frac{1}{2} P_0(\sigma)\cos 2R \sin 2R(1 - \cos\delta(\sigma)) \quad (5.3b)$$

$$M_2(\sigma) = \frac{1}{2} P_0(\sigma)(\sin^2 2R + \cos\delta(\sigma)\cos^2 2R) \quad (5.3c)$$

$$M_3(\sigma) = \frac{1}{2} P_0(\sigma)\cos 2R \sin\delta(\sigma) \quad (5.3d)$$

Since $M_0(\sigma)$ to $M_3(\sigma)$ which are obtained by demodulation processing include three unknowns: the spectrum $P_0(\sigma)$ of the light ray, the azimuth angle R of the birefringent axis, and the retardation $\delta(\sigma)$ of the sample (birefringent medium), it is possible to determine the azimuth angle R of the birefringent axis and the retardation $\delta(\sigma)$ of the sample (birefringent medium).

Moreover, there exists a case where what needs to be obtained may be either the azimuth angle R of the birefringent axis or the retardation $\delta(\sigma)$ of the sample (birefringent medium). For example, in the cases of a liquid crystal, a polymer film, and the like, the orientation of the birefringent axis can be determined when the azimuth angle thereof is obtained. Further, since the azimuth angle R can be obtained only from $M_1(\sigma)$ and $M_2(\sigma)$ while $M_2(\sigma)$ is obtained from the second, fourth or fifth spectral intensity, $M_3(\sigma)$ can be obtained concurrently with $M_2(\sigma)$. Further, if $M_2(\sigma)$ and $M_3(\sigma)$ are known, $M_0(\sigma)$ (obtained from the first spectral intensity) may be used in place of $M_1(\sigma)$ (obtained from the third spectral intensity). Eventually, the necessary spectral intensities are either the first or third spectral intensity and any one of the second, fourth and fifth spectral intensities. This also applies to necessary spectral intensities for obtaining $\delta(\sigma)$.

4.3 Pre-Calibration

Next, pre-calibration of the device configuration which was described in Sections 4.1, 4.2 and the like is described with reference to FIG. 14 and FIG. 15.

Figure 14:
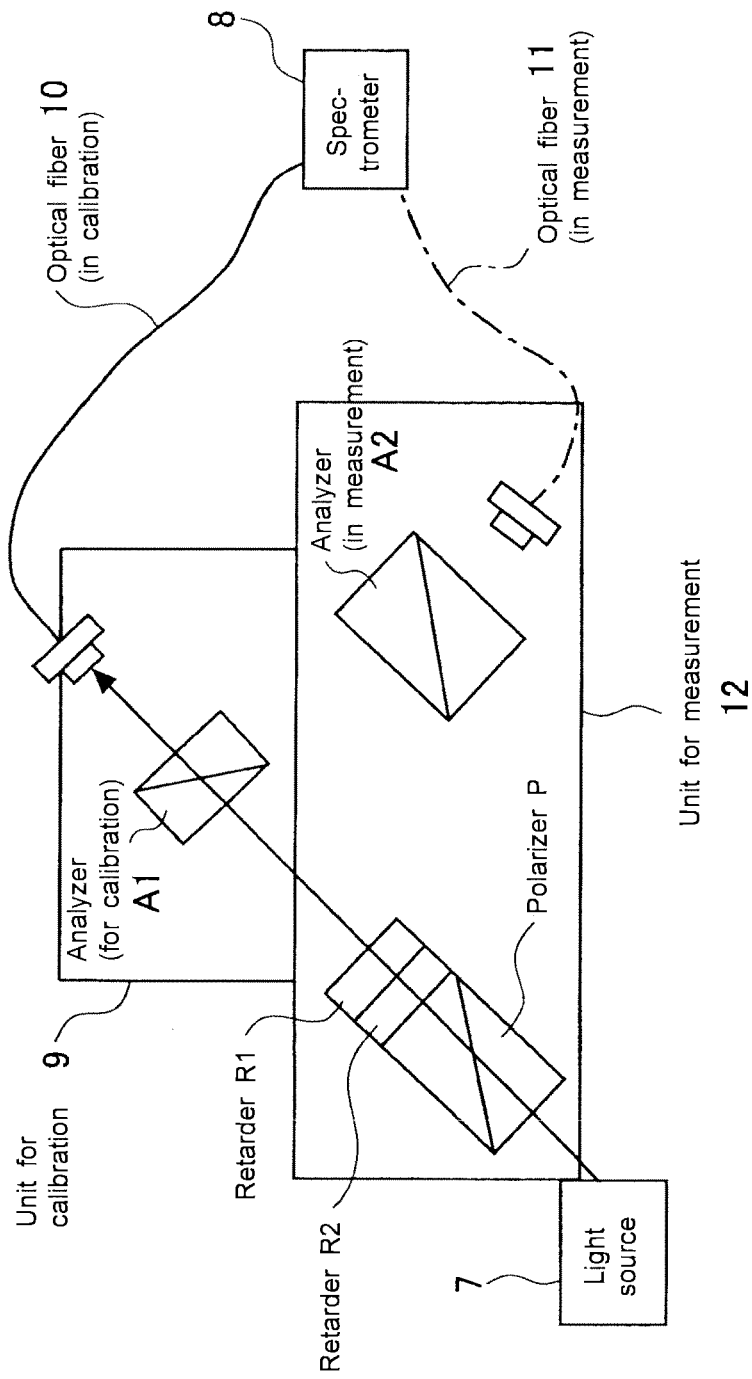
FIG. 14 shows a view for explaining a device configuration in the case of separately installing an optical system for calibration.

FIG. 14 shows a device configuration necessary for pre-calibration. This device is comprised of the light source 7, the spectroscope 8, a unit 9 for pre-calibration, a unit 12 for measurement, an optical fiber 10 for use in pre-calibration, and an optical fiber 11 for use in measurement. The unit 12 for measurement includes the polarizer P, the retarder R2, the retarder R1, and an analyzer A2 for measurement. The unit 9 for pre-calibration includes an analyzer A1 for pre-calibration. It is to be noted that the analyzer A1 for pre-calibration is set to have a known polarization angle.

According to this device, at the time of pre-calibration, light is emitted from the light source 7, and transmitted through the polarizer P, the retarder R2 and the retarder R1 in this order. The light is then transmitted through the analyzer A1 for pre-calibration included in the unit 9 for pre-calibration, to be incident on the spectroscope 8 through the optical fiber 10. On the other hand, when an object to be measured such as a sample exists, a measurement is performed by the methods described in Sections 4.1 and 4.2, using the unit 12 for measurement.

What is of importance here is that there is no need for using the same one analyzer "for pre-calibration" and "for measurement". This is because the analyzer has the (disappearing) characteristic of being susceptible to fluctuations due to variations in incident angle of a transmitted light ray, as above described.

Therefore, the unit 9 for pre-calibration (light-reception part) including the analyzer A1 for pre-calibration set to have a known polarization angle becomes movable to place where calibration is readily performed. Thereby, the advantage of being able to perform pre-calibration in a place which is not a measurement place is obtained. Further, the advantages of time reduction and the like are also obtained simultaneously.

Figure 15:
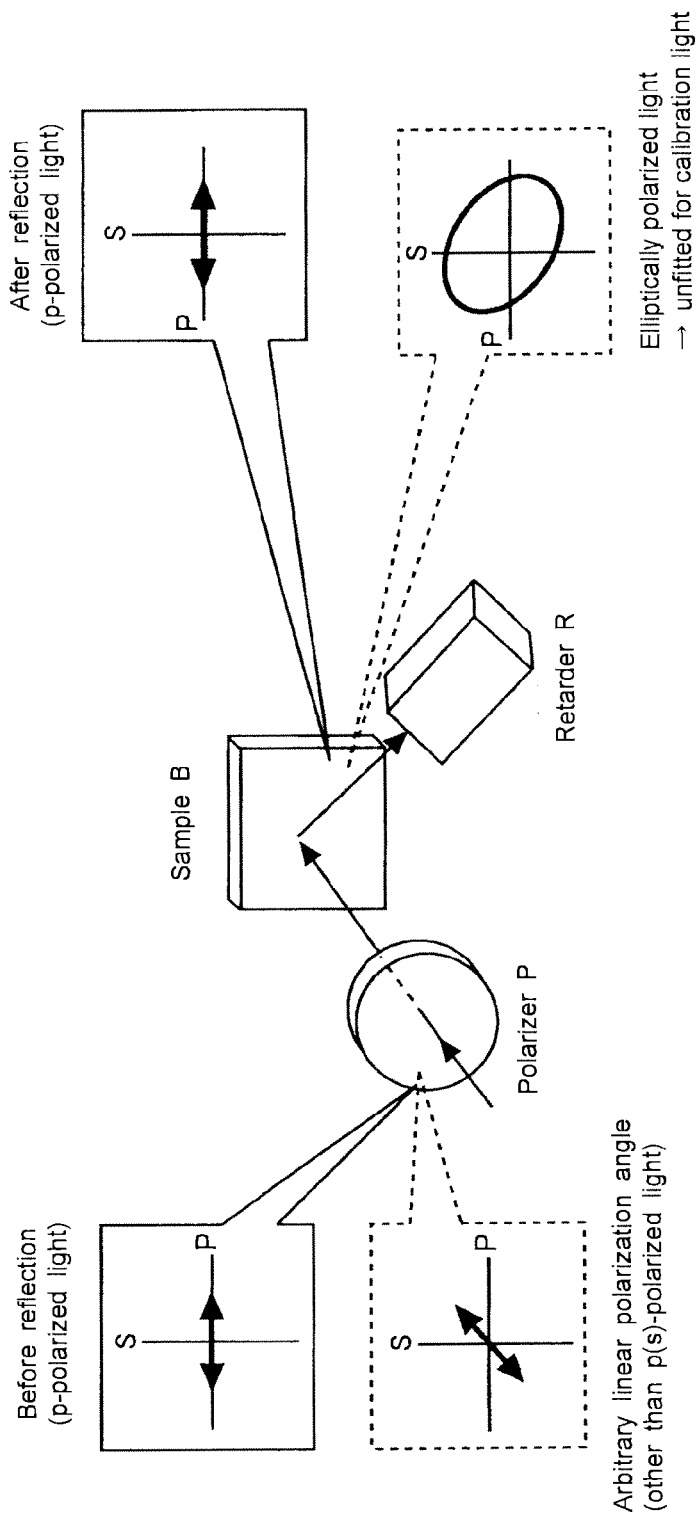
FIG. 15 shows a view for explaining a polarization state of light reflected on the sample.

Further, as for the pre-calibration, a problem with the channeled spectroscopic polarimetry described in "Spectroscopic ellipsometry using channeled spectrum", written by Kazuhiko Oka and Takayuki Katoh, collected papers of lectures in 26th Study Session on Light Wave Sensing Technology (Light wave Sensing Technology Study Session held by Japan Society of Applied Physics, Dec. 19-20, 2000) pp. 107-114 is shown in FIG. 15. In FIG. 15, light is incident from the lower left of the figure. The light is transmitted through the polarizer P, reflected on the sample B, and then transmitted through the retarder R.

In this calibration, it is necessary to apply known linearly polarized light to the channeled spectroscopic polarimeter at the time of calibration. Namely, it is necessary to adjust an SOP of light to be incident on the sample so that the light has the SOP of the known linearly polarized light after reflection on the sample. This has required changing the light to be incident on the sample to the p-polarized light (light having an SOP where the polarizing direction runs parallel with the incident plane) and an s-polarized light (light having an SOP where the polarizing direction runs vertical to the incident plane), limited to the time of calibration. (Light other than the p-polarized light and the s-polarized light undesirably becomes elliptically polarized light after reflection on the sample. Since the SOP of the elliptically polarized light depends upon a refraction index of the sample, surface roughness of the sample, or the like, treating the elliptically polarized light as calibration light might cause generation of a measurement error, which is inconvenient in calibration.) Further, it has been necessary to adjust the polarizer P again so as to have a known rotation angle other than the p-polarized light and the s-polarized light at the time of measurement. This has required a system for adjusting the rotation angle of the polarizer, such as a stage, preventing size reduction in the channeled spectropolarimetric unit.

However, according to the calibration method of the present embodiment, pre-calibration is not accompanied by reflection on the sample as apparent from FIG. 14, thereby giving the advantage of eliminating the need for arranging a polarization angle adjustment system on the light-projection side (retarder side), to permit size reduction in light-projection side unit.

Figure 19:
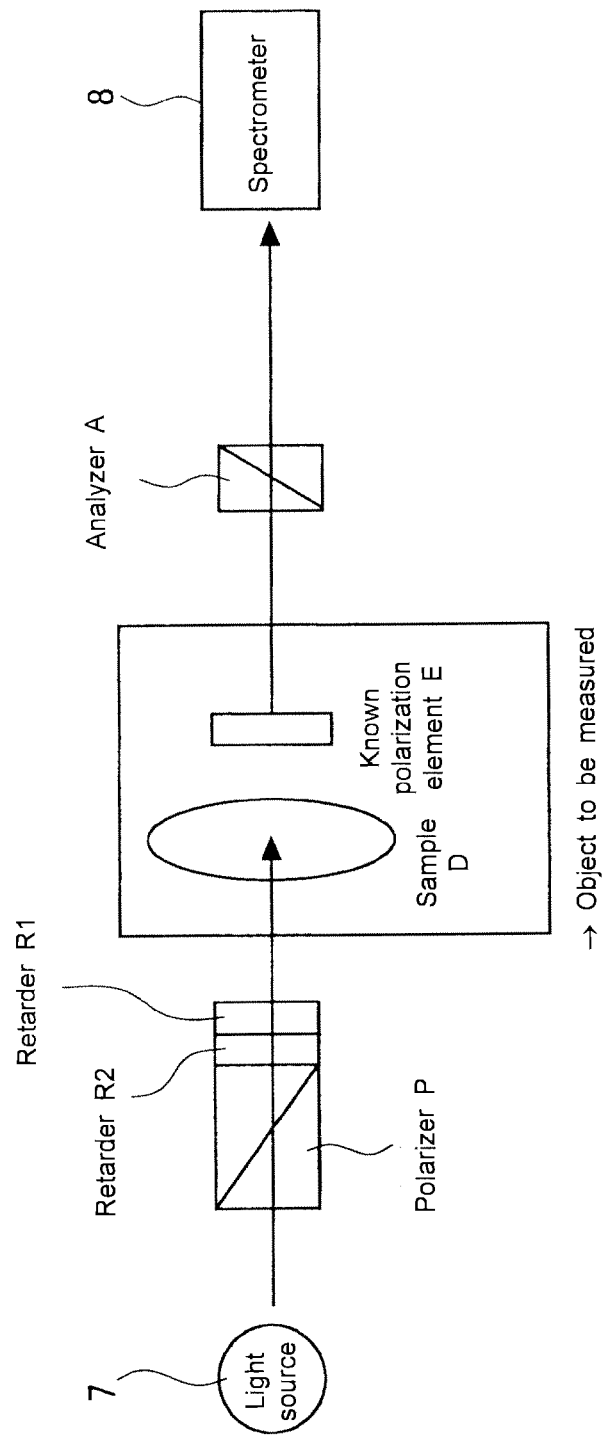
FIG. 19 shows a view for explaining a device configuration in the case of arranging a polarization element having a known spectropolarization characteristic in front of or behind the sample.

4.4 Case where Object to be Measured Includes Known Polarization Element Other than Sample There are some cases where the object to be measured includes a polarization element (e.g. quarter wave plate) having a known polarization characteristic, and FIG. 19 shows a device configuration of an optical system in such cases. In this figure, the optical system includes the light source 7, the polarizer P, the retarder R2, the retarder R1, the analyzer A and the spectroscope 8. The object to be measured includes the sample D and a known polarization element E. Light emitted from the light source 7 is transmitted through the polarizer P, the retarder R2 and the retarder R1 in this order. The light is then reflected on or transmitted through the object to be measured, and transmitted through the analyzer A, to be incident on the spectroscope 8.

In the arithmetic processing for obtaining a spectroscopic quasi-Stokes parameter of the sample in this case, the sample and the known sample are regarded and measured as one object to be measured, and the effect of the known polarization element may be eliminated from the obtained equation (spectroscopic quasi-Stokes parameter). In the following, as an example, a case is considered where a quarter wave plate is arranged in a position after the sample such that the slow axis thereof runs parallel with the fast axis of the first retarder. (In FIG. 19, the known polarization element E is regarded as the quarter wave plate.)

The sample and quarter wave plate are regarded as one object to be measured and the Mueller matrix thereof is described as follows.

[Mathematical Expression 48]

$$M'(\sigma) = \begin{pmatrix} \hat{m}'_{00}(\sigma) & \hat{m}'_{01}(\sigma) & \hat{m}'_{02}(\sigma) & \hat{m}'_{03}(\sigma) \\ \hat{m}'_{10}(\sigma) & \hat{m}'_{11}(\sigma) & \hat{m}'_{12}(\sigma) & \hat{m}'_{13}(\sigma) \\ \hat{m}'_{20}(\sigma) & \hat{m}'_{21}(\sigma) & \hat{m}'_{22}(\sigma) & \hat{m}'_{23}(\sigma) \\ \hat{m}'_{30}(\sigma) & \hat{m}'_{31}(\sigma) & \hat{m}'_{32}(\sigma) & \hat{m}'_{33}(\sigma) \end{pmatrix} \quad (6.1)$$

Spectroscopic quasi-Stokes parameters are obtained which are described using Mueller matrix elements in the frame of Expression (6.1). Here, it is assumed that a Mueller matrix of the sample essentially required to be known is as follows.

[Mathematical Expression 49]

$$M(\sigma) = \begin{pmatrix} \hat{m}_{00}(\sigma) & \hat{m}_{01}(\sigma) & \hat{m}_{02}(\sigma) & \hat{m}_{03}(\sigma) \\ \hat{m}_{10}(\sigma) & \hat{m}_{11}(\sigma) & \hat{m}_{12}(\sigma) & \hat{m}_{13}(\sigma) \\ \hat{m}_{20}(\sigma) & \hat{m}_{21}(\sigma) & \hat{m}_{22}(\sigma) & \hat{m}_{23}(\sigma) \\ \hat{m}_{30}(\sigma) & \hat{m}_{31}(\sigma) & \hat{m}_{32}(\sigma) & \hat{m}_{33}(\sigma) \end{pmatrix} \quad (6.2)$$

Then, the relation between this Mueller matrix and a Mueller matrix $M'(\sigma)$ of the object to be measured is as follows.

[Mathematical Expression 50]

$$M(\sigma) = \begin{pmatrix} \hat{m}_{00}(\sigma) & \hat{m}_{01}(\sigma) & \hat{m}_{02}(\sigma) & \hat{m}_{03}(\sigma) \\ \hat{m}_{10}(\sigma) & \hat{m}_{11}(\sigma) & \hat{m}_{12}(\sigma) & \hat{m}_{13}(\sigma) \\ \hat{m}_{20}(\sigma) & \hat{m}_{21}(\sigma) & \hat{m}_{22}(\sigma) & \hat{m}_{23}(\sigma) \\ \hat{m}_{30}(\sigma) & \hat{m}_{31}(\sigma) & \hat{m}_{32}(\sigma) & \hat{m}_{33}(\sigma) \end{pmatrix}$$
$$= \begin{pmatrix} \hat{m}'_{00}(\sigma) & \hat{m}'_{01}(\sigma) & \hat{m}'_{02}(\sigma) & \hat{m}'_{03}(\sigma) \\ \hat{m}'_{10}(\sigma) & \hat{m}'_{11}(\sigma) & \hat{m}'_{12}(\sigma) & \hat{m}'_{13}(\sigma) \\ -\hat{m}'_{30}(\sigma) & -\hat{m}'_{31}(\sigma) & -\hat{m}'_{32}(\sigma) & -\hat{m}'_{33}(\sigma) \\ \hat{m}'_{20}(\sigma) & \hat{m}'_{21}(\sigma) & \hat{m}'_{22}(\sigma) & \hat{m}'_{23}(\sigma) \end{pmatrix} \quad (6.3)$$

This means that the spectroscopic quasi-Stokes parameters obtained using this polarimeter are determined by the elements on the first row, the second row and the fourth row of Expression (6.2) of the Mueller matrix of the sample which is essentially required to be known. Namely, the elements associated with the spectroscopic quasi-Stokes parameters are different from those in the case without the quarter wave plate. However, the number of parameters obtained is four, which is the same as in the case without the quarter wave plate. It should thus be noted that some of the spectropolarization parameters of the sample can be calculated also in the case with the quarter wave plate. As apparent form the above, the use of the quarter wave plate or the like permits for changing the relational expression of the Mueller matrix of the sample and the spectroscopic quasi-Stokes parameters to be measured. Actively using this fact can for example lead to enhancement of measurement sensitivity with respect to the specific spectropolarization parameter. As an example of such use, the case of calculating the retardation of the sample shown in Section 4.2 is considered. In the case without the quarter wave plate, when the azimuth angle R almost agrees with the azimuth angle $\theta$ of the analyzer, $\sin(2R-2\theta)$ in Expressions (5.2a) to (5.2d) become a value close to zero, the spectroscopic quasi-Stokes parameter has almost no sensitivity with respect to the retardation $\delta$. This results in degradation in measurement accuracy of $\delta$. On the other hand, in the case with the quarter wave plate, the spectroscopic quasi-Stokes parameters are obtained from the first row, the second row and the fourth row in Expression (5.1) of the Mueller matrix of the sample.

[Mathematical Expression 51]

$$M_0(\sigma) = \frac{1}{2}P_0(\sigma)$$

$$M_1(\sigma) = \frac{1}{2}P_0(\sigma)\left\{\begin{array}{c}(\cos^2 2R + \cos\delta(\sigma)\sin^2 2R)\cos 2\theta - \\ \sin\delta(\sigma)\sin 2R\sin 2\theta\end{array}\right\}$$

$$M_2(\sigma) = \frac{1}{2}P_0(\sigma)\left\{\begin{array}{c}\cos 2R\sin 2R(1 - \cos\delta(\sigma)\cos 2\theta - \\ \sin\delta(\sigma)\cos 2R\sin 2\theta\end{array}\right\}$$

$$M_3(\sigma) = \frac{1}{2}P_0(\sigma)\left\{\begin{array}{c}\sin\delta(\sigma)\sin 2R\cos 2\theta + \\ \cos\delta(\sigma)\sin 2\theta\end{array}\right\}$$

Hence the sensitivity with respect to the retardation δ can be obtained regardless of the azimuth angle R. It is further found that the sensitivity becomes constant especially when θ=45°.

5. Demodulation of Analyzer and known Polarization Element and Expansion of Number of Measurable Spectropolarization Parameters by Modulation As described in the previous chapters, the use of measurement principle of the present invention allows concurrent and independent measurement of four spectroscopic quasi-Stokes parameters in one spectrum measurement. This links to the characteristic of being capable of concurrently determining a plurality of spectropolarization parameters regarding an object to be measured (i.e. sample included therein).

However, there are some cases where measurement is not sufficiently performed due to insufficient information obtained only from the above-mentioned four spectroscopic quasi-Stokes parameters, depending upon properties of the sample. Examples of such a case include a case where the polarization parameter necessary to concurrently measure exceeds four.

As shown in Expression (1.1), the Mueller matrix for expressing the SOP of the sample has sixteen elements, and depending upon the sample, each of those sixteen element may be a different value. For example, in the case of measuring the spectropolarization characteristic of the sample by reflecting light on the sample, the condition of the sample was being an isotropic medium in Expression (4.1), but when the sample is an anisotropic medium, the sixteen elements are expressed by up to seven independent parameter equations. This was demonstrated by G E. Jellison, Jr, ("Handbook of ellipsometry", edited by H. G. Thompkins and E. A. Irene, William Andrew Publishing, P. 244). Further, there is even a case where, when the sample is a heterogeneous medium, the sixteen elements are all independent parameters in measurement of transmitted light or reflected light on or through the sample.

In the present chapter described is expansion of the principle of the present invention for the above-mentioned case where a large number of parameters are required to be obtained. It is to be noted that, although applying this expansion technique causes loss of the characteristic of the channeled spectroscopic polarimetry of "needing no mechanical or active polarization control element", another advantage of "needing to measure a necessary spectrum only an extremely few times" is generated which is not included in the characteristics of the corresponding conventional method.

5.1 Relation Between Spectroscopic Quasi-Stokes Parameter and Mueller Matrix of Sample Prior to description on a method for expanding the principle, as preparation for performing the method, a relational expression between the spectroscopic quasi-Stokes parameters and Mueller matrix of the sample is derived. A case is considered here where the object to be measured is composed of the sample D and the known polarization element E, as in FIG. 19. Mueller matrixes of the sample D and the known polarization element E are described as follows.

[Mathematical Expression 52]

$$M_{sample}(\sigma) = \begin{bmatrix} \hat{m}_{s00}(\sigma) & \hat{m}_{s01}(\sigma) & \hat{m}_{s02}(\sigma) & \hat{m}_{s03}(\sigma) \\ \hat{m}_{s10}(\sigma) & \hat{m}_{s11}(\sigma) & \hat{m}_{s12}(\sigma) & \hat{m}_{s13}(\sigma) \\ \hat{m}_{s20}(\sigma) & \hat{m}_{s21}(\sigma) & \hat{m}_{s22}(\sigma) & \hat{m}_{s23}(\sigma) \\ \hat{m}_{s30}(\sigma) & \hat{m}_{s31}(\sigma) & \hat{m}_{s32}(\sigma) & \hat{m}_{s33}(\sigma) \end{bmatrix} \quad (7.1a)$$

$$M_{pc}(\sigma) = \begin{bmatrix} \hat{m}_{p00}(\sigma) & \hat{m}_{p01}(\sigma) & \hat{m}_{p02}(\sigma) & \hat{m}_{p03}(\sigma) \\ \hat{m}_{p10}(\sigma) & \hat{m}_{p11}(\sigma) & \hat{m}_{p12}(\sigma) & \hat{m}_{p13}(\sigma) \\ \hat{m}_{p20}(\sigma) & \hat{m}_{p21}(\sigma) & \hat{m}_{p22}(\sigma) & \hat{m}_{p23}(\sigma) \\ \hat{m}_{p30}(\sigma) & \hat{m}_{p31}(\sigma) & \hat{m}_{p32}(\sigma) & \hat{m}_{p33}(\sigma) \end{bmatrix} \quad (7.1b)$$

The Mueller matrix of the object to be measured is given by the product of the above two Mueller matrixes, i.e.

$$M(\sigma) = M_{pc}(\sigma)M_{sample}(\sigma) \quad (7.2)$$

Expression (7.2) is written as follows using the element of each matrix.

$$\hat{m}_{ij}(\sigma) = \sum_{k=0}^{3} \hat{m}_{pik}(\sigma)\hat{m}_{skj}(\sigma) \quad (7.3)$$

where i and j are integers from 0 to 3.

When Expression (7.3) is substituted into Expressions (1.6a) to (1.6d), the following expression is derived for relating the spectroscopic quasi-Stokes parameter $M_I(\sigma)$ of the object to be measured (where I=0 . . . 3) to the Mueller matrix of the sample.

[Mathematical Expression 53]

$$M_I(\sigma) = \frac{1}{2}P_0(\sigma)\begin{bmatrix} \sum_{k=0}^{3}\hat{m}_{p0k}(\sigma)\hat{m}_{skl}(\sigma) + \\ \sum_{k=0}^{3}\hat{m}_{p1k}(\sigma)\hat{m}_{skl}(\sigma)\cos 2\theta + \\ \sum_{k=0}^{3}\hat{m}_{p2k}(\sigma)\hat{m}_{skl}(\sigma)\sin 2\theta \end{bmatrix}$$

$$= P_0(\sigma)\sum_{k=0}^{3}\hat{a}_k(\sigma)\hat{m}_{skl}(\sigma) \quad (7.4)$$

where $$\hat{a}_k(\sigma) = \frac{1}{2}\hat{m}_{p0k}(\sigma) + \frac{1}{2}\hat{m}_{p1k}(\sigma)\cos 2\theta + \frac{1}{2}\hat{m}_{p2k}(\sigma)\sin 2\theta \quad (7.5)$$

The next relational expression using vectors and columns is immediately derived from Expression (7.4).

$$[M_0(\sigma) \quad M_1(\sigma) \quad M_2(\sigma) \quad M_3(\sigma)] = P_0(\sigma)[\hat{a}_0(\sigma) \quad \hat{a}_1(\sigma) \quad \hat{a}_2(\sigma) \quad \hat{a}_3(\sigma)] \begin{bmatrix} \hat{m}_{s00}(\sigma) & \hat{m}_{s01}(\sigma) & \hat{m}_{s02}(\sigma) & \hat{m}_{s03}(\sigma) \\ \hat{m}_{s10}(\sigma) & \hat{m}_{s11}(\sigma) & \hat{m}_{s12}(\sigma) & \hat{m}_{s13}(\sigma) \\ \hat{m}_{s20}(\sigma) & \hat{m}_{s21}(\sigma) & \hat{m}_{s22}(\sigma) & \hat{m}_{s23}(\sigma) \\ \hat{m}_{s30}(\sigma) & \hat{m}_{s31}(\sigma) & \hat{m}_{s32}(\sigma) & \hat{m}_{s33}(\sigma) \end{bmatrix} \quad (7.6)$$

$$= P_0(\sigma)[\hat{a}_0(\sigma) \quad \hat{a}_1(\sigma) \quad \hat{a}_2(\sigma) \quad \hat{a}_3(\sigma)]M_{sample}(\sigma)$$

The above expression relates the four spectroscopic quasi-Stokes parameters $M_0(\sigma)$, $M_1(\sigma)$, $M_2(\sigma)$, and $M_3(\sigma)$ directly to the Mueller matrix $M_{sample}(\sigma)$ of the sample. Here, the element $\hat{a}_k(\sigma)$ (k=0 . . . 3) of the vector for relating the spectroscopic quasi-Stokes parameters to the Mueller matrix is an amount determined only by the characteristic of the known polarization element E and the azimuth angle θ of the analyzer A (azimuth angle of the transmission axis of the analyzer A with respect to the fast axis of the retarder R1), as apparent from the definition of Expression (7.5), and does not depend upon the "Mueller matrix of the sample". It is to be noted that the above argument can be applied as it is to the case without the known polarization element E after the sample D in FIG. 19 if Expression (7.1) is replaced by a 4×4 unit matrix.

5.2 (Method for Increasing Number of Measurable Parameters (and Method for Completely Measuring Mueller Matrix)

As described in the previous chapters, it is possible to concurrently and independently measure the spectroscopic quasi-Stokes parameters $M_0(\sigma)$, $M_1(\sigma)$, $M_2(\sigma)$, and $M_3(\sigma)$ by the method of the present invention. By forming an equation based upon Expression (7.6) using the obtained spectroscopic quasi-Stokes parameters, it is possible to obtain up to four spectroscopic quasi-Stokes parameters regarding the sample, as shown in the example of Chapter 4.

[Mathematical Expression 54]

$$[\hat{a}_0(\sigma)\hat{a}_1(\sigma)\hat{a}_2(\sigma)\hat{a}_3(\sigma)]$$

However, there could be cases where a large number of spectropolarization parameters need to be obtained, or the above equation is difficult to solve. In such cases, the number of equations can be increased by changing a vector for giving a coefficient in several times and repeating measurement at each of the changes. Since this coefficient vector depends only upon the characteristic of the known polarization element E and the azimuth angle θ of the analyzer A, controlling either one of them allows changing of the vector. With the number of equations increased, it is possible to increase the number of independent spectropolarization parameters which are concurrently obtained.

Here, especially the case of performing measurements under four different conditions regarding the known polarization element E and the analyzer A is considered. When spectroscopic quasi-Stokes parameters obtained in the respective cases are differentiated by means of superscript characters (p)=0 . . . 3, the following relational expressions of matrixes are established, as seen from Expression (7.6).

[Mathematical Expression 55]

$$\begin{bmatrix} M_0^{(0)}(\sigma) & M_1^{(0)}(\sigma) & M_2^{(0)}(\sigma) & M_3^{(0)}(\sigma) \\ M_0^{(1)}(\sigma) & M_1^{(1)}(\sigma) & M_2^{(1)}(\sigma) & M_3^{(1)}(\sigma) \\ M_0^{(2)}(\sigma) & M_1^{(2)}(\sigma) & M_2^{(2)}(\sigma) & M_3^{(2)}(\sigma) \\ M_0^{(3)}(\sigma) & M_1^{(3)}(\sigma) & M_2^{(3)}(\sigma) & M_3^{(3)}(\sigma) \end{bmatrix} = \quad (7.7)$$

$$P_0(\sigma) \begin{bmatrix} \hat{a}_0^{(0)}(\sigma) & \hat{a}_1^{(0)}(\sigma) & \hat{a}_2^{(0)}(\sigma) & \hat{a}_3^{(0)}(\sigma) \\ \hat{a}_0^{(1)}(\sigma) & \hat{a}_1^{(1)}(\sigma) & \hat{a}_2^{(1)}(\sigma) & \hat{a}_3^{(1)}(\sigma) \\ \hat{a}_0^{(2)}(\sigma) & \hat{a}_1^{(2)}(\sigma) & \hat{a}_2^{(2)}(\sigma) & \hat{a}_3^{(2)}(\sigma) \\ \hat{a}_0^{(3)}(\sigma) & \hat{a}_1^{(3)}(\sigma) & \hat{a}_2^{(3)}(\sigma) & \hat{a}_3^{(3)}(\sigma) \end{bmatrix} M_{sample}(\sigma)$$

In this expression, the first matrix on the right side above is:

$$N(\sigma) = \begin{bmatrix} \hat{a}_0^{(0)}(\sigma) & \hat{a}_1^{(0)}(\sigma) & \hat{a}_2^{(0)}(\sigma) & \hat{a}_3^{(0)}(\sigma) \\ \hat{a}_0^{(1)}(\sigma) & \hat{a}_1^{(1)}(\sigma) & \hat{a}_2^{(1)}(\sigma) & \hat{a}_3^{(1)}(\sigma) \\ \hat{a}_0^{(2)}(\sigma) & \hat{a}_1^{(2)}(\sigma) & \hat{a}_2^{(2)}(\sigma) & \hat{a}_3^{(2)}(\sigma) \\ \hat{a}_0^{(3)}(\sigma) & \hat{a}_1^{(3)}(\sigma) & \hat{a}_2^{(3)}(\sigma) & \hat{a}_3^{(3)}(\sigma) \end{bmatrix} \quad (7.8)$$

When this matrix has an inverse matrix $N^{-1}(\sigma)$, it becomes possible to inverse transform Expression (7.7), so as to obtain the Mueller matrix $M_{sample}(\sigma)$ as:

$$M_{sample}(\sigma) = \frac{1}{P_0(\sigma)} N^{-1}(\sigma) \begin{bmatrix} M_0^{(0)}(\sigma) & M_1^{(0)}(\sigma) & M_2^{(0)}(\sigma) & M_3^{(0)}(\sigma) \\ M_0^{(1)}(\sigma) & M_1^{(1)}(\sigma) & M_2^{(1)}(\sigma) & M_3^{(1)}(\sigma) \\ M_0^{(2)}(\sigma) & M_1^{(2)}(\sigma) & M_2^{(2)}(\sigma) & M_3^{(2)}(\sigma) \\ M_0^{(3)}(\sigma) & M_1^{(3)}(\sigma) & M_2^{(3)}(\sigma) & M_3^{(3)}(\sigma) \end{bmatrix} \quad (7.9)$$

This expression means that, by changing either one or both of the characteristic of the known polarization element E and the azimuth angle θ of the analyzer A to perform measurements of at least four kinds of spectroscopic quasi-Stokes parameter, all of the sixteen elements of the Mueller matrix of the sample can be concurrently and independently determined. It is however necessary at this time to control the known polarization element E and the analyzer A so that $N(\sigma)$ has an inverse matrix. It is to be noted that, if the number of conditions for measurement increases more than four, the number of equations can be increased. If the idea of least-squares is employed, an error due to an influence of noise or the like can be reduced. On the contrary, when the number of measurements is less than four, all the sixteen elements cannot be independently determined, but still a large number of spectroscopic quasi-Stokes parameter expressions can be obtained as compared with the case of not changing the characteristic of the known polarization element E and the azimuth angle θ of the analyzer A, resulting in that a larger number of spectropolarization parameters of the sample can be obtained.

Here, attention should be given to that the present measurement method has a large advantage as compared with the conventional method even in the case of moving the known polarization element E and the analyzer A. Although "mechanical or active polarization control" is necessary for certain, the number of necessary measurement steps is significantly different from that of the conventional method. According to the present method, four spectroscopic quasi-Stokes parameters are obtained in one measurement, meaning that in terms of the number of parameters to be obtained, the number of measurements can be reduced to the order of a quarter of the number of measurements in the conventional method. For example, when all of the 16 elements of the Mueller matrix are to be measured, only four times of measurements are required at the minimum in the present method, whereas in the conventional method, the spectrum measurement needs to be repeated sixteen times at the minimum, and usually 20 to 30 times. This means that the present method has large advantages in terms of reduction in measurement time or simplification of the measurement system.

In addition, the characteristic of the known polarization element E and the azimuth angle θ of the analyzer A can be changed by a variety of methods. A first method is changing either or both of azimuth angles θ of the two elements. Such a change may be made by actually rotating the element, or replacing the element by an element having a different azimuth angle θ, or inserting a Faraday cell or the like in a position before the element so as to magneto-optically rotate the azimuth angle θ of the element from the installation orientation. A second method is introducing a compensator capable of modulation such as an electro-optic modulator, a photoelastic modulator, or a liquid-crystal optical modulator, to change a retardation of one of parameters for determining a Mueller matrix of this element. A third method is combining the above-mentioned methods. (It is to be noted that the above-mentioned methods do not limit the method to be performed.) Further, the known polarization element E is not necessarily composed of a single element. For example, the known polarization element E may be constituted by combination of a plurality of compensators capable of modulation.

5.3 Example

The case of rotating a compensator (lower-order retarder or zero-order retarder) as the known polarization element E is shown. When the retardation of this compensator is $\delta_c(\sigma)$, and the azimuth thereof is $\theta_c$,

[Mathematical Expression 56]

$\hat{a}_k(\sigma)$ ($k=0\ldots 3$) are expressed as follows.

$$\hat{a}_0(\sigma) = \frac{1}{2} \tag{7.10a}$$

$$\hat{a}_1(\sigma) = \frac{1}{2}\cos 2\theta_C \cos 2(\theta - \theta_C) + \frac{1}{2}\cos\delta_C(\sigma)\sin 2\theta_C \sin 2(\theta - \theta_C) \tag{7.10b}$$

$$\hat{a}_2(\sigma) = \frac{1}{2}\sin 2\theta_C \cos 2(\theta - \theta_C) + -\frac{1}{2}\cos\delta_C(\sigma)\cos 2\theta_C \sin 2(\theta - \theta_C) \tag{7.10c}$$

$$\hat{a}_3(\sigma) = -\frac{1}{2}\sin\delta_C(\sigma)\sin 2(\theta - \theta_C) \tag{7.10d}$$

As apparent from this expression, changing the azimuth angle θ of the analyzer or the azimuth angle θc of the compensator enables control of the following vectors which give coefficients.

$[\hat{a}_0(\sigma)\hat{a}_1(\sigma)\hat{a}_2(\sigma)\hat{a}_3(\sigma)]$

That is, channeled spectrums may be repeatedly measured while either one of the azimuth angles of the two elements is changed.

For example, when $\theta_c$ is changed to four different angles: $-45°$, $0°$, $30°$, and $60°$, on the basis of $\delta_c=90°$ and $\theta=45°$, a matrix $N(\sigma)$ given by Expression (7.8) is expressed as follows.

[Mathematical Expression 57]

$$N = \frac{1}{2}\begin{bmatrix} 1 & 0 & 1 & 0 \\ 1 & 0 & 0 & 1 \\ 1 & \frac{\sqrt{3}}{4} & \frac{3}{4} & \frac{1}{2} \\ 1 & -\frac{\sqrt{3}}{4} & \frac{3}{4} & -\frac{1}{2} \end{bmatrix} \tag{7.11}$$

Here, the inverse matrix of this matrix is given as follows.

$$N^{-1} = 2\begin{bmatrix} -1 & 0 & 1 & 1 \\ -\frac{4}{\sqrt{3}} & -\frac{2}{\sqrt{3}} & \frac{5}{\sqrt{3}} & \frac{1}{\sqrt{3}} \\ 2 & 0 & -1 & -1 \\ 1 & 1 & -1 & -1 \end{bmatrix} \tag{7.12}$$

By substituting spectroscopic quasi-Stokes parameters obtained by four times of measurements and $N^{-1}$ mentioned above into Expression (7.9), it is possible to determine all the sixteen elements of the Mueller matrix of the sample for each wavenumber.

It should be noted that in actual measurement, a retardation $\delta_c(\sigma)$ of a compensation is a function of a wavenumber a and is not constant. However, even in such a case, the measurement remains unsusceptible since Expression (7.9) is calculated for each wavenumber. Further, according to demonstration similar to that in the case of "spectroscopic polarization state measurement by retarder rotating method" shown in a reference document ("Polarized light" written by D. Goldstein, Mercel Dekker Inc., p. 555), it is possible to demonstrate that 132° is the optimum value as the retardation $\delta_c(\sigma)$. The closer to this value the retardation is, the less susceptible to measurement noise the measurement can be.

In the meantime, the number of equations can be increased also by rotating the azimuth angle θ of the analyzer. However, it is necessary to note that rotating only the analyzer prevents the matrix N(σ) from having an inverse matrix due to the property of the analyzer. If all the sixteen Mueller matrix elements are to be obtained, it is at least necessary to rotate the compensator.

Chapter 6 Channeled Spectroscopic Polarization State Generator

As the embodiment of the present invention, it was described in Chapter 1 that the optical system is comprised of the light source 7, the polarizer P, the retarders R2 and R1, the analyzer A and the spectroscope 8, and spectropolarization parameters of the sample and the like are calculated by analysis of a spectrum of incident light acquired in the spectroscope 8 in the foregoing procedure. Meanwhile, when the role of the light-projection part (the light source 7, the polarizer P, and the retarders R2 and R1) of the optical system is considered, this part can be defined as a "spectroscopic polarization state generator" for emitting light having a modulated SOP. This is especially named a "channeled spectroscopic polarization state generator (hereinafter referred to as CSPSG)". In this chapter, the optical implication of this generator is described.

Figure 30:
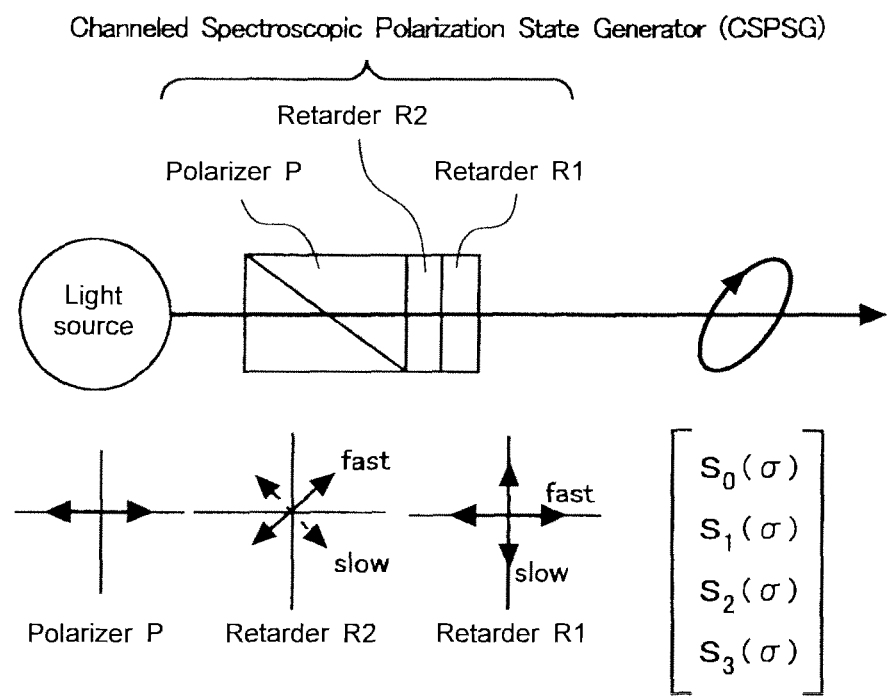
FIG. 30 shows a view of a configuration of a channeled spectroscopic polarization state generator (CSPSG).

FIG. 30 shows the configuration of the channeled spectroscopic polarization state generator (CSPSG). This optical system is configured to allow light emitted from the light source 7 to transit through the polarizer P and the retarders R1 and R2. The constituent elements in this configuration are the same as those starting with the light source and ending with the component before the sample in FIG. 2. Further, the azimuth angle of the element is the same as in FIG. 2. At this time, light emitted from the CSPSG is light having an SOP modulated along the wavenumber axis. A stokes spectrum $S_{PSG}(\sigma)$ emitted from the CSPSG is expressed below by calculation using the Mueller matrix.

[Mathematical Expression 58]

$$S_{PSG}(\sigma) = \begin{pmatrix} S_0(\sigma) \\ S_1(\sigma) \\ S_2(\sigma) \\ S_3(\sigma) \end{pmatrix} \quad (8.1)$$

$$= \frac{1}{2} P_o(\sigma) \begin{pmatrix} 1 \\ \cos(\phi_1(\sigma)) \\ \sin\phi_1(\sigma)\sin\phi_2(\sigma) \\ \sin\phi_1(\sigma)\cos\phi_2(\sigma) \end{pmatrix}$$

Here, $\phi_j(\sigma)$ (j=1, 2) is the retardation of the retarder formulated by Expression (1.2). Assuming that dispersion of a birefringence $B(\sigma)$ of the retarder is not so large, $\phi_j(\sigma)$ increases almost linearly with respect to wave number $\sigma$, as seen from Expression (1.2). By substitution of Expression (1.2) into Expression (8.1), the following expression is formed.

[Mathematical Expression 59]

$$S_{PSG}(\sigma) = \begin{pmatrix} S_0(\sigma) \\ S_1(\sigma) \\ S_2(\sigma) \\ S_3(\sigma) \end{pmatrix} \quad (8.2)$$

$$= \frac{1}{2} P_o(\sigma) \begin{pmatrix} 1 \\ \cos\{2\pi L_1 \sigma + \Phi_1(\sigma)\} \\ \frac{1}{2}\begin{bmatrix} \cos\{2\pi L_- \sigma + \Phi_-(\sigma)\} - \\ \cos\{2\pi L_+ \sigma + \Phi_+(\sigma)\} \end{bmatrix} \\ \frac{1}{2}\begin{bmatrix} \sin\{2\pi L_- \sigma + \Phi_-(\sigma)\} - \\ \sin\{2\pi L_+ \sigma + \Phi_+(\sigma)\} \end{bmatrix} \end{pmatrix}$$

It is found from Expression (8.2) that the light emitted from the CSPSG is light having been modulated along a wavenumber axis having three characteristics as follows. (a) $S_1(\sigma)$ is modulated in a quasi-sinusoidal manner at a period $1/L_1$. (b) $S_2(\sigma)$ and $S_3(\sigma)$ are both composed of two components modulated in a quasi-sinusoidal manner at a period $1/L_-$ and a period $1/L_+$. In (c) $S_2(\sigma)$ and $S_3(\sigma)$, the quasi-sinusoidal components at the same period has initial phases 90° different from each other. Therefore, the light emitted from the CSPSG can be considered as light having four spectroscopic Stokes parameters modulated at a period or phase independently different from one another. It can thereby be said that this CSPSG is a complete spectroscopic polarization state generator. The present invention can be defined as having a configuration for obtaining a spectropolarization parameter of an object to be measured, formed by combination of the light source of the above-mentioned CSPSG as a complete spectroscopic polarization state generator with the light source, the analyzer and the spectrometer.

EXAMPLE 1

Figure 20:
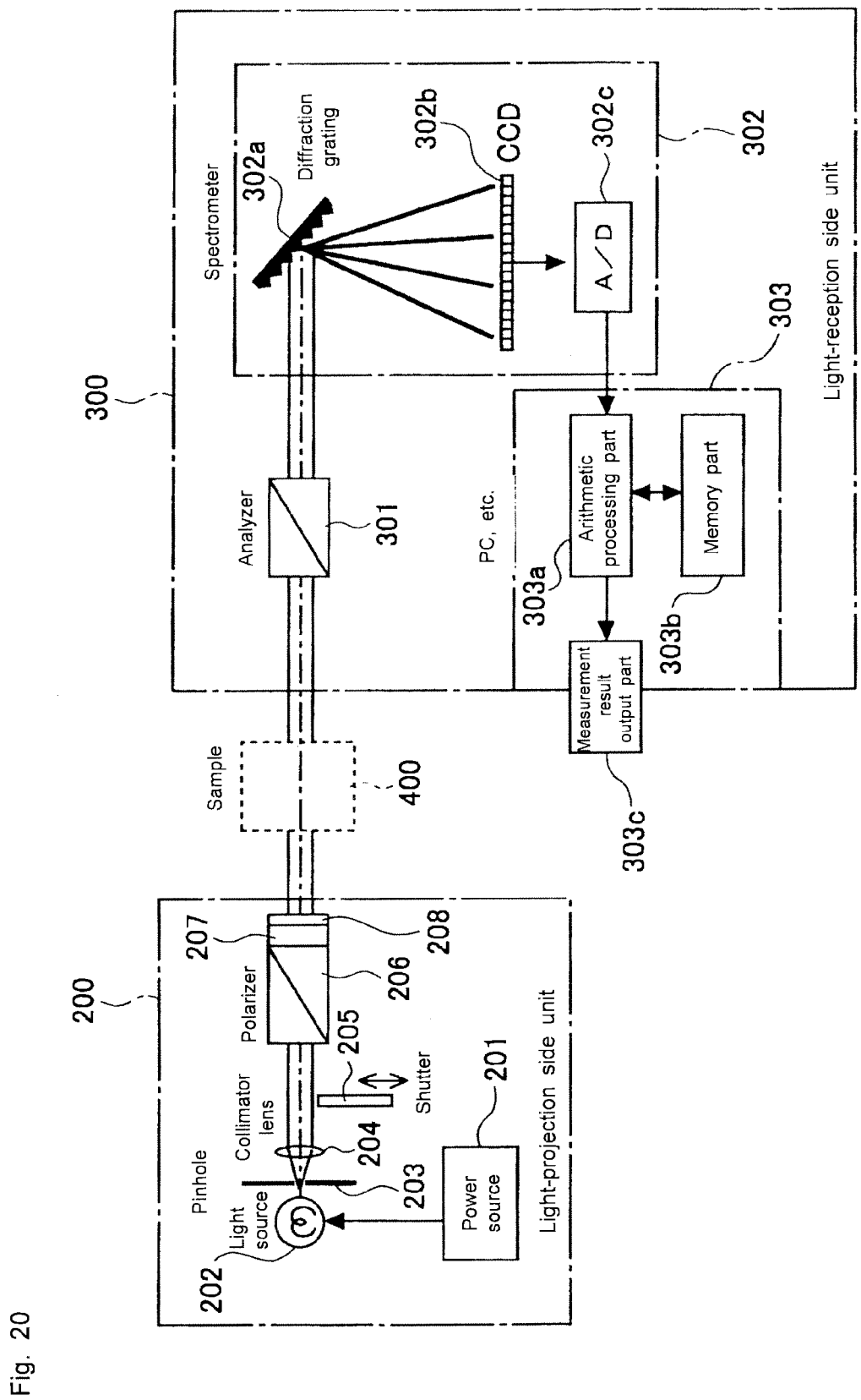
FIG. 20 shows a configuration view (No. 1) of one example of a spectroscopic polarimeter.

In the following, a preferred example of the present invention is specifically described with reference to FIGS. 20 to 23. FIG. 20 shows a configuration view of one example of a spectroscopic polarimeter. As shown in this figure, this device comprises a light-projection side unit 200 and a light-reception side unit 300. It is to be noted that reference numeral 400 denotes a sample.

The light-projection side unit 200 comprises: a power source 201; a light source 202 that is turned on by power feeding from the power source 201; a pinhole plate 203 arranged on the front face side of the light source 202 in the light emitting direction; a collimator lens 204 for collimating light transmitting through the pinhole of the 203; a shutter 205 which is arranged on the front face side of the collimator lens 204 and opens and closes to transmit or block the transmitted light; a polarizer 206 on which the light having transmitted through the shutter is incident; and a second retarder 207 and a first retarder 208, through which the light having transmitted through the polarizer transmits in this order.

The light after passage of the first retarder 208 is emitted from the light-projection side unit 200 and applied to the sample 400. The light transmitted through or reflected on the sample 400 is incident on the light-reception side unit 300.

On an incident light channel in the light-reception side unit 300, an analyzer 301, and a spectrometer 302 intervene in this order. Here, a respective angle between the first retarder 208 and the analyzer 301 is set to be a known angle.

The spectrometer 302 comprises: a diffraction grating 302a for spatially dispersing the incident light; a CCD 302b with the light-reception face on which light spatially dispersed by the diffraction grating 302a is incident; and an ND converter 302c for converting light-reception output from the CCD 302b into a digital signal. The digital light-reception output signal obtained from the ND converter 302c is taken out from the spectrometer 302, and then processed in a computer 303 such as a personal computer (PC).

As widely known, the computer 303 comprises: an arithmetic processing part 303a comprised of a microprocessor and the like; a memory part 303b comprised of an ROM, an RAM, an HDD and the like; and a measurement result output part 303c comprised of a display, a printer, a variety of data output devices, a communication device, and the like.

Figure 21:
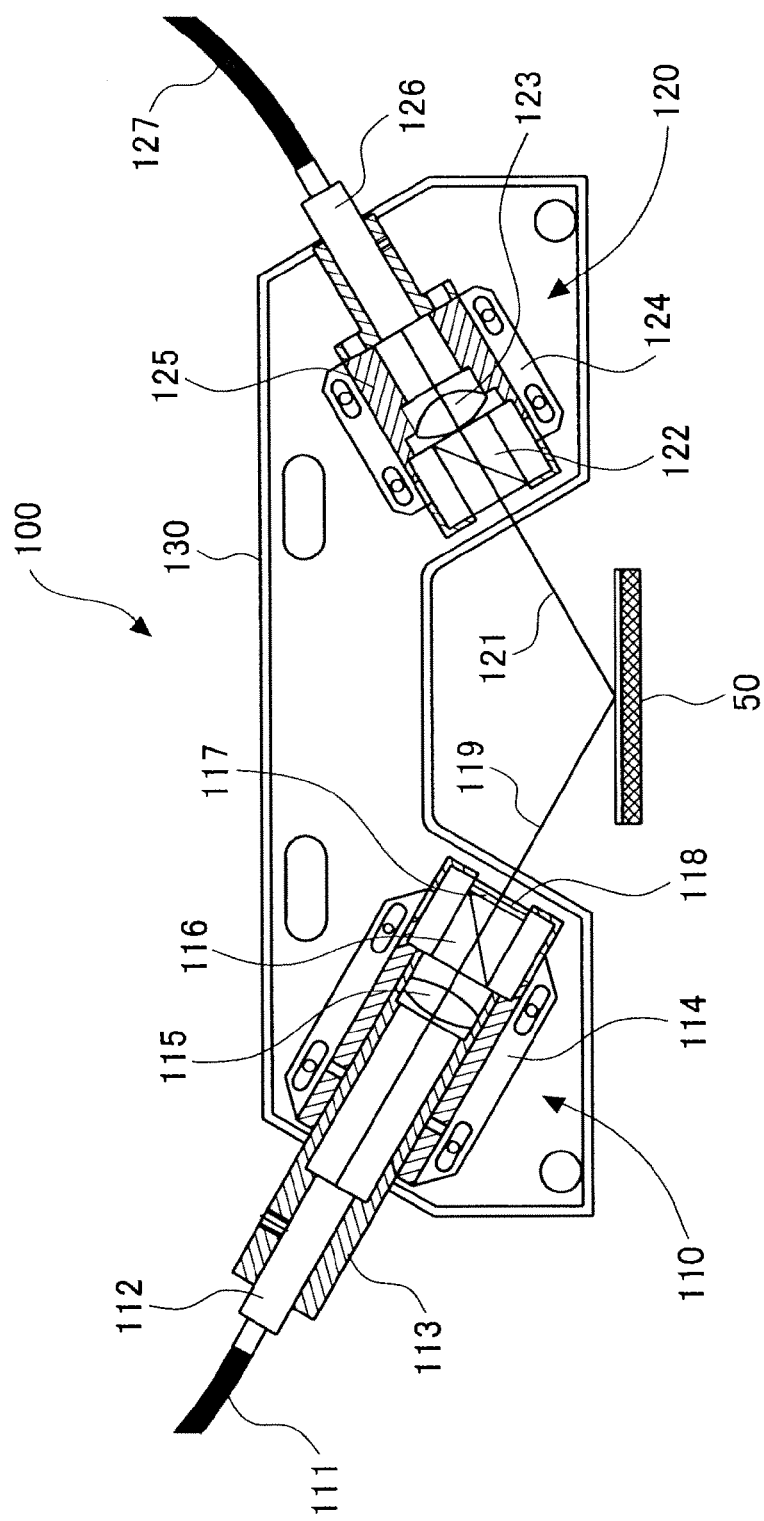
FIG. 21 shows a configuration view (No. 2) of one example of the spectroscopic polarimeter.

Next, FIG. 21 shows a more specific configuration view regarding a sensor head part of the spectroscopic polarimeter. A sensor head part 100 comprises: a light-projection part 110 for emitting light; a light-reception part 120 for receiving light having been reflected on or transmitted through a sample; and a housing 130 for protecting the light-projection part 110 and the light-reception part 120. It is to be noted that reference numeral 50 denotes a sample.

The light-projection part 110 includes: a fiber-optic cable 111 for allowing light emitted from a light source (not shown) to transmit therethrough; a cable head 112 for allowing transmitted light from the fiber-optic cable 111 to transmit therethrough; a collimator lens (light-projection lens) 115 for collimating transmitted light from the cable head 112; a polarizer 116 which is arranged on the front face side of the collimator lens 115 and allows incident light to transmit therethrough; a second retarder 117 and a first retarder 118, through which light emitted from the polarizer transmits in this order; and an optical system holding member 113 and a fixing member 114 which are used to install the optical system in the housing 130. It should be noted that a solid line 119 is a light-projection axis of the light that transmits through the light-projection part 110.

The light-reception part 120 includes: an analyzer 122 for allowing light reflected on or transmitted through the sample 50 to transmit therethrough; a light-reception lens 123 for condensing transmitted light from the analyzer 122; a cable head 126 for allowing light having transmitted through the light-reception lens 123 to transmit therethrough; a fiber-optic cable 127 connected to a spectrometer (not shown); and a fixing member 124 and an optical system holding member 125 which are used to install the optical system in the housing 130. It should be noted that a solid line 121 is a light-reception axis of the light that is reflected on or transmits through the sample 50.

Figure 29:
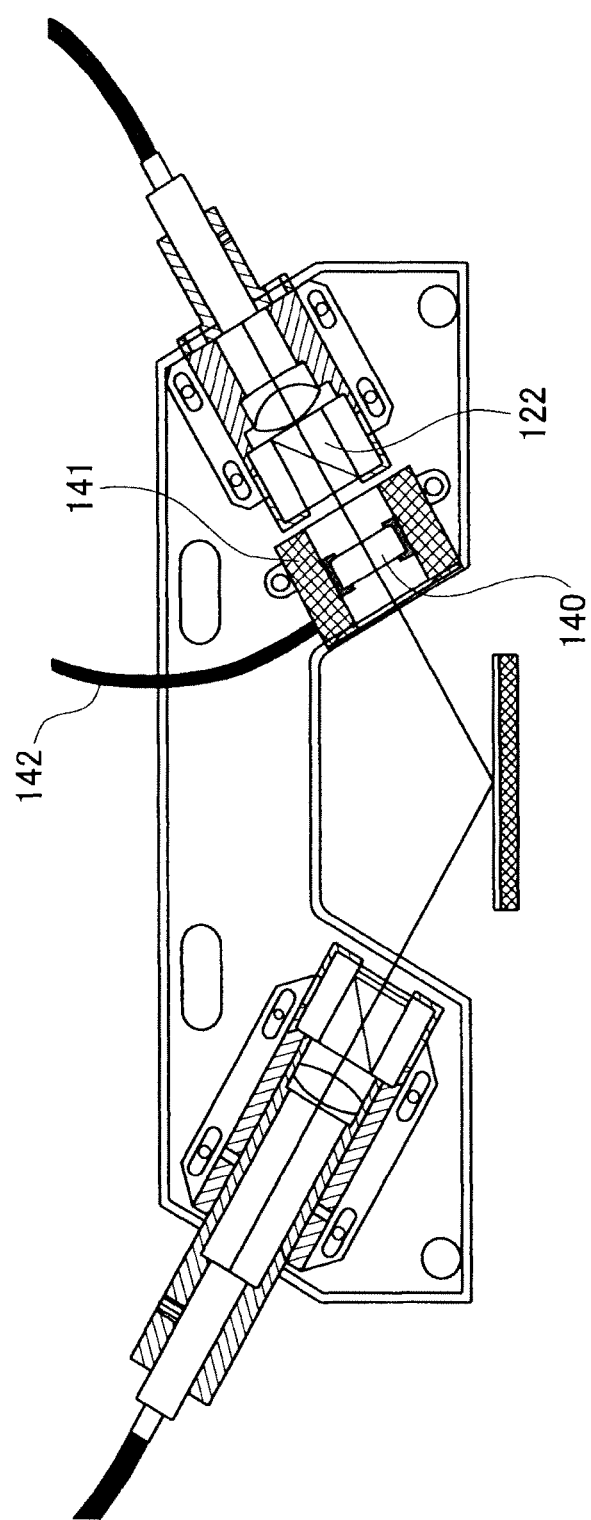
FIG. 29 shows a device configuration view in the case of measuring a spectropolarization parameter of the sample.

Next, FIG. 29 shows a device configuration view in the case of installing a polarization element having a known polarization parameter in a position after the sample and measuring the polarization parameter of the sample. As compared with FIG. 21, FIG. 29 is configured to install a compensator (known polarization element) 140 held in a hollow motor 141 between the sample 50 and the analyzer 122. Here, reference numeral 142 denotes electrical wiring for motor drive. A spectroscopic quasi-Stokes parameter can be measured under a plurality of conditions by rotating the hollow motor 141 to control the azimuth angle of the compensator 140. Further, the hollow motor 141 is fixed to the housing 130 to form an integral configuration as an element of the light-reception part 120. The hollow motor 141 is controlled by the arithmetic processing part 303a in FIG. 20. It is to be noted that in the case of not rotating the compensator 140 but rotating the analyzer 122, the hollow motor 141 may be replaced by a fixing hardware of the compensator 140, to provide a hollow motor for rotating the analyzer 122. Further, both the compensator 140 and the analyzer 122 may be made individually rotatable.

Figure 22:
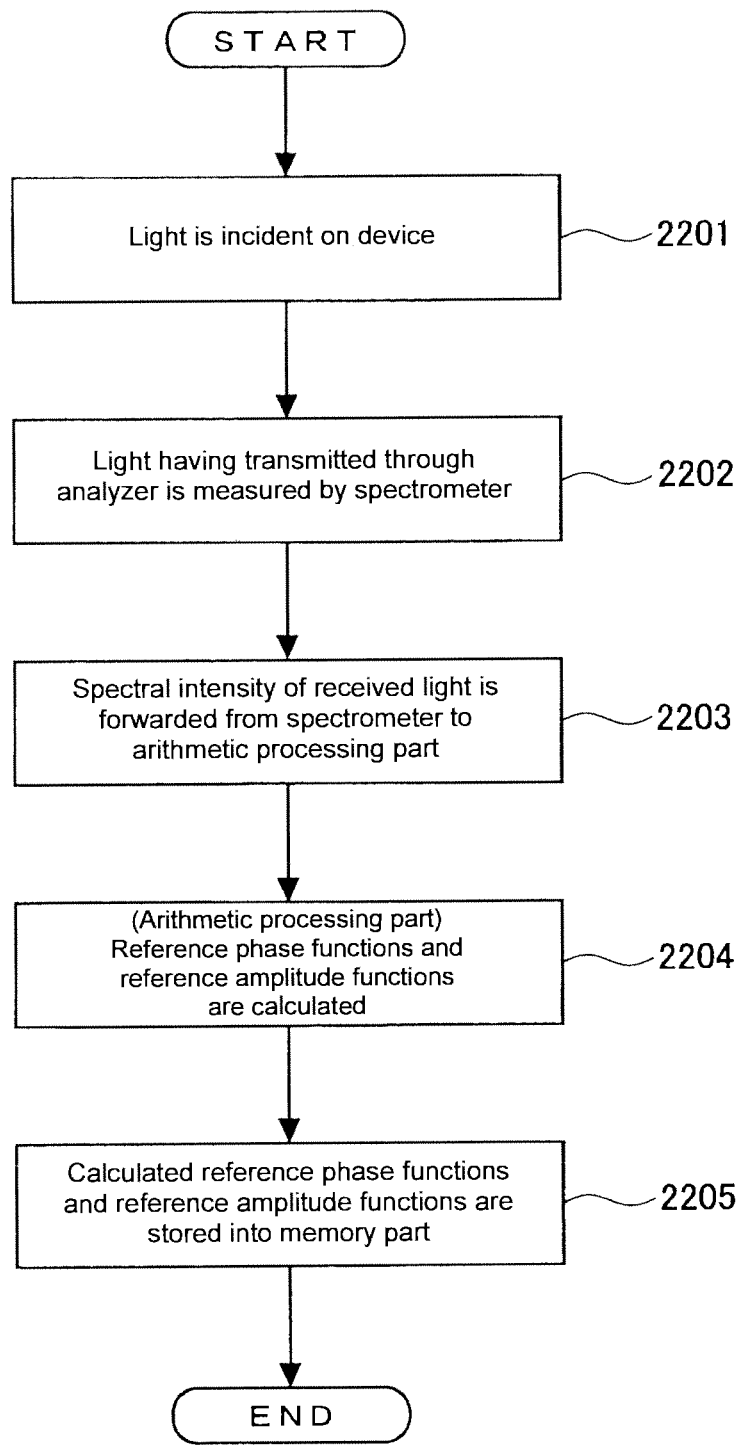
FIG. 22 shows a flowchart of a pre-calibration procedure.

Next, FIG. 22 shows a flowchart of a pre-calibration procedure. As shown in this figure, the pre-calibration procedure is started with application of light to the device in Step 2201. However, in this device, the relative angle between the first retarder 208 and the analyzer 301 is a known angle, and an element for changing an SOP of light is not arranged between the first retarder 208 and the analyzer 301.

Next, in Step 2202, a spectral intensity of transmitted light from the analyzer 301 is measured using the spectrometer. Here, the shutter 205 may be utilized for reduction in influence of unnecessary light, such as lost light. Specifically, a spectrum of the unnecessary light can be canceled out by taking a difference in spectrum between when measured with the shutter open and when measured with the shutter closed.

Next, in Step 2203, the spectral intensity of the transmitted light received is forwarded from the spectrometer to the computer 303, to be provided to calculation in the arithmetic processing part 303a.

Next, in Step 2204, reference phase functions and reference amplitude functions are calculated by the action of the arithmetic processing part 303a.

Next, in Step 2205, the calculated reference phase functions and reference amplitude functions are stored in the memory part 303b, whereby the pre-calibration procedure is completed.

Figure 23:
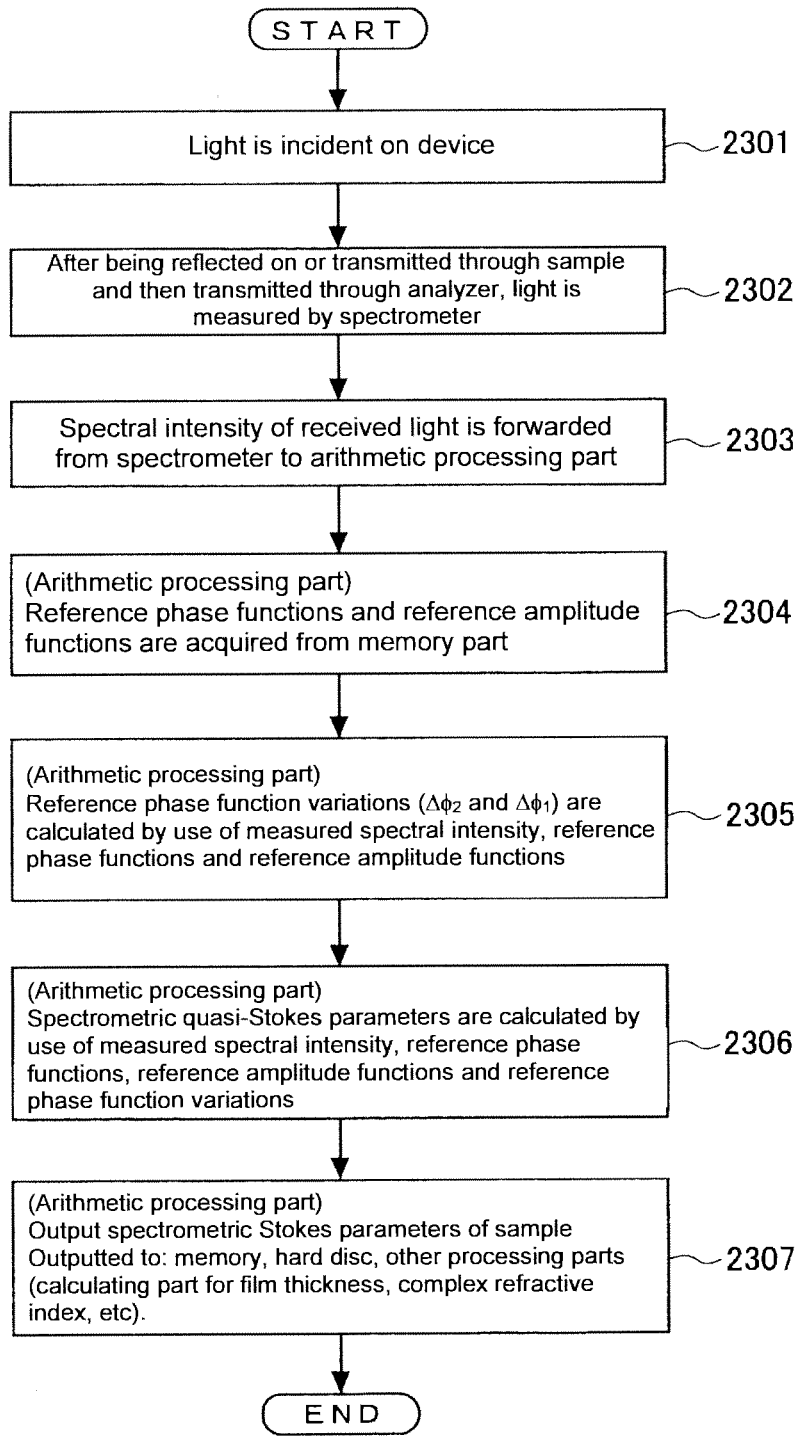
FIG. 23 shows a flowchart of a measurement procedure.
Figure 24:
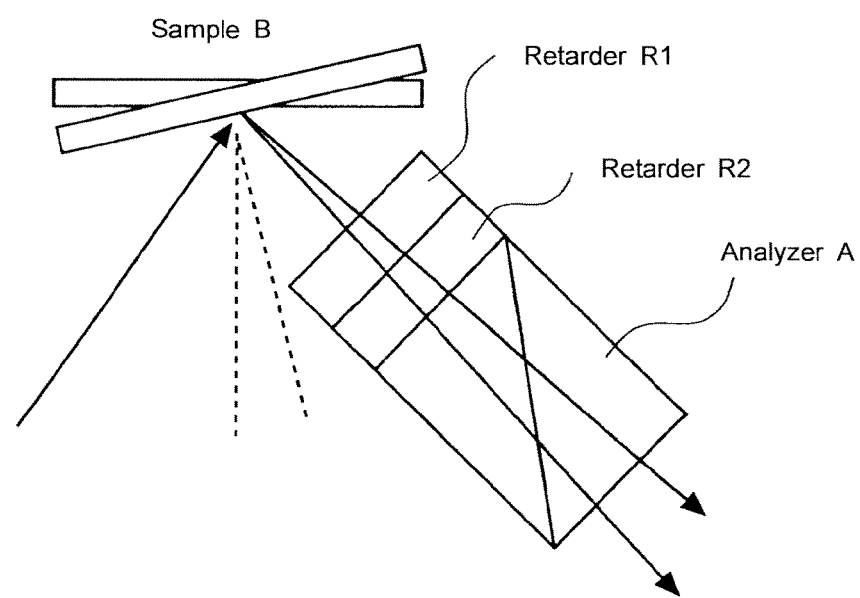
FIG. 24 shows a view (No. 1) for explaining variations in wave surface of light that passes through a retarder in the incident direction.
Figure 26:
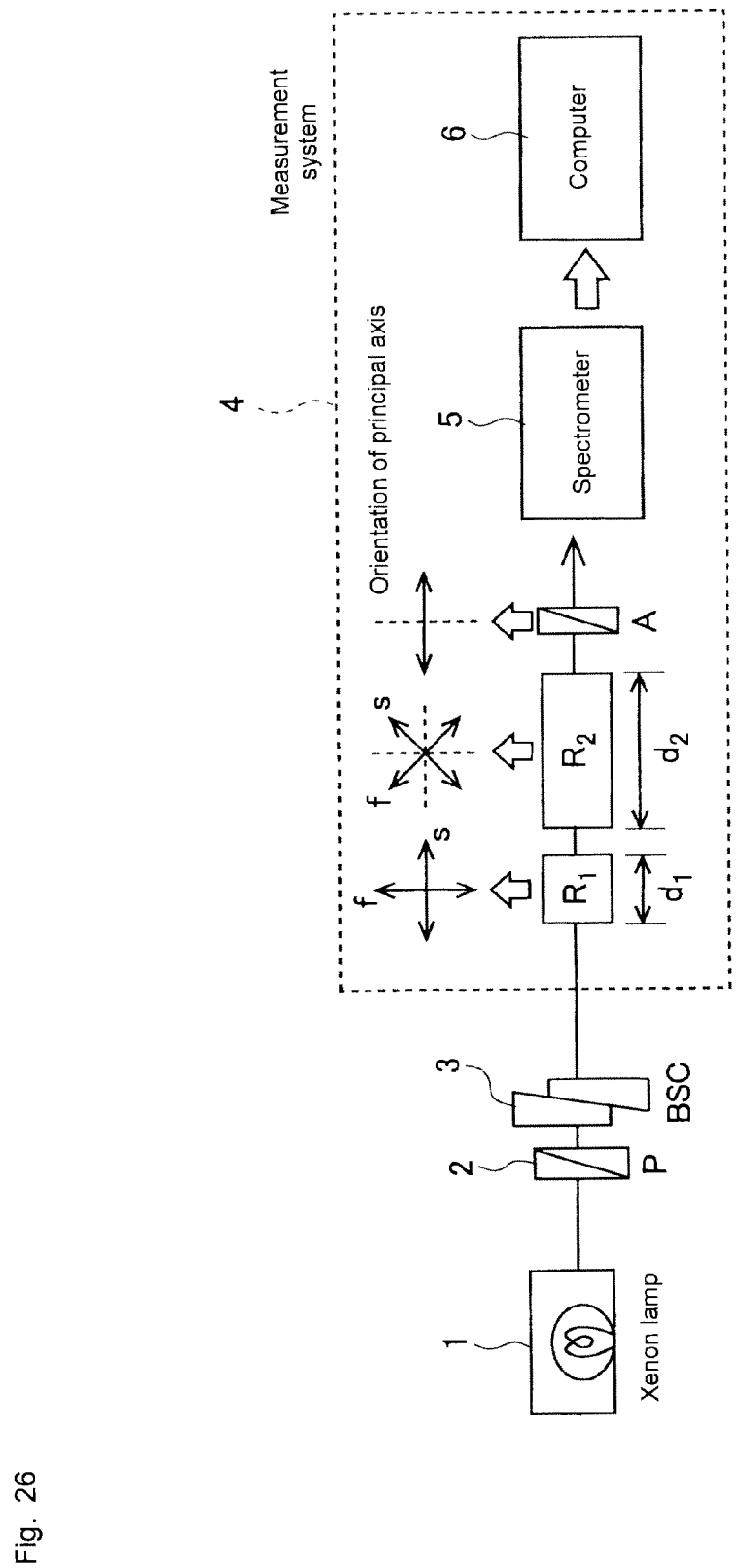
FIG. 26 shows a configuration view of an experimental system of channeled spectroscopic polarimetry.
Figure 27:
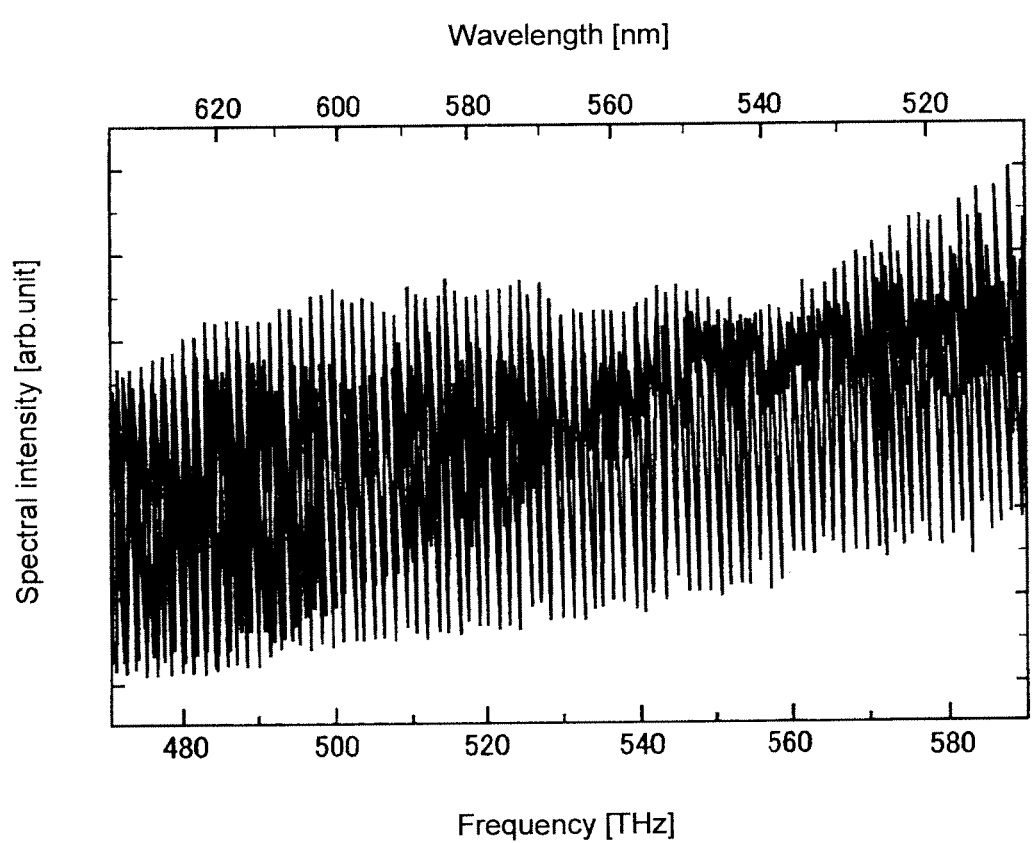
FIG. 27 shows a graph of a Stokes parameter in the experimental system.
Figure 28:
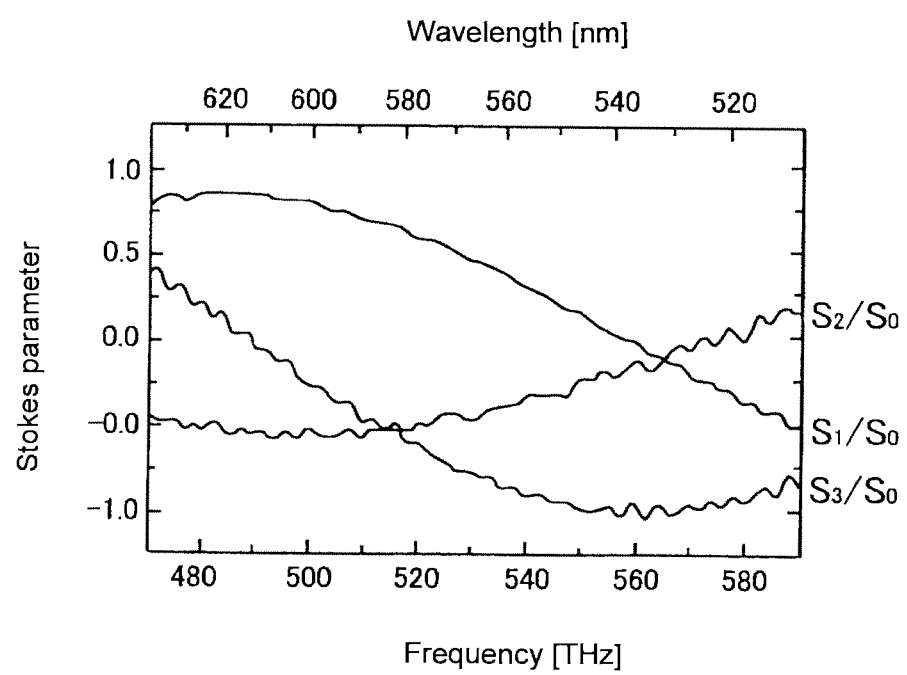
FIG. 28 shows a graph of a standardized Stokes parameter in the experimental system.

FIG. 23 shows a flowchart of a measurement procedure. As shown in the figure, the measurement procedure is started with application of light to the device in Step 2301.

Next, in Step 2302, light is reflected on or transmitted through the sample 400 using the spectrometer 302, and thereafter, a spectral intensity of transmitted light having transmitted through the analyzer 301 is measured. Here, the shutter 205 can be utilized for reduction in influence of unnecessary light, such as lost light. Specifically, the spectrum of the unnecessary light can be canceled out by taking a difference in spectrum between when measured with the shutter open and when measured with the shutter closed.

Next, in Step 2303, the spectral intensity of the transmitted light is forwarded from the spectrometer 302 to the computer 303, to be provided to processing in the arithmetic processing part 303a. At this time, in the case of implementing the procedure described in Chapter 5, the optical system described by use of FIG. 29 is used and the azimuth angle of the compensator 140 or the analyzer 122 is changed to acquire a spectral intensity more than once.

Next, in Step 2304, in the computer 303, the arithmetic processing part 303a acquires reference phase functions and reference amplitude functions from the memory part 303b.

Next, in Step 2305, in the computer 303, the arithmetic processing part 303a calculates reference phase function variations ($\Delta\phi_1$ and $\Delta\phi_2$) by use of the measured spectral intensity, the reference phase functions and the reference amplitude functions.

Next, in Step 2306, in the computer 303, the arithmetic processing part 303a calculates spectrometric Stokes parameters by use of the measured spectral intensity, the reference phase functions, the reference amplitude functions and the reference phase function variations.

Next, in Step 2307, in the computer 303, the arithmetic processing part 303a outputs the spectrometric Stokes parameters of the sample 400. Examples of the measurement result output part 303c may include a memory, a hard disc, and other processing parts (calculating part for film thickness, complex refractive index, etc.).

As described above, in the spectroscopic polarimetry of the present example, spectrometric Stokes parameters of the sample are calculated through the pre-calibration procedure shown in FIG. 22 and the measurement procedure shown in FIG. 23 in the system constitution shown in FIGS. 20, 21 and 29.

What is claimed is:

1. A method for spectroscopic polarimetry, comprising the steps of:
   preparing an object to be measured;
   preparing a polarimetric spectroscope which includes
      a projection optical system, comprising a light source, a polarizer and a plurality of non-active retarders, where
      said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and
      the light source, the polarizer and the plurality of non-active retarders are arranged such that light emitted from the light source is irradiated on the object to be measured after passing through the polarizer and the plurality of non-active retarders in this order,
      an analyzer for allowing light to transmit therethrough, the light having been emitted from the projection optical system and reflected on or transmitted through the object to be measured, and
      a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain;

obtaining the spectral intensity of the object to be measured by use of the polarimetric spectroscope; and obtaining at least one spectropolarization parameter of the object to be measured by use of the obtained spectral intensity without mechanically moving the non-active retarders and without electro-optically modulating the non-active retarders during an entire measurement for obtaining the at least one spectropolarization parameter of the object, wherein the step of obtaining at least one of spectropolarization parameters is a step which comprises:

obtaining, from the spectral intensity, a spectral intensity component (first spectral intensity component) which nonperiodically vibrates with wavenumber and a spectral intensity component (third spectral intensity component) which vibrates at a frequency depending upon a retardation ($\phi_2(\sigma)$) of the second retarder and not depending upon a retardation ($\phi_1(\sigma)$) of the first retarder, with wavenumber; and obtaining at least one of spectropolarization parameters by use of each of the spectral intensity components.

2. The method for spectroscopic polarimetry according to claim 1, wherein the step of obtaining at least one of spectropolarization parameter is a step which comprises:

obtaining the retardation ($\phi_2(\sigma)$) of the second retarder from the third spectral intensity component; and obtaining at least one spectropolarization parameter of the object to be measured by use of the spectral intensity and the retardation ($\phi_2(\sigma)$) of the second retarder.

3. The method for spectroscopic polarimetry according to claim 1, further comprising a step of acquiring data showing the relation between the retardation ($\phi_1(\sigma)$) of the first retarder and the retardation ($\phi_2(\sigma)$) of the second retarder, wherein the step of obtaining at least one spectropolarization parameter is a step which comprises:

obtaining the retardation ($\phi_1(\sigma)$) of the first retarder and the retardation ($\phi_2(\sigma)$) of the second retarder from the third spectral intensity component and the data showing the relation between the retardation ($\phi_1(\sigma)$) of the first retarder and the retardation ($\phi_2(\sigma)$) of the second retarder; and obtaining at least one spectropolarization parameter of the object to be measured by use of the spectral intensity, the retardation ($\phi_1(\sigma)$) of the first retarder and the retardation ($\phi_2(\sigma)$) of the second retarder.

4. A method for spectroscopic polarimetry, comprising the steps of:

preparing an object to be measured;

preparing a polarimetric spectroscope which includes a projection optical system, comprising a light source, a polarizer and a plurality of non-active retarders, where said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and the light source, the polarizer and the plurality of non-active retarders are arranged such that light emitted from the light source is irradiated on the object to be measured after passing through the polarizer and the plurality of non-active retarders in this order, an analyzer for allowing light to transmit therethrough, the light having been emitted from the projection optical system and reflected on or transmitted through the object to be measured, and a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain;

obtaining the spectral intensity of the object to be measured by use of the polarimetric spectroscope; and obtaining at least one spectropolarization parameter of the object to be measured by use of the obtained spectral intensity without mechanically moving the non-active retarders and without electro-optically modulating the non-active retarders during an entire measurement for obtaining the at least one spectropolarization parameter of the object, wherein the step of obtaining at least one spectropolarization parameter is a step which comprises:

obtaining, from the spectral intensity, at least one of a spectral intensity component (second spectral intensity component) which vibrates at a frequency depending upon a variation between the retardation ($\phi_1(\sigma)$) of the first retarder and the retardation ($\phi_2(\sigma)$) of the second retarder with wavenumber, a spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and a spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber; and obtaining at least one spectropolarization of the object to be measured by use of the obtained spectral intensity component.

5. The method for spectroscopic polarimetry according to claim 4, wherein the step of obtaining at least one spectropolarization parameter is a step which comprises:

obtaining the second spectral intensity component and the fourth spectral intensity component;

obtaining the retardation ($\phi_2(\sigma)$) of the second retarder from the second spectral intensity component and the fourth spectral intensity component; and obtaining at least one spectropolarization parameter of the object to be measured by use of the spectral intensity and the retardation ($\phi_2(\sigma)$) of the second retarder.

6. The method for spectroscopic polarimetry according to claim 4, further comprising a step of acquiring data showing the relation between the retardation ($\phi_1(\sigma)$) of the first retarder and the retardation ($\phi_2(\sigma)$) of the second retarder, wherein the step of obtaining at least one spectropolarization parameter is a step which comprises:

obtaining the second spectral intensity component and the fourth spectral intensity component;

obtaining the retardation ($\phi_1(\sigma)$) of the first retarder and the retardation ($\phi_2(\sigma)$) of the second retarder from the second spectral intensity component, the fourth spectral intensity component and the data showing the relation between the retardation ($\phi_2(\sigma)$) of the first retarder and the retardation ($\phi_2(\sigma)$) of the second retarder; and obtaining at least one spectropolarization parameter of the object to be measured by use of the spectral intensity, the retardation ($\phi_1(\sigma)$) of the first retarder and the retardation ($\phi_2(\sigma)$) of the second retarder.

7. A method for spectroscopic polarimetry, comprising the steps of:
preparing an object to be measured;
preparing a polarimetric spectroscope which includes
a projection optical system, comprising a light source, a polarizer and a plurality of non-active retarders, where
said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and
the light source, the polarizer and the plurality of non-active retarders are arranged such that light emitted from the light source is irradiated on the object to be measured after passing through the polarizer and the plurality of non-active retarders in this order,
an analyzer for allowing light to transmit therethrough, the light having been emitted from the projection optical system and reflected on or transmitted through the object to be measured, and
a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain;
obtaining the spectral intensity of the object to be measured by use of the polarimetric spectroscope; and
obtaining at least one spectropolarization parameter of the object to be measured by use of the obtained spectral intensity without mechanically moving the non-active retarders and without electro-optically modulating the non-active retarders during an entire measurement for obtaining the at least one spectropolarization parameter of the object,
wherein the step of obtaining at least one spectropolarization parameter is a step which comprises:
obtaining, from the spectral intensity,
at least one of the spectral intensity component (first spectral intensity component) which nonperiodically vibrates with wavenumber and the spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber, and
at least one of the spectral intensity component (second spectral intensity component) which vibrates at a frequency depending upon the difference between the retardation ($\phi_1(\sigma)$) of the first retarder and the retardation ($\phi_2(\sigma)$) of the second retarder with wavenumber, the spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and the spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber; and
obtaining at least one spectropolarization parameter of the object to be measured by use of each of the obtained spectral intensity components.

8. The method for spectroscopic polarimetry according to claim 7, wherein the step of obtaining at least one spectropolarization parameter is a step which comprises:
obtaining the third spectral intensity component, the second spectral intensity component and the fourth spectral intensity component;
obtaining the retardation ($\phi_2(\sigma)$) of the second retarder from the third spectral intensity component, the second spectral intensity component and the fourth spectral intensity component; and
obtaining at least one spectropolarization parameter of the object to be measured by use of the spectral intensity and the retardation ($\phi_2(\sigma)$) of the second retarder.

9. The method for spectroscopic polarimetry according to claim 7, further comprising a step of acquiring data showing the relation between the retardation ($\phi_1(\sigma)$) of the first retarder and the retardation ($\phi_2(\sigma)$) of the second retarder, wherein the step of obtaining at least one spectropolarization parameter is a step which comprises:
obtaining the third spectral intensity component, the second spectral intensity component and the fourth spectral intensity component;
obtaining the retardation ($\phi_1(\sigma)$) of the first retarder and the retardation ($\phi_2(\sigma)$) of the second retarder from the third spectral intensity component, the second spectral intensity component, the fourth spectral intensity component and the data showing the relation between the retardation ($\phi_1(\sigma)$) of the first retarder and the retardation ($\phi_2(\sigma)$) of the second retarder; and
obtaining at least one spectropolarization parameter of the object to be measured by use of the spectral intensity, the retardation ($\phi_1(\sigma)$) of the first retarder and the retardation ($\phi_2(\sigma)$) of the second retarder.

10. A method for spectroscopic polarimetry, comprising the steps of:
preparing an object to be measured;
preparing a polarimetric spectroscope which includes
a projection optical system, comprising a light source, a polarizer and a plurality of non-active retarders, where
said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and
the light source, the polarizer and the plurality of non-active retarders are arranged such that light emitted from the light source is irradiated on the object to be measured after passing through the polarizer and the plurality of non-active retarders in this order,
an analyzer for allowing light to transmit therethrough, the light having been emitted from the projection optical system and reflected on or transmitted through the object to be measured, and
a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain;

obtaining the spectral intensity of the object to be measured by use of the polarimetric spectroscope;

obtaining at least one spectropolarization parameter of the object to be measured by use of the obtained spectral intensity without mechanically moving the non-active retarders and without electro-optically modulating the non-active retarders during an entire measurement for obtaining the at least one spectropolarization parameter of the object, acquiring data showing the relation between the retardation variation ($\phi_1(\sigma)$) of the first retarder and the retardation variation ($\phi_2(\sigma)$) of the second retarder; and acquiring a reference value ($\phi_1^{(i)}(\sigma)$) for calibration of retardation of the first retarder and a reference value ($\phi_2^{(i)}(\sigma)$) for calibration of retardation of the second retarder, wherein the step of obtaining at least one spectropolarization parameter is a step which comprises:

obtaining, from the spectral intensity, the retardation ($\phi_2(\sigma)$) of the second retarder and the retardation variation ($\phi_2(\sigma)$) of the second retarder from the reference value ($\phi_2^{(i)}(\sigma)$) for calibration;

obtaining the retardation variation ($\phi_1(\sigma)$) of the first retarder by use of the obtained retardation variation ($\phi_2(\sigma)$) of the second retarder and data showing the relation between the retardation variation ($\phi_1(\sigma)$) of the first retarder and the retardation variation ($\phi_2(\sigma)$) of the second retarder;

obtaining the retardation ($\phi_1(\sigma)$) of the first retarder from a reference value ($\phi_1^{(i)}(\sigma)$) for calibration of retardation of the first retarder and the obtained retardation variation ($\phi_1(\sigma)$) of the first retarder; and obtaining at least one spectropolarization parameter of the object to be measured by use of the spectral intensity, the retardation ($\phi_1(\sigma)$) of the first retarder and the retardation ($\phi_2(\sigma)$) of the second retarder.

11. The method for spectroscopic polarimetry according to claim 10, wherein the step of acquiring data showing the relation between the retardation variation ($\Delta\phi_1(\sigma)$) of the first retarder and the retardation ($\Delta\phi_2(\sigma)$) of the second retarder is a step which comprises:

obtaining the spectral intensity for calibration by use of the polarimetric spectroscope in a state where the object to be measured having an unknown spectropolarization characteristic does not exist in the light path between the projection optical system and the analyzer; and obtaining the data showing the relation between the retardation ($\Delta\phi_1(\sigma)$) of the first retarder and the retardation ($\Delta\phi_2(\sigma)$) of the second retarder by use of the obtained spectral intensity for calibration.

12. A method for spectroscopic polarimetry, comprising the steps of:

preparing an object to be measured;

preparing a polarimetric spectroscope which includes a projection optical system, comprising a light source, a polarizer and a plurality of non-active retarders, where said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and the light source, the polarizer and the plurality of non-active retarders are arranged such that light emitted from the light source is irradiated on the object to be measured after passing through the polarizer and the plurality of non-active retarders in this order, an analyzer for allowing light to transmit therethrough, the light having been emitted from the projection optical system and reflected on or transmitted through the object to be measured, and a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain;

obtaining the spectral intensity of the object to be measured by use of the polarimetric spectroscope;

obtaining at least one spectropolarization parameter of the object to be measured by use of the obtained spectral intensity without mechanically moving the non-active retarders and without electro-optically modulating the non-active retarders during an entire measurement for obtaining the at least one spectropolarization parameter of the object, wherein the step of obtaining at least one spectropolarization parameter is a step which comprises obtaining the spectroscopic quasi-Stokes parameter of the object to be measured by use of the obtained spectral intensity, wherein the spectroscopic polarimetry further comprises a step of acquiring data showing the relation between the retardation ($\phi_1(\sigma)$) of the first retarder and the retardation ($\phi_2(\sigma)$) of the second retarder, and the step of obtaining the spectroscopic quasi-Stokes parameter comprises:

obtaining, from the obtained spectral intensity, at least one of the spectral intensity component (first spectral intensity component) which nonperiodically vibrates with wavenumber and the spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber, and at least one of the spectral intensity component (second spectral intensity component) which vibrates at a frequency depending upon the difference between the retardation ($\phi_1(\sigma)$) of the first retarder and the retardation ($\phi_2(\sigma)$) of the second retarder with wavenumber, the spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and the spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber; and obtaining the retardation ($\phi_1(\sigma)$) of the first retarder, the retardation ($\phi_2(\sigma)$) of the second retarder and the spectroscopic quasi-Stokes parameter by use of the data showing the relation between the retardation ($\phi_1(\sigma)$) of the first retarder and the retardation ($\phi_2(\sigma)$) of the second retarder, and each of the obtained spectral intensity components.

13. A method for spectroscopic polarimetry, comprising the steps of:
preparing an object to be measured;
preparing a polarimetric spectroscope which includes
  a projection optical system, comprising a light source, a polarizer and a plurality of non-active retarders, where
    said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and
    the light source, the polarizer and the plurality of non-active retarders are arranged such that light emitted from the light source is irradiated on the object to be measured after passing through the polarizer and the plurality of non-active retarders in this order,
  an analyzer for allowing light to transmit therethrough, the light having been emitted from the projection optical system and reflected on or transmitted through the object to be measured, and
  a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain;
obtaining the spectral intensity of the object to be measured by use of the polarimetric spectroscope;
obtaining at least one spectropolarization parameter of the object to be measured by use of the obtained spectral intensity without mechanically moving the non-active retarders and without electro-optically modulating the non-active retarders during an entire measurement for obtaining the at least one spectropolarization parameter of the object,
wherein the step of obtaining at least one spectropolarization parameter is a step which comprises obtaining the spectroscopic quasi-Stokes parameter of the object to be measured by use of the obtained spectral intensity, wherein
the spectroscopic polarimetry further comprises the steps of:
acquiring data showing the relation between the retardation variation ($\Delta\phi_1(\sigma)$) of the first retarder and the retardation variation ($\Delta\phi_s(\sigma)$) of the second retarder; and
acquiring a reference value ($\phi_1^{(i)}(\sigma)$) for calibration of retardation of the first retarder and a reference value ($\phi_2^{(i)}(\sigma)$) for calibration of retardation of the second retarder, and
the step of obtaining the spectroscopic quasi-Stokes parameter comprises:
obtaining, from the obtained spectral intensity,
at least one of the spectral intensity component (first spectral intensity component) which nonperiodically vibrates with wavenumber and the spectral intensity component (third spectral intensity component) which vibrates at a frequency depending upon the retardation ($\phi_2(\sigma)$) of the second retarder and not depending upon the retardation ($\phi_1(\sigma)$) of the first retarder, with wavenumber, and
at least one of the spectral intensity component (second spectral intensity component) which vibrates at a frequency depending upon the difference between the retardation ($\phi_2(\sigma)$) of the first retarder and the retardation ($\phi_2(\sigma)$) of the second retarder with wavenumber, the spectral intensity component (fourth spectral intensity component) which vibrates at a frequency depending upon the sum of the retardation ($\phi_1(\sigma)$) of the first retarder and the retardation ($\phi_2(\sigma)$) of the second retarder with wavenumber, and the spectral intensity component (fifth spectral intensity component) which vibrates at a frequency depending upon the retardation ($\phi_1(\sigma)$) of the first retarder and not depending upon the retardation ($\phi_2(\sigma)$) of the second retarder, with wavenumber;
obtaining the retardation ($\phi_2(\sigma)$) of the second retarder and the retardation variation ($\Delta\phi_2(\sigma)$) of the second retarder from the reference value ($\phi_2^{(i)}(\sigma)$) for calibration by use of the obtained spectral intensity;
obtaining the retardation variation ($\Delta\phi_1(\sigma)$) of the first retarder by use of the obtained retardation variation ($\Delta\phi_2(\sigma)$) of the second retarder and data showing the relation between the retardation variation ($\Delta\phi_1(\sigma)$) of the first retarder and the retardation variation ($\Delta\phi_2(\sigma)$) of the second retarder;
obtaining the retardation ($\phi_1(\sigma)$) of the first retarder from the reference value ($\phi_2^{(i)}(\sigma)$) for calibration of retardation of the first retarder and the obtained retardation variation ($\Delta\phi_1(\sigma)$) of the first retarder; and
obtaining the spectroscopic quasi-Stokes parameter by use of each of the obtained spectral intensity components, the retardation ($\phi_1(\sigma)$) of the first retarder and the retardation ($\phi_2(\sigma)$) of the second retarder.

14. A spectroscopic polarimeter, comprising:
a polarimetric spectroscope, which comprises:
  a projection optical system, comprising a light source, a polarizer and a plurality of non-active retarders, where
    said plurality of non-active retarders includes a second retarder mechanically fixed optically downstream from the polarizer with respect to the traveling direction of light and having a principal axis oriented differently from the transmission axis of the polarizer, and a first retarder mechanically fixed further optically downstream from the second retarder and having a principal axis oriented differently from the principal axis of the second retarder, and
    the light source, the polarizer and the plurality of non-active retarders are arranged such that light emitted from the light source is irradiated on the object to be measured after passing through the polarizer and the plurality of non-active retarders in this order,
  an analyzer for allowing light to transmit therethrough, the light having been emitted from the projection optical system and reflected on or transmitted through the object to be measured, and
  a spectrometer for obtaining the spectral intensity of the light having transmitted through the analyzer, or the light source and a light receiver for receiving the light having transmitted through the analyzer wherein the light source scans a wavelength of the light so that the light receiver obtains the spectral intensity of the light in a time domain; and a microprocessor for obtaining at least one spectropolarization parameter of an object to be measured, by use of the spectral intensity obtained without mechanically moving the non-active retarders and without electro-optically modulating the non-active retarders during an entire measurement for obtaining the at least one spectropolarization parameter of the object, wherein the microprocessor is configured to:

use data showing the relation between the retardation variation ($\Delta\phi_2(\sigma)$) of the first retarder and the retardation variation ($\Delta\phi_2(\sigma)$) of the second retarder, a reference value ($\phi_2^{(i)}(\sigma)$) for calibration of retardation of the first retarder and a reference value ($\phi_2^{(i)}(\sigma)$) for calibration of retardation of the second retarder;

obtain the retardation ($\phi_2(\sigma)$) of the second retarder and the retardation variation ($\Delta\phi_2(\sigma)$) of the second retarder from the reference value ($\phi_2^{(i)}(\sigma)$) for calibration from the spectral intensity, obtain the retardation variation ($\Delta\phi_1(\sigma)$) of the first retarder by use of the obtained retardation variation ($\Delta\phi_2(\sigma)$) of the second retarder and data showing the relation between the retardation variation ($\Delta\phi_1(\sigma)$) of the first retarder and the retardation variation ($\Delta\phi_2(\sigma)$) of the second retarder, obtain the retardation ($\phi_2(\sigma)$) of the first retarder from the reference value ($\phi_1^{(i)}(\sigma)$) for calibration of retardation of the first retarder and the obtained retardation variation ($\Delta\phi_2(\sigma)$) of the first retarder; and obtain at least one spectropolarization parameter of the object to be measured by use of the spectral intensity, the retardation ($\phi_1(\sigma)$) of the first retarder and the retardation ($\phi_2(\sigma)$) of the second retarder.

15. The method for spectroscopic polarimetry according to any one of claims 1, 4, 7, 10, 2, 5, 8, 3, 6 or 9, wherein the polarizer and the second retarder are arranged such that an angle between the orientation of the transmission axis of the polarizer and the orientation of a fast axis of the second retarder is 45°.

16. The method for spectroscopic polarimetry according any one of claims 1, 4, 7, 10, 2, 5, 8, 3, 6, or 9, further comprising a step of obtaining a spectral intensity for calibration by use of the polarimetric spectroscope in a state where an object to be measured having an unknown spectropolarization characteristic does not exist in a light path between the projection optical system and the analyzer, wherein the step of obtaining at least one spectropolarization parameter is a step of obtaining at least one spectropolarization parameter of the object to be measured by use of the spectral intensity regarding the object to be measured and the spectral intensity for calibration or data based upon the spectral intensity for calibration.

17. The method for spectroscopic polarimetry according to claim 16, wherein the step of obtaining the spectral intensity for calibration is a step of preparing an analyzer for calibration in a position in which light emitted from the projection optical system is received in a state where the object to be measured having an unknown spectropolarization characteristic does not exist in the light path between the projection optical system and the analyzer.

18. The method for spectroscopic polarimetry according to claim 16, further comprising a step of obtaining the retardation ($\phi_1(\sigma)$) of the first retarder and the retardation ($\phi_2(\sigma)$) of the second retarder by use of the spectral intensity for calibration, wherein the step of obtaining at least one of spectropolarization parameters is a step of obtaining at least one of the spectropolarization parameters of the object to be measured by use of the spectral intensity regarding the object to be measured, the retardation ($\phi_1(\sigma)$) of the first retarder, and the retardation ($\phi_2(\sigma)$) of the second retarder, which are obtained by use of the spectral intensity for calibration.

19. The method for spectroscopic polarimetry according to any one of claims 3, 6, or 9, wherein the step of acquiring data shown the relation between the retardation ($\phi_1(\sigma)$) of the first retarder and the retardation ($\phi_2(\sigma)$) of the second retarder is a step which comprises:

obtaining the spectral intensity for calibration by use of the polarmetric spectroscope in a state where the object to be measured having an unknown spectropolarization characteristic does not exist in the light path between the projection optical system and the analyzer; and obtaining the data showing the relation between the retardation ($\phi_1(\sigma)$) of the first retarder and the retardation ($\phi_2(\sigma)$) of the second retarder by use of the obtained spectral intensity for calibration.

20. The method for spectroscopic polarimetry according to any one of claims 4, 7, 10, 12, 13, 2, 5, 8, 3, 6, or 9, wherein the step of obtaining a spectral intensity is a step of obtaining a spectral intensity regarding the object to be measured in a plurality of states where azimuth angles of the analyzer are made different from one another, and the spectroscopic polarimetry further comprises a step of obtaining the spectropolarization parameters of greater number than the number of spectropolarization parameters of the object to be measured obtainable without changing the azimuth angle of the analyzer by use of the spectral intensity obtained in the plurality of states.

21. The method for spectroscopic polarimetry according to any one of claims 1, 4, 7, 10, 12, 13, 2, 5, 8, 3, 6, or 9, wherein the step of preparing an object to be measured is a step of preparing an object to be measured which includes a sample and a polarization element on which light emitted from the sample is incident, the step of obtaining a spectral intensity is a step of obtaining a spectral intensity regarding the object to be measured in a plurality of states where characteristics of the polarization element are made different from one another, and the spectroscopic polarimetry further comprises a step of obtaining the spectropolarization parameters of greater number than the number of spectropolarization parameters of the sample obtainable without changing the characteristic of the polarization element by use of the spectral intensity obtained in the plurality of states.

22. The method for spectroscopic polarimetry according to any one of claims 1, 5, 6, 9, 17, 13, 2, 5, 8, 3, 6, or 9, wherein the step of preparing an object to be measured is a step of preparing an object to be measured which includes a sample and a polarization element on which light emitted from the sample is incident, the step of obtaining a spectral intensity is a step of obtaining a spectral intensity regarding the object to be measured in a plurality of states where characteristics of the polarization element, or azimuth angles of the analyzer, are made different from one another, and the spectroscopic polarimetry further comprises a step of obtaining the spectropolarization parameters of greater number than the number of spectropolarization parameters of the sample obtainable without changing the characteristic of said polarization element and the azimuth angle of the analyzer by use of the spectral intensity obtained in the plurality of states.

* * * * *